(12) United States Patent
Yamagishi et al.

(10) Patent No.: US 10,893,315 B2
(45) Date of Patent: Jan. 12, 2021

(54) CONTENT PRESENTATION SYSTEM AND CONTENT PRESENTATION METHOD, AND PROGRAM

(71) Applicant: SONY CORPORATION, Tokyo (JP)

(72) Inventors: Yasuaki Yamagishi, Kanagawa (JP); Kazuhiko Takabayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/486,020

(22) PCT Filed: Mar. 14, 2018

(86) PCT No.: PCT/JP2018/009912
§ 371 (c)(1),
(2) Date: Aug. 14, 2019

(87) PCT Pub. No.: WO2018/173874
PCT Pub. Date: Sep. 27, 2018

(65) Prior Publication Data
US 2020/0053411 A1 Feb. 13, 2020

(30) Foreign Application Priority Data

Mar. 24, 2017 (JP) ................................ 2017-060220
Oct. 17, 2017 (JP) ................................ 2017-201130

(51) Int. Cl.
*H04N 21/262* (2011.01)
*H04N 21/231* (2011.01)
(Continued)

(52) U.S. Cl.
CPC ..... *H04N 21/26275* (2013.01); *H04N 21/235* (2013.01); *H04N 21/23106* (2013.01); *H04N 21/84* (2013.01); *H04N 21/8456* (2013.01)

(58) Field of Classification Search
CPC ....... H04N 21/26275; H04N 21/23106; H04N 21/235; H04N 21/84; H04N 21/8456;
(Continued)

(56) References Cited

U.S. PATENT DOCUMENTS

2005/0044561 A1* 2/2005 McDonald ......... H04N 21/8456
725/18
2009/0292819 A1* 11/2009 Kandekar .......... H04N 7/17318
709/231
(Continued)

FOREIGN PATENT DOCUMENTS

WO WO 2016/067987 A1 5/2016

OTHER PUBLICATIONS

Mar. 10, 2020, European Search Report issued for related EP Application No. 18772589.0.
(Continued)

*Primary Examiner* — Fernando Alcon
(74) *Attorney, Agent, or Firm* — Paratus Law Group, PLLC

(57) ABSTRACT

The present disclosure relates to a content presentation system, a content presentation method, and a program which are capable of optimizing and streamlining allocation of a plurality of transport media. A content delivery apparatus delivers content to a client that reproduces the content using a plurality of networks with different transport characteristics. A content providing apparatus provides the content delivery apparatus with a policy serving as a determination criterion when delivery of each of streams is distributed by the plurality of networks when the content constituted by a plurality of streams with different characteristics. The present technology can be applied to, for example, a content presentation system that provides content using MPEG DASH.

7 Claims, 97 Drawing Sheets

(51) Int. Cl.
*H04N 21/235* (2011.01)
*H04N 21/84* (2011.01)
*H04N 21/845* (2011.01)

(58) Field of Classification Search
CPC ............. H04N 21/222; H04N 21/4622; H04N 21/21805; H04N 21/2187; H04N 21/4331; H04N 21/6131; H04N 21/6125; H04N 21/4825; H04N 21/26258; H04N 21/816

See application file for complete search history.

(56) References Cited

U.S. PATENT DOCUMENTS

| | | | |
|---|---|---|---|
| 2012/0023251 A1* | 1/2012 | Pyle | H04L 65/608 709/231 |
| 2012/0259994 A1 | 10/2012 | Gillies et al. | |
| 2012/0272265 A1* | 10/2012 | Flatt | H04N 21/25841 725/34 |
| 2013/0111028 A1 | 5/2013 | Kondrad et al. | |
| 2013/0182643 A1 | 7/2013 | Pazos et al. | |
| 2014/0019633 A1* | 1/2014 | Zhang | H04L 65/80 709/231 |
| 2014/0199044 A1 | 7/2014 | Gupta et al. | |
| 2015/0215369 A1 | 7/2015 | Yamagishi | |
| 2015/0327025 A1 | 11/2015 | Yamagishi | |
| 2016/0127440 A1* | 5/2016 | Gordon | H04N 21/23439 709/219 |
| 2016/0134680 A1 | 5/2016 | Yamagishi et al. | |
| 2016/0198012 A1* | 7/2016 | Fablet | H04L 67/26 709/231 |
| 2016/0205158 A1* | 7/2016 | Lo | H04L 65/00 709/219 |
| 2016/0337426 A1* | 11/2016 | Shribman | H04L 65/608 |
| 2016/0366488 A1* | 12/2016 | Long | H04N 21/2187 |
| 2017/0374122 A1* | 12/2017 | Zhang | H04N 21/4825 |
| 2018/0191803 A1* | 7/2018 | Turnbull | H04N 21/6587 |

OTHER PUBLICATIONS

Stockhammer, Technologies under Consideration for Dynamic Adaptive Streaming over HTTP 23009, parts 1, 3, 4, 5 and 6, International Organisation for Standardisation, Coding of Moving Pictures and Audio, Jul. 2017, pp. 1-90, ISO/IEC JTC1/SC29/WG11 MPEG2017/N16984, Torino, Italy.

3$^{rd}$ Generation Partnership Project; Technical Specification Group Services and System Aspects; Study on Server and Network-assisted Dynamic Adaptive Streaming over HTTP (DASH) (SAND) for 3GPP Multimedia Services (Release 14), 3GPP TR 26.957, Dec. 2016, pp. 1-52, vol. 2.0.0, 3GPP, Valbonne, France.

3$^{rd}$ Generation Partnership Project; Technical Specification Group Services and System Aspects; Packet-switched Streaming Service (PSS); Improved Support for Dynamic Adaptive Streaming over HTTP in 3GPP (Release 14), TR 26.938, Mar. 2017, pp. 1-98, vol. 14.0.0, 3GPP, Valbonne, France.

Dec. 5, 2019, European Search Report issued for related EP Application No. 18772589.0.

Stockhammer, CE-SNAD: Addressing 3GPP Use Case, International Organisation for Standardisation ISO/IEC JTC1/SC29/WG11, Feb. 2015, pp. 1-11, Geneva, Switzerland.

3$^{rd}$ Generation Partnership Project; Technical Specification Group Services and System Aspects; Multimedia Broadcast/Multicast Service (MBMS); Enhanced MBMS Operation (Release 12), 3GPP Draft; TR 26.848, Sep. 2013, pp. 1-26, vol. 0.5.1, 3GPP, Valbonne, France.

Information Technology-Dynamic adaptive streaming over HTTP (DASH)—Part 5: Server and network assisted DASH (SAND), ISO/IEC JTC 1/SC 29 N, Feb. 19, 2015, pp. 1-33.

ATSC Candidate Standard: ATSC 3.0 Interactive Content (A/344), ATSC, Dec. 29, 2016, pp. 1-76, Washington, D.C.

* cited by examiner

"ROI angle by broadcasting if possible" policy

| | | Broadcasting | | | Network | | | |
|---|---|---|---|---|---|---|---|---|
| Level[1] | 1 | Reserved or Other | All or ROI or NonROI | Base or Enhance | Reserved or Other | All or ROI or NonROI | Base or Enhance | |
| | | Reserved | All | Base | | | | |
| | | | | | Other | All | Base | 2 |
| | | | | | Reserved | ROI | Enhance | 3 |
| | | | | | Other | ROI | Enhance | 4 |
| | | | | | Reserved | NonROI | Enhance | 5 |
| | | | | | Other | NonROI | Enhance | 6 |
| Level[2] | 1 | Reserved or Other | All or ROI or NonROI | Base or Enhance | Reserved or Other | All or ROI or NonROI | Base or Enhance | |
| | | Reserved | All | Base | | | | |
| | | | | | Other | All | Base | 2 |
| | 3 | Reserved | ROI | Enhance | | | | |
| | | | | | Other | ROI | Enhance | 4 |
| | | | | | Reserved | NonROI | Enhance | 5 |
| | | | | | Other | NonROI | Enhance | 6 |
| Level[3] | 1 | Reserved or Other | All or ROI or NonROI | Base or Enhance | Reserved or Other | All or ROI or NonROI | Base or Enhance | |
| | | Reserved | All | Base | | | | |
| | 2 | Other | All | Base | | | | |
| | 3 | Reserved | ROI | Enhance | | | | |
| | | | | | Other | ROI | Enhance | 4 |
| | | | | | Reserved | NonROI | Enhance | 5 |
| | | | | | Other | NonROI | Enhance | 6 |
| Level[4] | 1 | Reserved or Other | All or ROI or NonROI | Base or Enhance | Reserved or Other | All or ROI or NonROI | Base or Enhance | |
| | | Reserved | All | Base | | | | |
| | 2 | Other | All | Base | | | | |
| | 3 | Reserved | ROI | Enhance | | | | |
| | 4 | Other | ROI | Enhance | | | | |
| | | | | | Reserved | NonROI | Enhance | 5 |
| | | | | | Other | NonROI | Enhance | 6 |

Direction in which broadcasting load increases

FIG.8

```
<MPD...>
 <Period>
  <DistributionPolicy
  tag='Character string identifying DistributionPolicy itself (unique in MPD)'
  numLevels='Level number indicating level (maximum value of level index)'
  policyDiscription='Character string indicating policy'>
   <Level index='One or more level indexes 'ASIDs='example of as-id belonging to this level (separated by ,)'/>
   <Level.../>
   ...
  </DistributionPolicy>
 </Period>
</MPD>
```

FIG. 12

```
<DistributionMediaDependantExtension maxLevelToBeApplied='Level index (indicates level up to which following element is to be added)'>
<ElementToBeAppended><![CDATA[<BaseURL>bcBroadcasting URL)</BaseURL>]]></ElementToBeAppended>
...
</DistributionMediaDependantExtension>
```

FIG.13

```
<MPD...>
 <Period>
 ...
  <DistributionPolicy
tag='1'
numLevels='3'
<Level index='1'ASIDs='AS-1'/>
<Level index='2'ASIDs='AS-2, AS-3'/>
<Level index='3'ASIDs='AS-4'/>
<DistributionMediaDependantExtension
maxLevelToBeApplied='2'>
<ElementToBeAppended><![CDATA[<BaseURL>/
bc</BaseURL>]]></ElementToBeAppended>
</DistributionMediaDependantExtension>
</DistributionPolicy>

<AdaptationSet id='AS-1'...>
...
</AdaptationSet>
<AdaptationSet id='AS-2'...>
...
</AdaptationSet>
<AdaptationSet id='AS-3'...>
...
</AdaptationSet>
<AdaptationSet id='AS-4'...>
...
</AdaptationSet>
...
</Period>
```

FIG.14

```
<MPD...>
 <Period>
<AdaptationSet id='AS-1'...>
<BaseURL>/bc</BaseURL>
  ...
</AdaptationSet>
<AdaptationSet id='AS-2'...>
<BaseURL>/bc</BaseURL>
  ...
</AdaptationSet>
<AdaptationSet id='AS-3'...>
<BaseURL>/bc</BaseURL>
  ...
</AdaptationSet>
<AdaptationSet id='AS-4'...>
  ...
</AdaptationSet>
</Period>
</MPD>
```

FIG.15

```
<MPD...>
<Period>
...
  <DistributionPolicy
  tag='1'
  numLevels='3'>
    <Level index='1' ASIDs='AS-1'/>
    <Level index='2' ASIDs='AS-2, AS-3'/>
    <Level index='3' ASIDs='AS-4'/>
    <DistributionMediaDependantExtension maxLevelToBeApplied='0'(Equivalent to case where there is no maxLevelToBeApplied attribute)>
    <ElementToBeAppended><![CDATA[<BaseURL>/b6</BaseURL>]]></ElementToBeAppended>
    </DistributionMediaDependantExtension>
  </DistributionPolicy>

<AdaptationSet id='AS-1' ...>
  ...
  </AdaptationSet>
...
</Period>
</MPD>
```

FIG.17

```
<MPD...>
  <Period>
<AdaptationSet id='AS-1'...>
...
</AdaptationSet>
<AdaptationSet id='AS-2'...>
...
</AdaptationSet>
<AdaptationSet id='AS-3'...>
...
</AdaptationSet>
<AdaptationSet id='AS-4'...>
  ...
</AdaptationSet>
</Period>
</MPD>
```

FIG.18

```
<MPD...>
 <Period>

<DistributionPolicy
tag='1'
numLevels='3'
policyDescription='ATSC BC resource assignment policy'>
<Level index='1' ASIDs='AS-1'/>
<Level index='2' ASIDs='AS-2,AS-3'/>
<Level index='3' ASIDs='AS-4'/>
<DistributionMediaDependantExtension>
<ElementToBeAppended><!CDATA[<BaseURL>/atscBc</BaseURL>]]></ElementToBeAppended>
</DistributionMediaDependantExtension>
</DistributionPolicy>

<DistributionPolicy
tag='2'
numLevels='2'
policyDescription='3GPP MBMS BC resource assignment policy'
<Level index='1' ASIDs='AS-1,AS-2'/>
<Level index='2' ASIDs='AS-3,AS-4'/>
<DistributionMediaDependantExtension>
<ElementToBeAppended><!CDATA[<BaseURL>/3gppBc</BaseURL>]]></ElementToBeAppended>
</DistributionMediaDependantExtension>
</DistributionPolicy>

<AdaptationSet id='AS-1'...>
...
</AdaptationSet>
<AdaptationSet id='AS-2'...>
...
</AdaptationSet>
<AdaptationSet id='AS-3'...>
...
</AdaptationSet>
<AdaptationSet id='AS-4'...>
...
</AdaptationSet>
</Period>
</MPD>
```

FIG.19

```
<MPD...>
 <Period>
<AdaptationSet id=' AS-1'...>
<BaseURL>/atscBc</BaseURL>
<BaseURL>/3gppBc</BaseURL>
 ...
</AdaptationSet>
<AdaptationSet id=' AS-2'...>
<BaseURL>/atscBc</BaseURL>
<BaseURL>/3gppBc</BaseURL>
 ...
</AdaptationSet>
<AdaptationSet id=' AS-3'...>
<BaseURL>/atscBc</BaseURL>
 ...
</AdaptationSet>
<AdaptationSet id=' AS-4'...>
</AdaptationSet>
 ...
</Period>
</MPD>
```

FIG.20

```
<MPD...>
<Period...>
<EventStream schemeIdUri='urn:xxx' timescale='1000'> --1/1000 seconds is designated as unit time of following presentationTime
  <Event presentationTime='0' duration='1000'>Event-related data-1</Event>  --Continue for 1000 unit time at firing time 0
  <Event presentationTime='1000' duration='4000'>Event-related data-2</Event>  --Continue for 4000 unit time at firing time 0
  ...
</EventStream>
...
<AdaptationSet>  -- Stream associated with above EventStream (Video, Audio, or the like)
</AdaptationSet>
...
</Period>
</MPD>
```

FIG.27

```
box_type='emsg'
scheme_id_uri = "urn:xxx"
value = 0
timescale = 1000
presentation_time_delta = 0
event_duration = 0xFFFF
id = 1
message_data[] = Event-related data -1
```

FIG.28

Policy/level notification by DASH Event

- EventStream@schemeIdUri
  — "urn:mpeg:dash:event:distributionPolicy"
- Event@messageData(emsg.message_data)
  — "tag, level"
    ○ Designate DistributionPolicy and Level applied at timing at which Event is enabled Example of emsg scheme_id_uri="urn:mpeg:dash:event:distributionPolicy"
value = 0x01
timescale = 1000
presentation_time_delta = 8000
event_duration = 0xFFFF
id = 12356789
message_data[] = "1, 2" …(tag value, level value)

FIG.30

```
<MPD...>
<Period...>
 <EventStream schemeIdUri='
urn:mpeg:dash:event:distributionPolicy'...>
  <Event...>tag value, level value</Event>
  ...
</EventStream>
 ...
 <AdaptationSet.../>
  ...
</Period>
</MPD>
```

FIG.31

```
box_type='emsg'
scheme_id_uri = "urn:mpeg:dash:event:distributionPolicy"
...
event_duration = 0xFFFF(Indefinite duration for indicating case where end time to apply distributionPolicy is not decided)
...
message_data[] = "tag value, level value"
```

FIG.32

```
<MPD...>
 <Period...>
  <AdaptationSet...>
   <Representation...>
    ...
    <InbandEventStream schemeIdUri='urn:mpeg:dash:event:distributionPolicy'.../>
    ...
   </Representation>
  </AdaptationSet>
  ...
 </Period>
</MPD>
```

FIG.33

```
MPD/Period
/DistributioPolicy @tag='t1'@numLevels='3'
  /Level @index='1'@ASID='AS-1'
  /Level @index='2'@ASID='AS-2'
  /Level @index='3'@ASID='AS-3'
  /AdaptationSet @id='AS-1'
  /AdaptationSet @id='AS-2'
  /AdaptationSet @id='AS-3'
```

```
MPD/Period
/DistributioPolicy @tag='t1'@numLevels='3'
  /Level @index='1'@ASID='AS-1'
  /Level @index='2'@ASID='AS-2'
  /Level @index='3'@ASID='AS-3'
  /DMDExtention/elementToBeAppended=" BaseURL='/bc' "
  /AdaptationSet @id='AS-1'
  /AdaptationSet @id='AS-2'
  /AdaptationSet @id='AS-3'
```

FIG.35

```
emsg.scheme_id_uri =
"urn:...:distributionPolicy"
...
emsg.message_data[] =
"t1,1"
```

↓

```
MPD'/Period
/AdaptationSet @id='AS-1'
  /BaseURL='/net'
  /BaseURL='/bc'
/AdaptationSet @id='AS-2'
  /BaseURL='/net'
/AdaptationSet @id='AS-3'
  /BaseURL='/net'
```

FIG.36

```
emsg.scheme_id_uri =
"urn:...:distributionPolicy"
...
emsg.message_data[] =
"t1,2"
```

↓

```
MPD"/Period
/AdaptationSet @id='AS-1'
  /BaseURL='/net'
  /BaseURL='/bc'
/AdaptationSet @id='AS-2'
  /BaseURL='/net'
  /BaseURL='/bc'
/AdaptationSet @id='AS-3'
  /BaseURL='/net'
```

FIG.37

```
MPD/Period
/DistributioPolicy @tag='tag-1'...
/AdaptationSet
 /BaseURL='/net'
 /Representation
  /InbandEventStream=
    "urn:...:distributionPolicy"
  /SegmentList/
    ...
  /SegmentURL(N-1)
    ...
```

FIG.40

```
emsg.scheme_id_uri =
"urn:...:distributionPolicy"
...
emsg.message_data[] =
"tag-1, level-1"

MPD/... (After reconfiguration)
/DistributioPolicy @tag='tag-1'...
 /AdaptationSet
  /BaseURL='/net'
  /BaseURL='/bc'
  /Representation
   /InbandEventStream=
     "urn:...:distributionPolicy"
   /SegmentList/
    SegmentURL(N)
    ...
    SegmentURL(M-1)
    ...
```

FIG.41

```
MPD/...
/DistributioPolicy @tag='tag-1'...
 /AdaptationSet
  /BaseURL='/net'
  /BaseURL='/bc'
  /Representation
   /InbandEventStream=
     "urn:...:distributionPolicy"
   /SegmentList/
    SegmentURL(N)
    ...
    SegmentURL(M-1)
    ...
```

FIG.42

```
emsg.scheme_id_uri =
"urn:...:distributionPolicy"
...
emsg.message_data[] =
"tag-1, level-0"

MPD/... (After reconfiguration)
/DistributioPolicy @tag='tag-1'...
 /AdaptationSet
  /BaseURL='/net'
  /Representation
   /InbandEventStream=
     "urn:...:distributionPolicy"
   /SegmentList/
    SegmentURL(M)
     ...
```

FIG.43

```
MPD/Period
/DistributionPolicy @tag= 'tag-1' @numLevel='n'
 /Level @index='1' @ASID= 'AS-1'
  ...
 /DMDEXtention/elementToBeAppended="BaseURL='No.2'"
/AdaptationSet @id='AS-1'
 /BaseURL='No.1'
 /Representation
  /InbandEventStream=
    "urn:...:distributionPolicy"
  /SegmentList/
   ...
  /SegmentURL(N-1)
   ...
```

FIG.46

```
emsg.scheme_id_uri =
"urn:...:distributionPolicy"
...
emsg.message_data[] =
"tag-1, level-1"

MPD/... (After reconfiguration)
/DistributionPolicy @tag='tag-1' @numLevel='n'
 /Level @index='1' @ASID='AS-1'
 ...
 /DMDEXtention/elementToBeAppended="BaseURL='No. 2'"
/AdaptationSet @id='AS-1'
  /BaseURL='No. 1'
  /BaseURL='No. 2'
  /Representation
   /InbandEventStream=
     "urn:...:distributionPolicy"
   /SegmentList/
    SegmentURL(N)
    ...
    SegmentURL(M-1)
    ...
```

FIG.47

```
MPD/···
/DistributionPolicy @tag='tag-1' @numLevel='n'
 /Level @index='1' @ASID='AS-1'
 ···
 /DMDEXtention/elementToBeAppended="BaseURL='No.2'"
/AdaptationSet @id= 'AS-1'
 /BaseURL='No.1'
 /BaseURL='No.2'
 /Representation
  /InbandEventStream=
    "urn:…:distributionPolicy"
  /SegmentList/
   SegmentURL(N)
   ···
  SegmentURL(M-1)
   ···
```

FIG.48

```
emsg.scheme_id_uri =
"urn:...:distributionPolicy"
...
emsg.message_data[] =
"tag-1, level-0"

MPD/...(After reconfiguration)
/DistributionPolicy @tag='tag-1' @numLevel='n'
 /Level @index='1' @ASID='AS-1'
 ...
 /DMDEXtention/elementToBeAppended="BaseURL='No. 2'"
/AdaptationSet @id='AS-1'
  /BaseURL='No. 1'
  /Representation
   /InbandEventStream=
      "urn:...:distributionPolicy"
   /SegmentList/
    SegmentURL(M)
     ...
```

FIG.49

```
<MPD...>
 <Period...>
  ...
  <DistributionPolicy
  tag='1'
  numLevels='3'
  policyDescription='ATSC BC resource assignment policy'>
  <Level index='1'ASIDs='AS-1'/>
  <Level index='2'ASIDs='AS-2,AS-3'/>
  <Level index='3'ASIDs='AS-4'/>
  <DistributionMediaDependantExtension>
  <ElementToBeAppended><![CDATA[<BaseURL>/atscBc</BaseURL>]]></ElementToBeAppended>
  </DistributionMediaDependantExtension>
  </DistributionPolicy>
  ...
  <DistributionPolicy
  tag='2'
  numLevels='2'
  policyDescription='3GPP MBMS BC resource assignment policy'
  <Level index='1'ASIDs='AS-1,AS-2'/>
  <Level index='2'ASIDs='AS-3,AS-4'/>
  <DistributionMediaDependantExtension>
  <ElementToBeAppended><![CDATA[<BaseURL>/3gppBc</BaseURL>]]></ElementToBeAppended>
  </DistributionMediaDependantExtension>
  </DistributionPolicy>
  ...
  <AdaptationSet id='AS-1'...>
   ...
  </AdaptationSet>
  <AdaptationSet id='AS-2'...>
   ...
  </AdaptationSet>
  <AdaptationSet id='AS-3'...>
   ...
  </AdaptationSet>
  <AdaptationSet id='AS-4'...>
   ...
  </AdaptationSet>
 </Period>
</MPD>
```

FIG.50

```
<MPD...>
 <Period...>
 ...
 <AdaptationSet id='AS-1'...>
 ...
 <SupplementalProperty schemeIdUri='urn:mpeg:dash:event:distributionPolicy' value="tag=1,
 level=1,policyDescription='ATSC BC resource assignment policy',
 attributeToBeAppended='<![CDATA[<BaseURL>/atscBc</BaseURL>]]>'"
 <SupplementalProperty schemeIdUri='urn:mpeg:dash:event:distributionPolicy' value="tag=2,
 level=1,policyDescription='3GPP MBMS BC resource assignment policy',
 attributeToBeAppended='<![CDATA[<BaseURL>/3gppBc</BaseURL>]]>'"
 ...
 <AdaptationSet id='AS-2'...>
 ...
 <SupplementalProperty schemeIdUri='urn:mpeg:dash:event:distributionPolicy' value="tag=1,
 level=2,policyDescription='ATSC BC resource assignment policy',
 attributeToBeAppended='<![CDATA[<BaseURL>/atscBc</BaseURL>]]>'"
 <SupplementalProperty schemeIdUri='urn:mpeg:dash:event:distributionPolicy' value="tag=2,
 level=1,policyDescription='3GPP MBMS BC resource assignment policy',
 attributeToBeAppended='<![CDATA[<BaseURL>/3gppBc</BaseURL>]]>'"
 ...
 </AdaptationSet>
 <AdaptationSet id='AS-3'...>
 ...
 <SupplementalProperty schemeIdUri='urn:mpeg:dash:event:distributionPolicy' value="tag=1,
 level=2,policyDescription='ATSC BC resource assignment policy',
 attributeToBeAppended='<![CDATA[<BaseURL>/atscBc</BaseURL>]]>'"
 <SupplementalProperty schemeIdUri='urn:mpeg:dash:event:distributionPolicy' value="tag=2,
 level=2,policyDescription='3GPP MBMS BC resource assignment policy',
 attributeToBeAppended='<![CDATA[<BaseURL>/3gppBc</BaseURL>]]>'"
 ...
 </AdaptationSet>
 <AdaptationSet id='AS-4'...>
 ...
 <SupplementalProperty schemeIdUri='urn:mpeg:dash:event:distributionPolicy' value="tag=1,
 level=3,policyDescription='ATSC BC resource assignment policy',
 attributeToBeAppended='<![CDATA[<BaseURL>/atscBc</BaseURL>]]>'"
 <SupplementalProperty schemeIdUri='urn:mpeg:dash:event:distributionPolicy' value="tag=2,
 level=2,policyDescription='3GPP MBMS BC resource assignment policy',
 attributeToBeAppended='<![CDATA[<BaseURL>/3gppBc</BaseURL>]]>'"
 ...
 </AdaptationSet>
 </Period>
</MPD>
```

FIG.51

```
POST /path/to/messages HTTP/1.1
Host: target_dane.some_domain.com
Content-Type:application/sand+xml;charset="utf-8"
Content-Length: 248
[...]
<?xml version="1.0" encoding="UTF-8"?>
<MPDUpdateDirective messageId="1234" ...
```

FIG.57

```
MPD/...
/DistributionPolicy @tag='tag-1' @numLevel='n'
 /Level @index='1' @ASID='AS-1'
 ...
 /DMDEXtention/elementToBeAppended="BaseURL='/bc'"
/AdaptationSet @id='AS-1'
  /BaseURL='/net'
  /Representation
   /SegmentList/
   ...
   SegmentURL(N-1)
   ...
```

FIG.64

```
MPDUpdateDirective ...
 /DistributionPolicyChange PolicyReference='tag-1'
 /LevelChange level='1'
```

FIG.65

```
MPD/... (After reconfiguration)
/DistributionPolicy @tag='tag-1' @numLevel='n'
 /Level @index='1' @ASID='AS-1'
 ...
 /DMDEXtention/elementToBeAppended="BaseURL='/bc'"
/AdaptationSet @id='AS-1'
  /BaseURL='/net'
  /BaseURL='/bc'
  /Representation
   /SegmentList/
    SegmentURL(N)
    ...
    SegmentURL(M-1)
    ...
```

FIG.66

```
MPD/... (After reconfiguration)
/DistributionPolicy @tag='tag-1' @numLevel='n'
 /Level @index='1' @ASID='AS-1'
 ...
 /DMDEXtention/elementToBeAppended="BaseURL='/bc'"
/AdaptationSet @id='AS-1'
  /BaseURL='/net'
  /BaseURL='/bc'
  /Representation
   /SegmentList/
    SegmentURL(N)
    ...
    SegmentURL(M-1)
    ...
```

FIG.67

```
MPDUpdateDirective ...
  /DistributionPolicyChange PolicyReference='tag-1'
  /LevelChange level='0'
```

FIG.68

```
MPD/...(After reconfiguration)
/DistributionPolicy @tag='tag-1' @numLevel='n'
 /Level @index='1' @ASID='AS-1'
 ...
 /DMDEXtention/elementToBeAppended="BaseURL='/bc'"
/AdaptationSet @id='AS-1'
  /BaseURL='/net'
  /Representation
  /SegmentList/
   SegmentURL(M)
   ...
```

FIG.69

```
MPD/...
/DistributionPolicy @tag='tag-1' @numLevel='n'
 /Level @index='1' @ASID='AS-1'
  ...
 /DMDEXtention/elementToBeAppended="BaseURL='/bc'"
/AdaptationSet @id='AS-1'
 /BaseURL='/net'
 /Representation
  /SegmentList/
   ...
   SegmentURL(N-1)
   ...
```

FIG.77

```
MPD/... (After reconfiguration)
/DistributionPolicy @tag='tag-1' @numLevel='n'
 /Level @index='1' @ASID='AS-1'
  ...
 /DMDEXtention/elementToBeAppended="BaseURL='/bc'"
/AdaptationSet @id='AS-1'
 /BaseURL='/net'
 /BaseURL='/bc'
 /Representation
  /SegmentList/
   SegmentURL(N)
   ...
   SegmentURL(M-1)
   ...
```

FIG.78

```
MPD/... (After reconfiguration)
/DistributionPolicy @tag='tag-1' @numLevel='n'
 /Level @index='1' @ASID='AS-1'
  ...
 /DMDEXtention/elementToBeAppended="BaseURL='/bc'"
/AdaptationSet @id='AS-1'
  /BaseURL='/net'
  /BaseURL='/bc'
  /Representation
   /SegmentList/
    SegmentURL (N)
    ...
    SegmentURL (M-1)
    ...
```

FIG.79

```
MPD/... (After reconfiguration)
/DistributionPolicy @tag='tag-1' @numLevel='n'
 /Level @index='1' @ASID='AS-1'
  ...
 /DMDEXtention/elementToBeAppended="BaseURL='/bc'"
/AdaptationSet @id='AS-1'
  /BaseURL='/net'
  /Representation
   /SegmentList/
    SegmentURL (M)
    ...
```

FIG.80

Case of "one with low delay constraint by network"

- MPD/Period/DistributionPolicy
  — Tag: "3"
  — PolicyDescription: "One with high delay constraint to broadcasting"
  — NumLevels: "3"
  — Level[1].AdaptationSetIDs: "Example of as-id belonging to this level"
    · LatencyLimit = '100msec'
  — Level[2].AdaptationSetIDs: "Example of as-id belonging to this level"
    · LatencyLimit = '50msec'
  — Level[3].AdaptationSetIDs: "Example of as-id belonging to this level"
    · LatencyLimit = '10msec'
  — DistributionMediaDependantExtension-optional
    • AttributeToBeRemoved: "baseURL = '/bc'(URL for broadcasting or the like)"
      — Element to be deleted from corresponding AdaptationSet
    • AttributeToBeAppended: "baseURL = '/net' (URL for network or the like)"
      — Element to be added to corresponding AdaptationSet

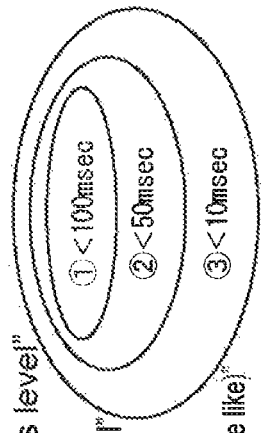

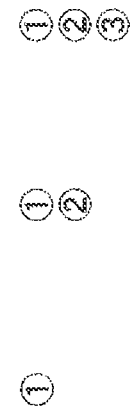

← Network load decrease direction (broadcasting load increase direction)
Network load increase direction (broadcasting load decrease direction) →

FIG.81

```
<MPD...>
 <Period>
 ...
  <DistributionPolicy
  tag='3'
  numLevels='3'
   <Level index='1' ASIDs='AS-1' LatencyLimit='100msec' />
   <Level index='2' ASIDs='AS-2' LatencyLimit='50msec' />
   <Level index='3' ASIDs='AS-3' LatencyLimit='10msec' />
   <DistributionMediaDependantExtension maxLevelToBeApplied='2' (Add (delete) extension elements to (from) following AS contained in Level 1 and 2) >
    <ElementToBeRemoved><![CDATA[<BaseURL>bc</BaseURL>]]></ElementToBeRemoved>
    <ElementToBeAppended><![CDATA[<BaseURL>net</BaseURL>]]></ElementToBeAppended>
   </DistributionMediaDependantExtension>
  </DistributionPolicy>

<AdaptationSet id='AS-1' ...>
   <BaseURL>bc</BaseURL>
  </AdaptationSet>
  <AdaptationSet id='AS-2' ...>
   <BaseURL>bc</BaseURL>
  </AdaptationSet>
  ...
  </AdaptationSet>
  <AdaptationSet id='AS-3' ...>
   <BaseURL>bc</BaseURL>
  </AdaptationSet>
  ...
 </Period>
</MPD>
```

FIG.82

```
<MPD...>
 <Period>
 ...
<AdaptationSet id='AS-1'...>
 <BaseURL>/net</BaseURL>
 ...
</AdaptationSet>
<AdaptationSet id='AS-2'...>
<BaseURL>/net</BaseURL>
 ...
</AdaptationSet>
<AdaptationSet id='AS-3'...>
<BaseURL>/bc</BaseURL>
 ...
</AdaptationSet>
...
</Period>
</MPD>
```

FIG.83

| Element or Attribute Name | Use | Description |
|---|---|---|
| SegmentPopularityTimeline | | Specify popularity rate for original segment sequence |
| @source | CM | Any one of followings is designated as value representing provision source or type of popularity<br>Predicted popularity provided by content provider<br>Popularity provided by delivery network such as value based on past viewing history statistics of user<br>Others<br>Necessarily designated in case where certain element (AdaptationSet or Representation) has two or more SegmentPopularityTimeline elements |
| SP | 1. N | Element having popularity (rate) value |
| @rate | M | Popularity is designated by integer from 1 to 100.<br>Level 1 has highest popularity, and popularity decreases as number increases. |
| @start | O | Segment number of first Segment among series of segments to which rate value of SP element is applied |
| @r | O | Number of series of subsequent segments to which @rate designated by SP element is applied (first segment in which @rate is designated is not included). |

Legend:
For attributes: M=Mandatory, O=Optional, OD=Optional with Default Value, CM=Conditionally Mandatory.
For elements: <minOccurs>. <maxOccurs> (N=unbounded)
Elements are bold; attributes are non-bold and preceded with an @.

FIG.88

```
<Period>
  <BaseURL> http://cdn1.example.com/</BaseURL>
  <AdaptationSet mimeType="video/mp4" codecs="avc1.4D401F" frameRate="30000/1001" segmentAlignment="true" startWithSAP="1">
    <BaseURL>video/</BaseURL>
    <SegmentTemplate timescale="90000" initialization="$Bandwidth$/init.mp4v" media="$Bandwidth$/$Time$.mp4v">
      <SegmentTimeline> <S t="0" d="180180" r="5"/> </SegmentTimeline>
    </SegmentTemplate>
    <SegmentPopularityTimeline source="content">
      <SP rate="50" start="0" r="1"/>
      <SP rate="30" r="1"/>
      <SP rate="10" r="4"/>
    </SegmentPopularityTimeline>
    <SegmentPopularityTimeline source="network">
      <SP rate="10" start="0" r="1"/>
      <SP rate="50" r="1"/>
      <SP rate="70" r="2"/>
    </SegmentPopularityTimeline>
    <Representation id="v0" width="320" height="240" bandwidth="250000"/>
    <Representation id="v1" width="640" height="480" bandwidth="500000"/>
    <Representation id="v2" width="960" height="720" bandwidth="1000000"/>
  </AdaptationSet>
  <AdaptationSet ... >
  <!-- AdaptationSet including Representations of other viewpoints -->
  </AdaptationSet>
  ...
</period>
```

FIG.89

| Element or Attribute Name | Use | Description |
|---|---|---|
| SegmentPopularityTimeline | | Specify popularity rate for original segment sequence |
| @source | CM | Any one of followings is designated as value representing provision source or type of popularity<br>Predicted popularity provided by content provider<br>Popularity provided by delivery network such as value based on past viewing history statistics of user<br>Others<br>Necessarily designated in case where certain element (AdaptationSet or Representation) has two or more SegmentPopularityTimeline elements |
| SP | 1..N | Element having popularity (rate) value |
| @rate | M | Popularity is designated by integer from 1 to 100. |
| @start_time | O | Start time (media time) to which rate value of SP element is applied is described on basis of timescale applied to AdaptationSet.<br>In case where omitted, applicable start time is end_time designated in previous SP element or start time of Period |
| @end_time | O | End time (media time) to which rate value of SP element is applied is described on the basis of timescale applied to AdaptationSet.<br>In case where omitted, applicable end time is end time of Period |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG.90

```
<Period>
  <BaseURL> http://cdn1.example.com/</BaseURL>
  <AdaptationSet mimeType="video/mp4" codecs="avc1.4D401F" frameRate="30000/1001" segmentAlignment="true" startWithSAP="1">
    <BaseURL>video/</BaseURL>
    <SegmentTemplate timescale="90000" initialization="$Bandwidth$/init.mp4v" media="$Bandwidth$/$Time$.mp4v">
      <SegmentTimeline> <S t="0" d="180180" r="5"/> </SegmentTimeline>
    </SegmentTemplate>
    <SegmentPopularityTimeline source="content">
      <SP rate="50" end_time="270270"/>
      <SP rate="30" end_time="540540"/>
      <SP rate="10" end_time="1801180"/>
    </SegmentPopularityTimeline>
    <SegmentPopularityTimeline source="network">
      <SP rate="10" start_time="0" end_time="315000"/>
      <SP rate="50" end_time="630000"/>
      <SP rate="70"/>
    </SegmentPopularityTimeline>
    <Representation id="v0" width="320" height="240" bandwidth="250000"/>
    <Representation id="v1" width="640" height="480" bandwidth="500000"/>
    <Representation id="v2" width="960" height="720" bandwidth="1000000"/>
  </AdaptationSet>
  <AdaptationSet>
  <!-- AdaptationSet including Representations of other viewpoints -->
  </AdaptationSet>
  :
</period>
```

FIG.91

```
<Period>
  <BaseURL> http://cdn1.example.com/</BaseURL>
  <AdaptationSet mimeType="video/mp4" codecs="avc1.4D401F" frameRate="30000/1001" segmentAlignment="true" startWithSAP="1">
    <BaseURL>video/</BaseURL>
    <SegmentTemplate timescale="90000" initialization="$Bandwidth$/init.mp4v" media="$Bandwidth$/$Time$.mp4v">
      <SegmentTimeline> <S t="0" d="180180" r="5"/> </SegmentTimeline>
    </SegmentTemplate>
    <SegmentPopularityTimeline source="content">
      <SP rate="50" start="0" r="1"/>
      <SP rate="30" r="1"/>
      <SP rate="10" r="1"/>
    </SegmentPopularityTimeline>
    <Representation id="v0" width="320" height="240" bandwidth="250000">
      <SegmentPopularityTimeline source="network" >
        <SP rate="30" start="0" r="1"/>
        <SP rate="70" r="1"/>
        <SP rate="90" r="2"/>
      </SegmentPopularityTimeline>
    </Representation>
    <Representation id="v1" width="640" height="480" bandwidth="500000">
      <SegmentPopularityTimeline source="network">
        <SP rate="10" start="0" r="1"/>
        <SP rate="60" r="1"/>
        <SP rate="70" r="2"/>
      </SegmentPopularityTimeline>
    </Representation>
    <Representation id="v2" width="960" height="720" bandwidth="1000000">
      <SegmentPopularityTimeline source="network">
        <SP rate="20" start="0" r="1"/>
        <SP rate="50" r="1"/>
        <SP rate="80" r="2"/>
      </SegmentPopularityTimeline>
    </Representation>
  </AdaptationSet>
  <!-- AdaptationSet including Representations of other viewpoints -->
  </AdaptationSet>
  ...
</Period>
```

FIG.92

```
<MPD ...>
  <Period>
    <DistributionPolicy tag='2' numLevels='3'>
      <Level index='1' ASIDs='AS-1'/>
      <Level index='2' ASIDs='AS-2,AS-3'/>
      <Level index='3' ASIDs='AS-4'/>
      <DistributionMediaDependantExtention maxLevelToBeApplied='2'>
        <ElementToBeAppended><![CDATA[<BaseURL>/bc</BaseURL>]]
        </ElementToBeAppended>
      </DistributionMediaDependantExtention>
    </DistributionPolicy>
    <AdaptationSet id='AS-1' ... >
    ...
    </AdaptationSet>
    <AdaptationSet id='AS-2' ... >
    ...
    </AdaptationSet>
    <AdaptationSet id='AS-3' ... >
    ...
    </AdaptationSet>
    <AdaptationSet id='AS-4' ... >
    ...
    </AdaptationSet>
  </Period>
</MPD>
```

FIG.93

| Element or Attribute Name | Use | Description |
|---|---|---|
| DPLevelTimeline | | Describe Level of DistributionPolicy changing with time |
| Level | 1..N | Designate Level of DistributionPolicy of each interval |
| @index_ASIDs | M | Index value representing priority (or "popularity") applied to element interval of corresponding Level and AdaptationSet@id to which it is applied are delimited by comma (",") and listed |
| @start_time | O | Start time (media time) to which Level element is applied is described in units of seconds. In case where omitted, applicable start time is end_time designated in previous Level element or start time of Period |
| @end_time | O | End time (media time) to which Level element is applied is described in units of seconds. In case where omitted, applicable end time is end time of Period |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG.94

```
<MPD ...>
 <Period>
  <DistributionPolicy tag='2' numLevels='3'>
   <DPLevelTimeline index='1'>
    <Level end_time="2.002" index_ASIDs='1,AS-1'  index_ASIDs='2,AS-2,AS-3'  index_ASIDs='3,AS-4' />
    <Level end_time ='6.006' index_ASIDs='1,AS-2'  index_ASIDs='2,AS-1,AS-3'  index_ASIDs='3,AS-4' />
    <Level end_time ='12.012' index_ASIDs='1,AS-1'  index_ASIDs='2,AS-2,AS-4'  index_ASIDs='3,AS-3' />
   </DPLevelTimeline>
   <DistributionMediaDependantExtention maxLevelToBeApplied='2'>
    <ElementToBeAppended>
     <![CDATA[<BaseURL>/bc</BaseURL>]]
    </ElementToBeAppended>
   </DistributionMediaDependantExtention>
  </DistributionPolicy>
  <AdaptationSet id='AS-1' ... >
  ...
  </AdaptationSet>
  <AdaptationSet id='AS-2' ... >
  ...
  </AdaptationSet>
  <AdaptationSet id='AS-3' ... >
  ...
  </AdaptationSet>
  <AdaptationSet id='AS-4' ... >
  ...
  </AdaptationSet>
 </Period>
</MPD>
```

FIG.95

```
<CommonEnvelope>
<SANDmessage messageId="23">
    <PopularityRateSource source="content"/>
</SANDmessage>
</CommonEnvelope>
```

FIG.100

```
<CommonEnvelope>
<SANDmessage messageId="23">
    <PopularityRateSource source="content"/>
    <PopularityRateSource source="network"/>
</SANDmessage>
</CommonEnvelope>
```

FIG.101

CONTENT PRESENTATION SYSTEM AND CONTENT PRESENTATION METHOD, AND PROGRAM

CROSS REFERENCE TO PRIOR APPLICATION

This application is a National Stage Patent Application of PCT International Patent Application No. PCT/JP2018/009912 (filed on Mar. 14, 2018) under 35 U.S.C. § 371, which claims priority to Japanese Patent Application Nos. 2017-060220 (filed on Mar. 24, 2017) and 2017-201130 (filed on Oct. 17, 2017), which are all hereby incorporated by reference in their entirety.

TECHNICAL FIELD

The present disclosure relates to a content presentation system, a content presentation method, and a program, and more particularly to a content presentation system, a content presentation method, and a program which are capable of optimizing and streamlining allocation of a plurality of transport media.

BACKGROUND ART

As the flow of standardization in Internet streaming such as Internet protocol television (IPTV), standardization of a method applied to video on demand (VOD) streaming by hypertext transfer protocol (HTTP) streaming or live streaming is being performed.

In particular, moving picture experts group dynamic adaptive streaming over HTTP (MPEG-DASH) standardized in ISO/IEC/MPEG has attracted attention (see, for example, Non-Patent Literature 1).

Further, in MPEG DASH, a status message by which a proxy or a CDN edge server notifies a client of a cache status (availability) of a DASH segment is defined in server and network assisted DASH (SAND) (see, for example, Non-Patent Literature 2).

CITATION LIST

Non-Patent Literature

Non-Patent Literature 1: ISO/IEC 23009-1:2012 Information technology Dynamic adaptive streaming over HTTP (DASH)
Non-Patent Literature 2: ISO/IEC JTC 1/SC 29/WG 11, Information Technology—Dynamic adaptive streaming over HTTP (DASH)—Part 5: Server and network assisted DASH (SAND), FDIS ISO/IEC 23009-5, N15991, 2015 Feb. 19

DISCLOSURE OF INVENTION

Technical Problem

By the way, in MPEG DASH, DASH streaming (for example, streams with different transport characteristics such as different bit rates) can be allocated to a plurality of transport media. For example, in MPEG DASH, it is assumed that DASH streaming is allocated to broadcasts such as ATSC and 3GPP-MBMS and a bidirectional delivery medium. Thus, when DASH streaming is allocated to a plurality of transport media, it is required to optimize and streamline allocation more reliably.

The present disclosure was made in light of the foregoing, and is able to optimize and streamline allocation of a plurality of transport media.

Solution to Problem

A content presentation system of a first aspect of the present disclosure includes a content delivery apparatus that delivers content to a client that reproduces the content using a plurality of networks with different transport characteristics and a content providing apparatus that provides the content delivery apparatus with a policy serving as a determination criterion when delivery of each of streams is distributed by the plurality of networks when the content constituted by a plurality of streams with different characteristics.

A content presentation method of the first aspect of the present includes delivering, by a content presentation system, content to a client that reproduces the content using a plurality of networks with different transport characteristics and providing, by the content presentation system, a policy serving as a determination criterion when delivery of each of streams is distributed by the plurality of networks when the content constituted by a plurality of streams with different characteristics.

A program of the first aspect of the present disclosure causing a computer of a content presentation system to execute a process including delivering content to a client that reproduces the content using a plurality of networks with different transport characteristics and providing a policy serving as a determination criterion when delivery of each of streams is distributed by the plurality of networks when the content constituted by a plurality of streams with different characteristics.

In the first aspect of the present disclosure, content is delivered to the client that reproduces the content using a plurality of networks with different transport characteristics. Further, a policy serving as a determination criterion when delivery of each of streams is distributed by the plurality of networks is provided when the content constituted by a plurality of streams with different characteristics.

A content presentation system of a second aspect of the present disclosure a server that constitutes a content delivery network and a client apparatus that is provided with content delivered via the content delivery network, in which the server or the client apparatus pre-fetches, with reference to metadata in which priorities provided from a plurality of provision sources are described to change with time, a segment constituting the content in a descending order of the priorities.

A content presentation method of the second aspect of the present disclosure is performed in a content presentation system including a server that constitutes a content delivery network and a client apparatus that is provided with content delivered via the content delivery network, and includes pre-fetching, by the server or the client apparatus, with reference to metadata in which priorities provided from a plurality of provision sources are described to change with time, a segment constituting the content in a descending order of the priorities.

A program of the second aspect of the present disclosure causes a computer of a content presentation system including a server that constitutes a content delivery network and a client apparatus that is provided with content delivered via the content delivery network to execute pre-fetching, by the server or the client apparatus, with reference to metadata in which priorities provided from a plurality of provision sources are described to change with time, a segment constituting the content in a descending order of the priorities.

In the second aspect of the present disclosure, the server or the client apparatus pre-fetches, with reference to metadata in which priorities provided from a plurality of provision sources are described to change with time, a segment constituting the content in a descending order of the priorities.

Advantageous Effects of Invention

According to the first aspect of the present disclosure, it is possible to optimize and streamline allocation of a plurality of transport media. According to the second aspect of the present disclosure, it is possible to reduce delay in data delivery of segment.

BRIEF DESCRIPTION OF DRAWINGS

FIG. 8 is a diagram illustrating an example of allocation in a case where a ROI angle view is pushed by broadcasting if possible.

FIG. 12 is a diagram illustrating an example of XML representation of DistributionPolicy in a case where it is described in an MPD.

FIG. 13 is a diagram for describing an optional DistributionMediaDependantExtension element.

FIG. 14 is a diagram illustrating a description example of an MPD.

FIG. 15 is a diagram illustrating a valid MPD to be generated from an MPD illustrated in FIG. 14.

FIG. 17 is a diagram illustrating a description example of an MPD.

FIG. 18 is a diagram illustrating a valid MPD to be generated from an MPD illustrated in FIG. 17.

FIG. 19 is a diagram illustrating a description example of an MPD.

FIG. 20 is a diagram illustrating a valid MPD to be generated from an MPD illustrated in FIG. 19.

FIG. 27 is a diagram illustrating an example of a general MPD Event.

FIG. 28 is a diagram illustrating an example of In-band Event signaling.

FIG. 30 is a diagram illustrating an example of a policy/level notification by a DASH Event.

FIG. 31 is a diagram illustrating a description example of an MPD.

FIG. 32 is a diagram illustrating a description example of an emsg box.

FIG. 33 is a diagram illustrating a description example of an MPD.

FIG. 35 is a diagram illustrating an MPD which can be reconfigured on a client side.

FIG. 36 is a diagram illustrating an MPD generated by a client.

FIG. 37 is a diagram illustrating an MPD generated by a client.

FIG. 40 is a diagram illustrating an example of an MPD parsed by a client.

FIG. 41 is a diagram illustrating an example of an In-band Event detected by a client and a reconfigured MPD.

FIG. 42 is a diagram illustrating an example of an MPD parsed by a client.

FIG. 43 is a diagram illustrating an example of an In-band Event detected by a client and a reconfigured MPD.

FIG. 46 is a diagram illustrating an example of an MPD parsed by a client.

FIG. 47 is a diagram illustrating an example of an In-band Event detected by a client and a reconfigured MPD.

FIG. 48 is a diagram illustrating an example of an MPD parsed by a client.

FIG. 49 is a diagram illustrating an example of an In-band Event detected by a client and a reconfigured MPD.

FIG. 50 is a diagram illustrating a variation of MPD extension.

FIG. 51 is a diagram illustrating a variation of MPD extension.

FIG. 57 is a diagram illustrating an example of an MPDUpdateDirective message.

FIG. 64 is a diagram illustrating an example of an MPD parsed by a client.

FIG. 65 is a diagram illustrating an example of MPDUpdateDirective.

FIG. 66 is a diagram illustrating an example of an MPD reconfigured by the client.

FIG. 67 is a diagram illustrating an example of an MPD parsed by a client.

FIG. 68 is a diagram illustrating an example of MPDUpdateDirective.

FIG. 69 is a diagram illustrating an example of an MPD reconfigured by a client.

FIG. 77 is a diagram illustrating an example of an MPD parsed by a client.

FIG. 78 is a diagram illustrating an example of an MPD reconfigured by a client.

FIG. 79 is a diagram illustrating an example of an MPD reconfigured by a client.

FIG. 80 is a diagram illustrating an example of an MPD reconfigured by a client.

FIG. 81 is a diagram illustrating content of a DistributionPolicy element representing an example of allocation in a case where one with a low delay constraint is delivered via a network.

FIG. 82 is a diagram illustrating a description example of an MPD.

FIG. 83 illustrates a valid MPD to be generated from an MPD illustrated in FIG. 82.

FIG. 88 is a diagram illustrating an example of a definition of an element of a segment popularity timeline.

FIG. 89 is a diagram illustrating an example of an MPD of MPEG DASH using an element of a segment popularity timeline.

FIG. 90 is a diagram illustrating a first variation of an element of a segment popularity timeline.

FIG. 91 is a diagram illustrating an example of an MPD of MPEG DASH using the element of the segment popularity timeline of the first variation.

FIG. 92 is a diagram illustrating an example of an MPD of MPEG DASH using the element of the segment popularity timeline of the second variation.

FIG. 93 is a diagram for describing a third variation of an element of a segment popularity timeline.

FIG. 94 is a diagram illustrating an example in which an element of a level in an element of a distribution policy is replaced with an element of a DP level timeline.

FIG. 95 is a diagram illustrating a description example of a distribution policy of a third variation.

FIG. 100 is a diagram illustrating a description example of a SAND message.

FIG. 101 is a diagram illustrating a description example of a plurality of SAND messages listed in priority order.

MODE(S) FOR CARRYING OUT THE INVENTION

Hereinafter, exemplary embodiment to which the present technology is applied will be described in detail below with reference to the appended drawings.

<Infinite Seating>

First, a concept of infinite seating (Infinite seating) realized by a content delivery method to which the present technology is applied will be described with reference to FIG. 1.

From an upsurge in virtual reality (VR), there is a need for a technique of supporting use cases capable of providing an infinite seating service on the basis of VR.

For example, in broadcasting or multicasting of a sport event, a concert, a game show, a television show, or the like, it is possible to make a difference in a price for providing a 360° view from a plurality of specific seats (locations) between a priority seat and the other seats. Then, the user can choose an arbitrary seat from among a plurality of priority seats and other seats and view content or switch those seats freely.

Figure 1:
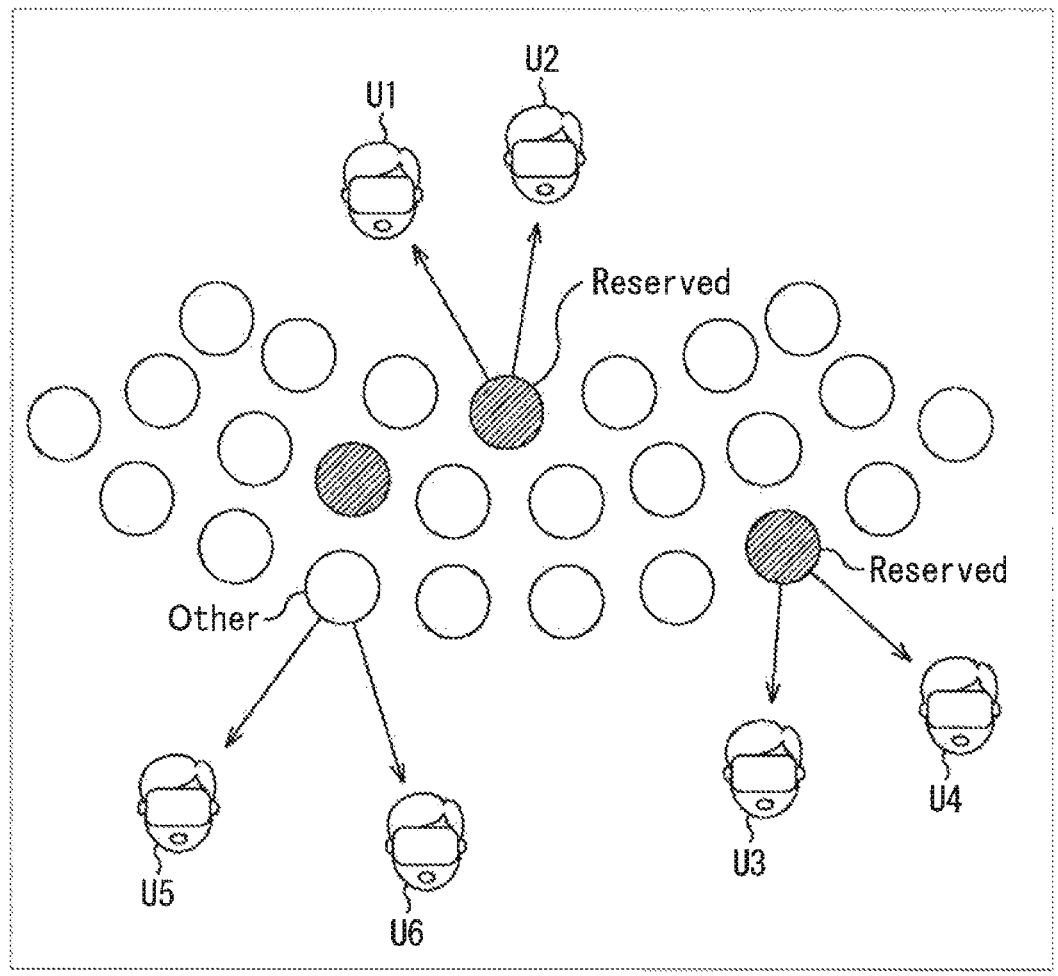
FIG. 1 is a diagram for describing a concept of infinite seating.

For example, in the example illustrated in FIG. 1, hatched circles represent the priority seats (Reserved), and unhatched circles represent the other seats (Other). Further, a plurality of users can view content of a 360° view from an arbitrary seat, and for example, in the example of FIG. 1, a user U1 and a user U2 are viewing content of a 360° view from the same priority seat. Further, users U3 and U4 are viewing content of a 360° view from other priority seats, and users U5 and U6 are viewing content of a 360° view from the other seats.

An image of a system that provides a service to which such a use case of the infinite seating is applied will be described with reference to FIG. 2.

Figure 2:
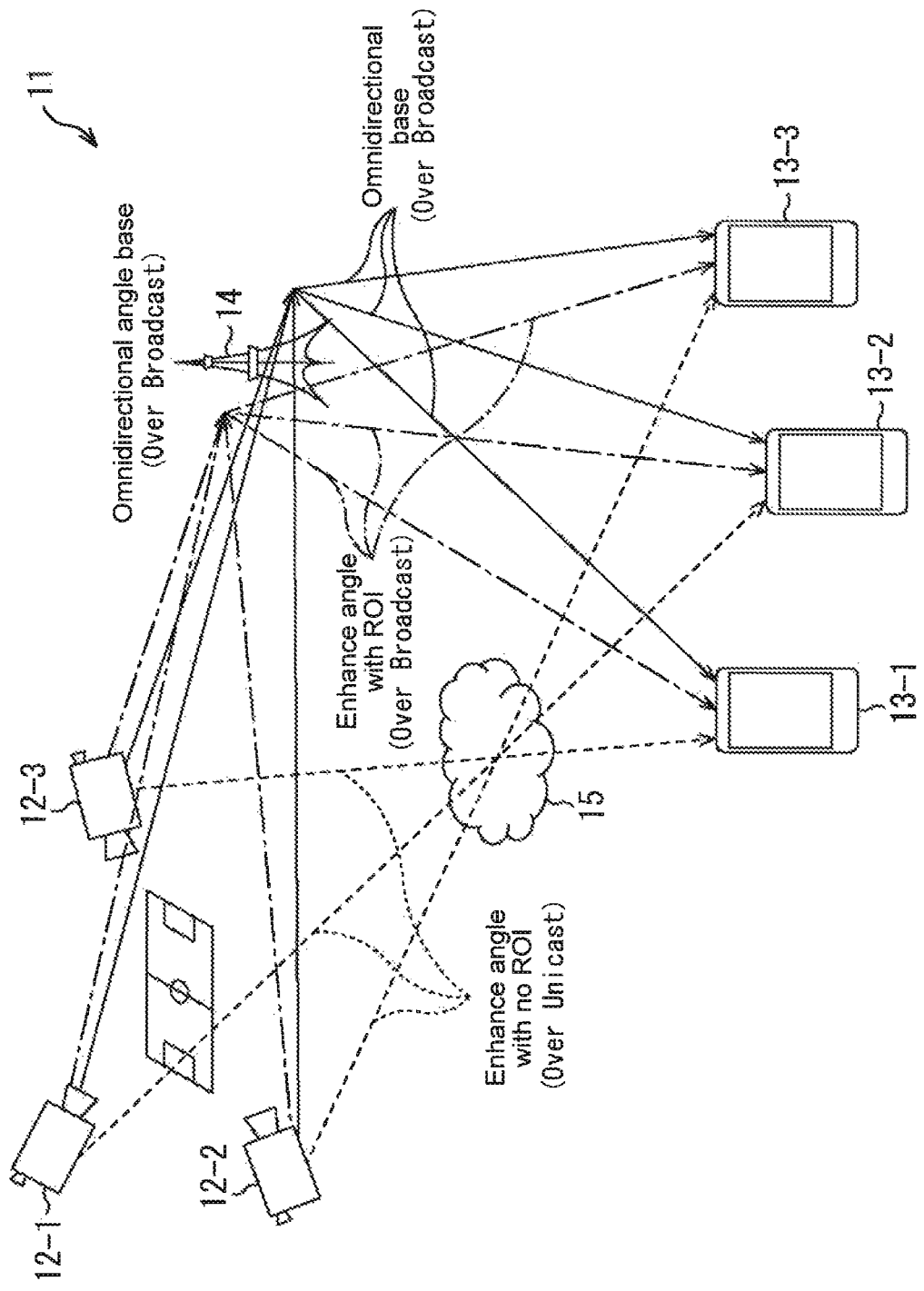
FIG. 2 is a diagram for describing an image of a service that provides infinite seating.

A content presentation system 11 illustrated in FIG. 2 is configured so that content is delivered from omnidirectional cameras 12-1 to 12-3 to clients 13-1 to 13-3 via a broadcasting network 14 and a bidirectional network 15. Then, the content presentation system 11 can provide a service for delivering a stadium recording stream such as, for example, a multi-field event relay.

In such content presentation system 11, in order to provide a comfortable VR viewing experience, a necessary area is clipped from an omnidirectional view of a seat currently tentatively selected by the user when there is a change in a viewing angle of the user. Then, in order to secure low latency and display continuity, a method of displaying the clipped area following the change in the angle and switching to a high-resolution view of the viewing angle and displaying it if the viewing angle of the user is decided is used.

Then, in order to realize such service provision, the omnidirectional camera 12 is installed in a plurality of seats, and an omnidirectional view which can be viewed from each seat and a high-resolution view of each angle are streamed. Further, the user can view content using the client 13. For example, a form in which a VR client installed in a head mount display (HMD) is used is assumed for viewing of content by the user.

By the way, in a case where there are no limitations on a delivery cost, delivering all omnidirectional view streams and all angle view streams via the broadcasting network 14 in which a quality of service (QoS) such as a bit rate and a delay is guaranteed is considered. However, performing such a delivery is not realistic because the delivery cost is too high.

Therefore, for example, it is desirable to perform push-type delivery for an omnidirectional view stream of a seat assumed to be selected by a relatively large number of viewers via the broadcasting network 14 and to perform pull-type delivery for other streams via the bidirectional network 15. Alternatively, in a case where there is room for the delivery cost, in addition to the omnidirectional view stream, the push type delivery may be performed for only a region of interest (ROI) high resolution angle view stream which is likely to be viewed by the viewer via the broadcasting network 14. Further, in a case where the popularity of the seat selected by the user is not known, the push-type delivery may be performed for the omnidirectional streams of all the seats via the broadcasting network 14. It is realistic to perform such various combinations, level classification, or the like.

As described above, in a case where delivery is performed via a plurality of networks (transport mediums) with different delivery costs, a plurality of transport media is allocated in accordance with the cost of the delivery medium. For example, in a 3GPP-MBMS platform, it is possible to flexibly allocate a bandwidth configuration of each of broadcast and bidirectional networks for each cell. By the way, when streams are allocated to a plurality of transport media as described above, a priority for performing allocation preferentially is used as hint information to carry out such combinations optimally and efficiently. However, such hint information is usually comprehended only by a content provider.

Further, it is expected that a form in which a group of service streams provided from the content provider is delivered via a service provider (a content delivery network (CDN) provider) having a plurality of transport media is likely to be generalized in the future. Therefore, it is expected that the need for the hint information for optimizing and streamlining such resource allocation is likely to increase.

Figure 3:
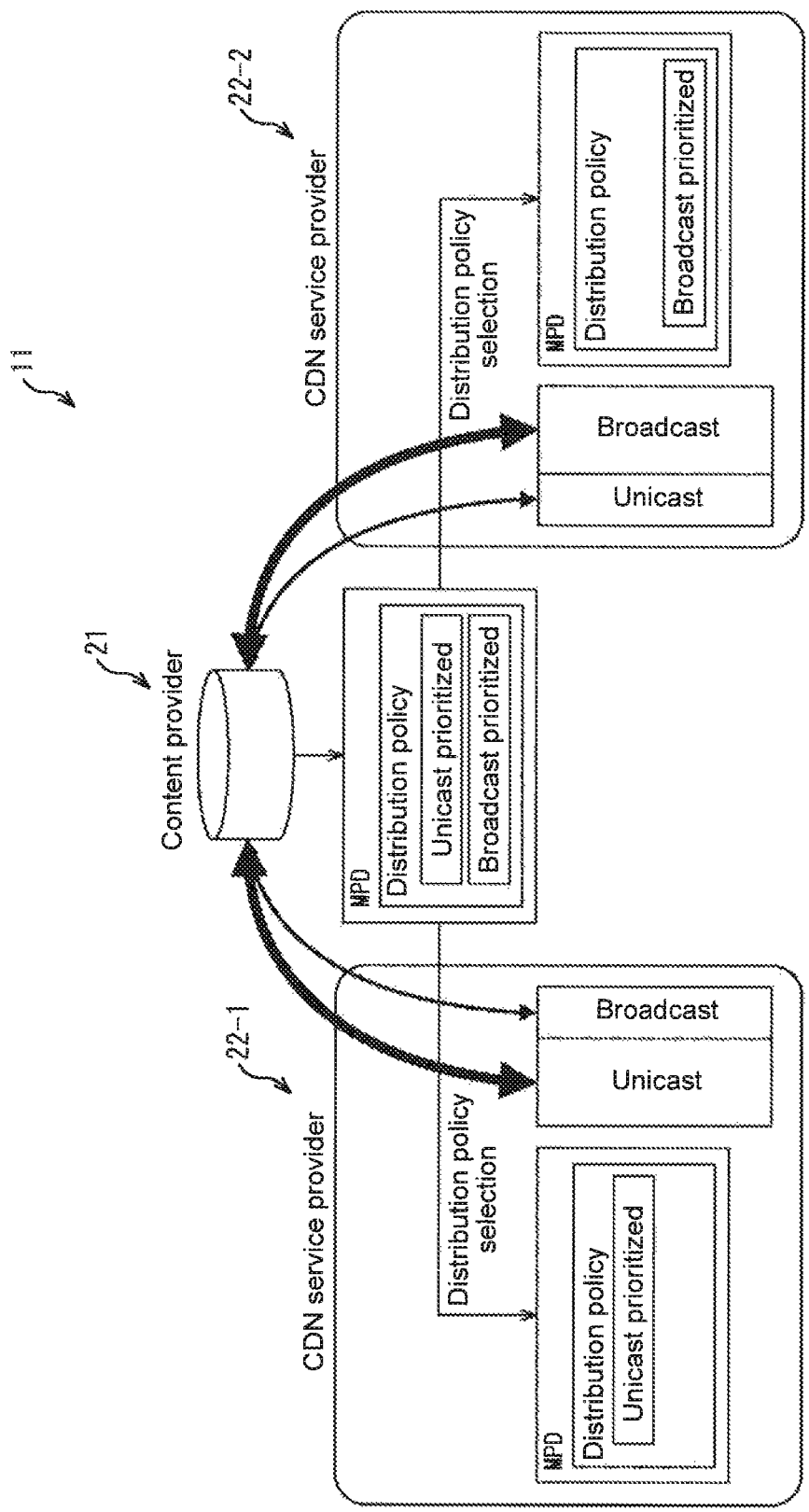
FIG. 3 is a diagram illustrating an overview of performing resource allocation by unicasting and broadcasting using an MPD.
Figure 4:
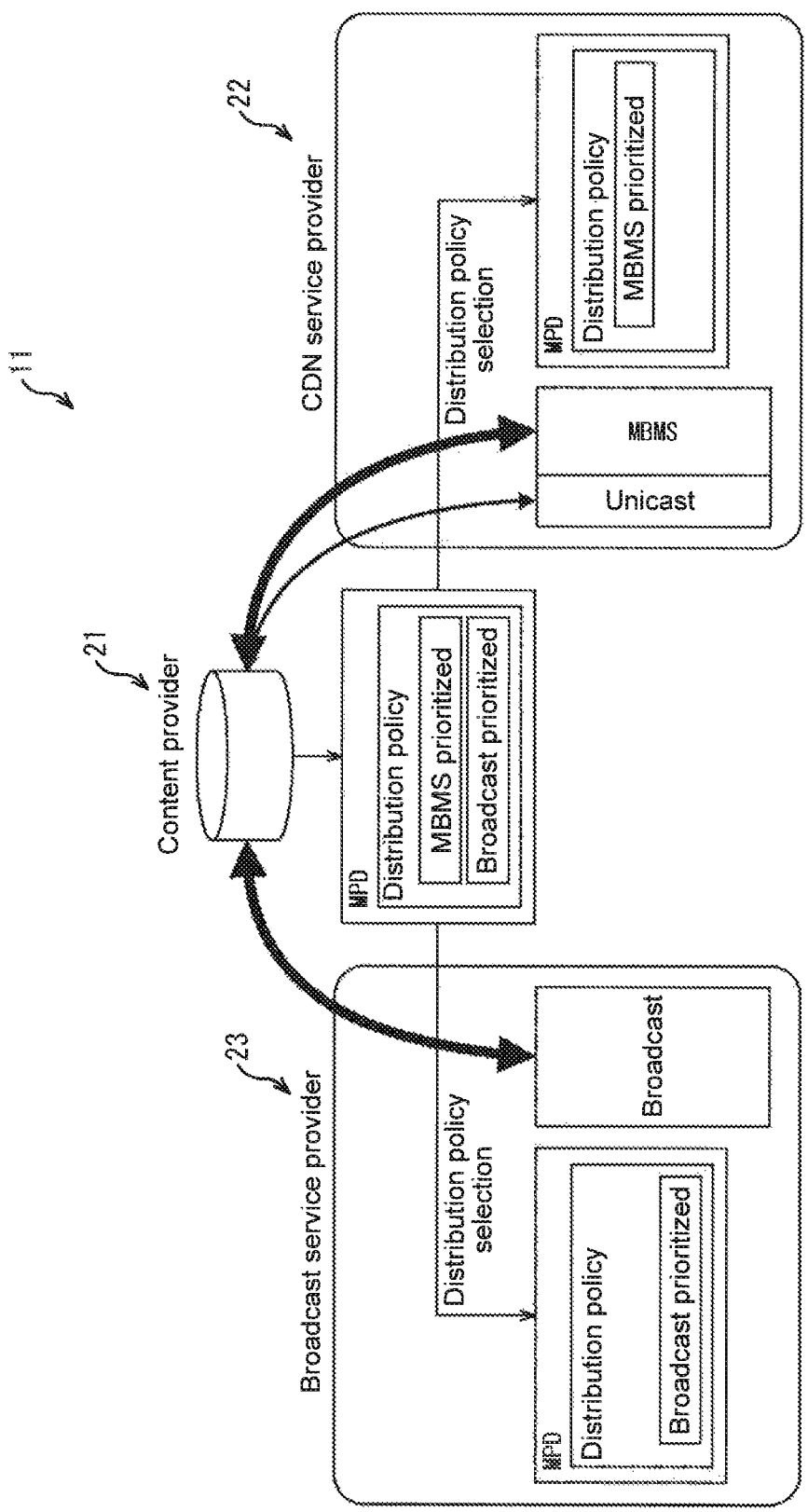
FIG. 4 is a diagram for describing an overview of performing resource allocation by broadcasting and MBMS using an MPD.

For example, as illustrated in FIG. 3 and FIG. 4, the hint information for optimizing and streamlining resource allocation can be provided to the CDN provider using a media presentation description (MPD) which is used to describe meta information in MPEG DASH.

In the content presentation system 11 illustrated in FIG. 3, a distribution policy indicating a policy for distributing resources by unicasting and broadcasting is described in an MPD of the content provider 21. Then, a CDN service provider 22 can select one of unicast prioritized or broadcast prioritized with reference to the distribution policy. For example, in a case where a priority is given to delivery of content using the bidirectional network 15, unicast prioritized is selected, and in a case where a priority is given to delivery of content using the broadcasting network 14, broadcast prioritized is selected.

In the example of FIG. 3, a CDN service provider 22-1 selects unicast prioritized, and the delivery of the content using the bidirectional network 15 is performed preferentially over the delivery of the content using the broadcasting network 14. Further, the CDN service provider 22-2 selects broadcast prioritized, and the delivery of the content using the broadcasting network 14 is performed preferentially over the delivery of the content using the bidirectional network 15.

Further, in the content presentation system 11 illustrated in FIG. 4, distribution of resources by broadcasting and multimedia broadcast and multicast service (MBMS) is performed. Further, in the example illustrated in FIG. 4, the CDN service provider 22 selects MBMS prioritized, and the delivery of the content using the MBMS is preferentially performed over the delivery of the content using the bidirectional network 15. Further, a broadcast service provider 23 selects broadcast prioritized, and only content delivery using the broadcasting network 14 is performed.

Figure 5:
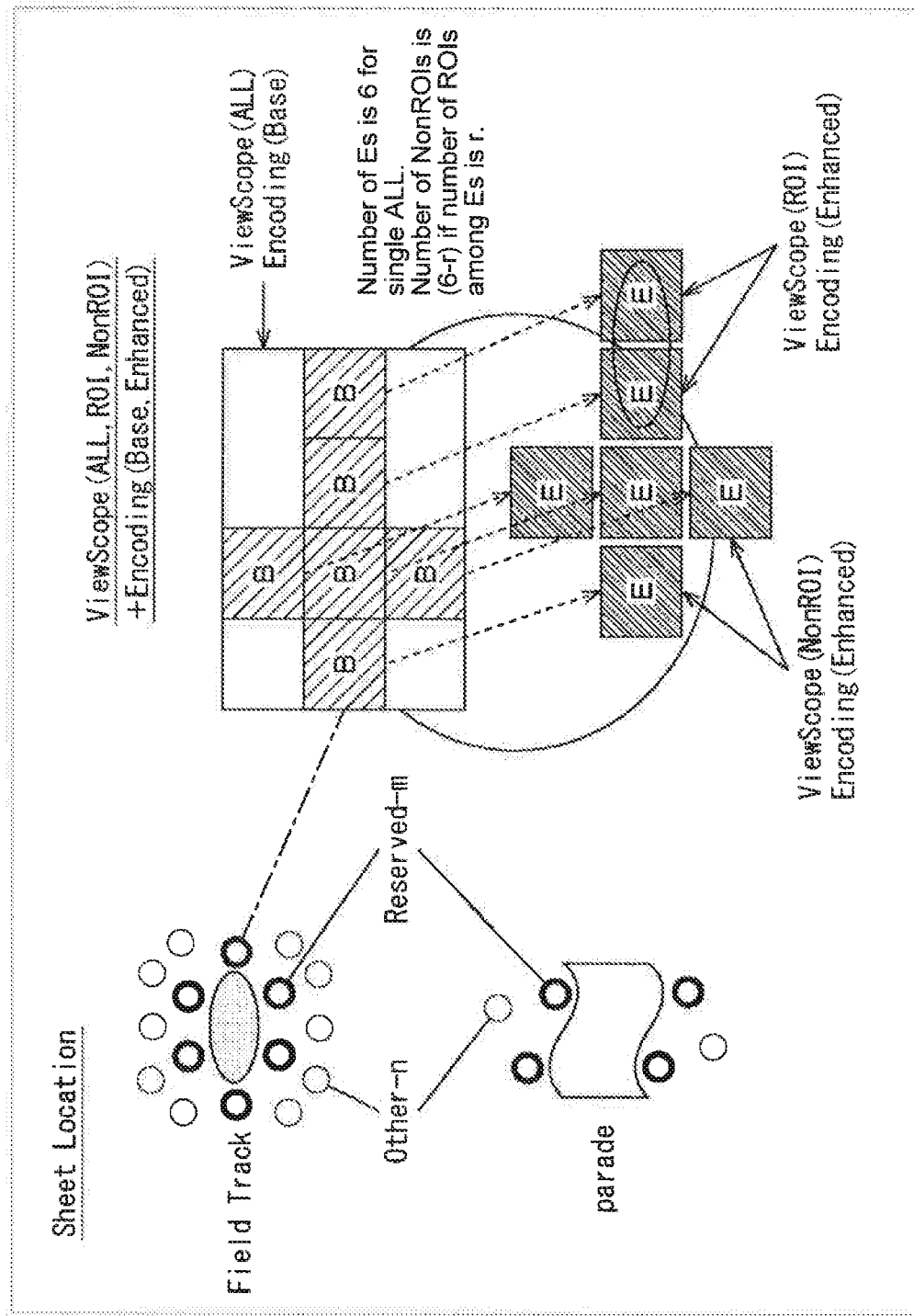
FIG. 5 is a diagram for describing a relation between seat location and view and encoding.

Further, FIG. 5 illustrates a relation between a seat location configured to view a field event, a parade, or the like and a view captured for each seat and encoding.

For example, as the seat location, there are a priority seat (Reserved) arranged near the field event, the parade, or the like and other seats (Other) arranged farther than the priority seat. Then, it is possible to deliver an omnidirectional view (ViewScope-ALL) and a view of each angle to each seat. Further, as the view of each angle, there are an angle view (ViewScope-ROI) which is high in a probability of viewing by the viewer and other angle views (ViewScope-NonROI).

Further, the omnidirectional view (ViewScope-ALL) is assumed to be encoded with an Encoding type (a Base-normal resolution), and each angle view (ViewScope-ROI/NonROI) is assumed to be encoded with an Encoding type (a high resolution higher than an Enhanced-normal resolution).

Figure 6:
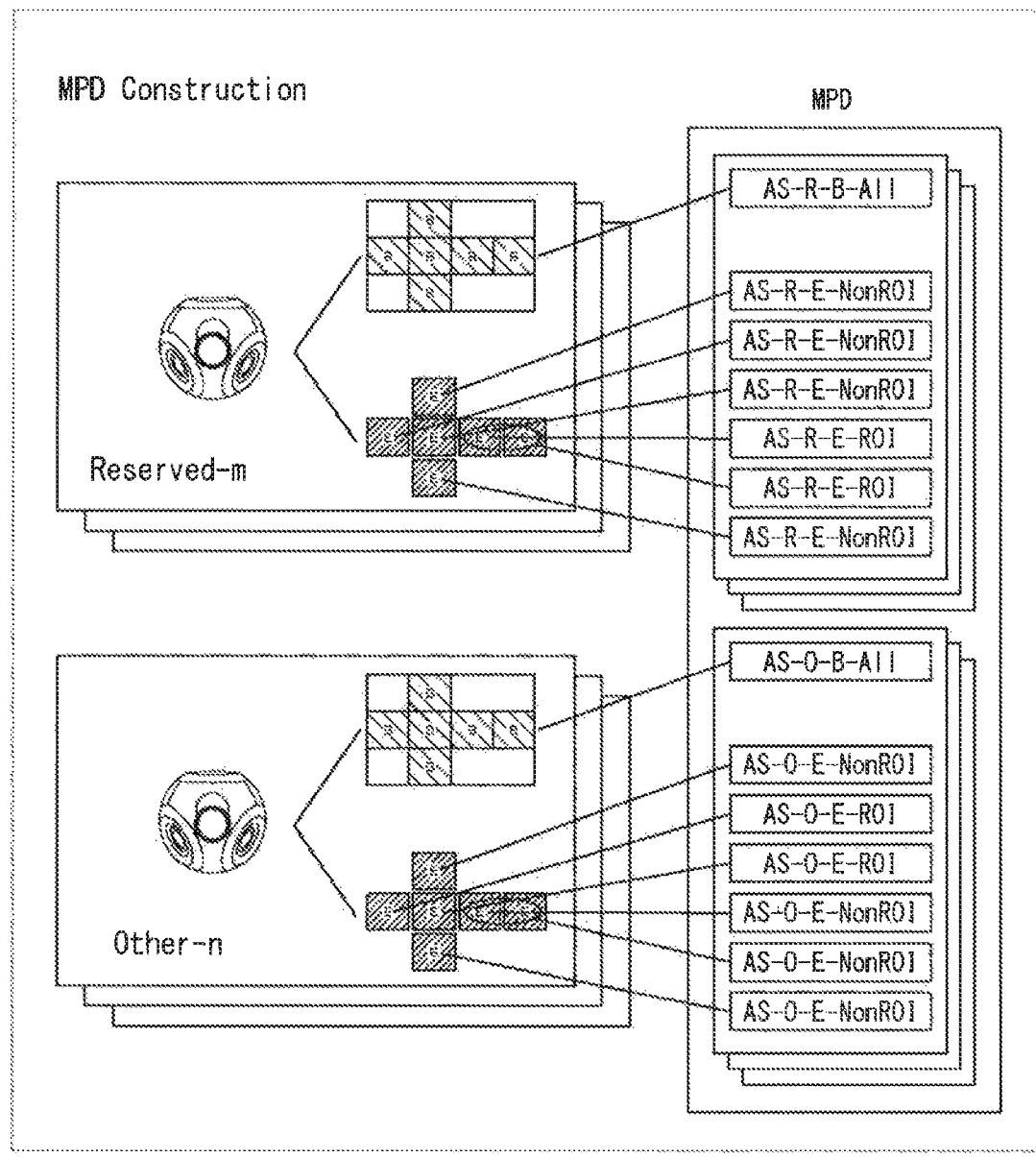
FIG. 6 is a diagram illustrating a relation between an omnidirectional view taken for each seat and a view of each angle.

FIG. 6 is a diagram illustrating a configuration example of an MPD for realizing the above-described service.

As illustrated in FIG. 6, AdaptationSet (AS-R-B-All) of an omnidirectional view generated from each priority seat, AdaptationSet (AS-R-E-ROI/NonROI) of each angle view of each priority seat, AdaptationSet (AS-O-B-All) of an omnidirectional view generated from each of the other seats, AdaptationSet (AS-O-E-ROI/NonROI) of each angle view of each of the other seats can be described in one MPD. Note that, in the following explanation, AdaptationSet can be replaced with Representation or SubRepresentation.

Further, in a case where the above-described service is delivered using media with different costs or transport characteristics, the streams (AdaptationSet) are allocated to the media. Here, for example, 2 types, that is, broadcasting and a network will be described as media with different costs or transport characteristics.

Figure 7:
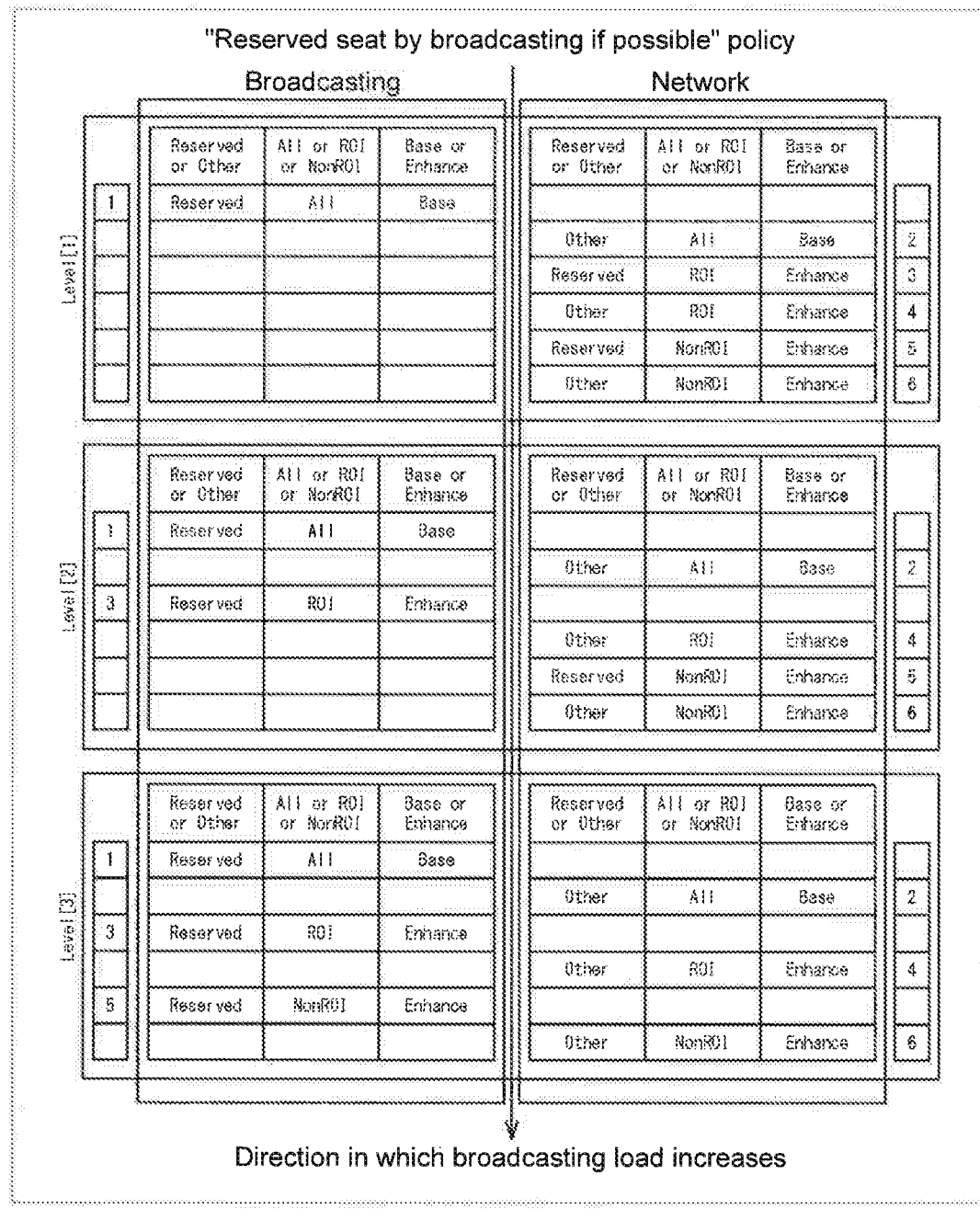
FIG. 7 is a diagram illustrating an example of a policy of allocating a broadcast and a network so that a priority seat is pushed by broadcasting if possible.

FIG. 7 illustrates an example of a policy of allocating the broadcasting and the network so that the priority seat is pushed by broadcasting if possible.

In the example illustrated in FIG. 7, the broadcasting and the network are allocated in the order of a level 1, a level 2, and a level 3 so that a broadcasting load increases. Here, content in which Scope-ALL of the priority seat is encoded with the normal resolution is referred to as a first stream, and content of ViewScope-ALL of the other seats is encoded with the normal resolution is referred to as a second stream. Further, content in which ViewScope-ROI of the priority seat is encoded with the high resolution is referred to as a third stream, and content in which ViewScope-ROI of the other seats is encoded with the high resolution is referred to as a fourth stream. Further, content in which ViewScope-NonROI of the priority seat is encoded with the high resolution is referred to as a fifth stream, and content in which ViewScope-NonROI of the other seats is encoded with the high resolution is referred to as a sixth stream.

For example, at the level 1, the first stream is delivered by the broadcasting, and the second to sixth streams are delivered by the network. Further, at the second level, the first and third streams are delivered by the broadcasting, and the second stream and the fourth to sixth streams are delivered by the network. Further, at the third level, the first stream, the third stream, and the fifth stream are delivered by the broadcasting, and the second stream, the fourth stream, and the sixth stream are delivered by the network.

Further, FIG. 8 illustrates an example of a policy of allocating the broadcasting and the network so that the ROI angle view is pushed by the broadcasting if possible.

In the example illustrated in FIG. 8, the broadcasting and the network are allocated such that broadcasting load increases in the order of the level 1, the level 2, the level 3, and the level 4. Then, similarly to FIG. 7, the first to sixth streams are allocated to the broadcast or the network and delivered.

For example, at the level 1, the first stream is delivered by the broadcasting, and the second to sixth streams are delivered by network. Further, at the second level, the first and third streams are delivered by the broadcasting, and the second stream and the fourth to sixth streams are delivered by the network. Further, at the third level, the first to third streams are delivered by the broadcasting, and the fourth to sixth streams are delivered by the network. Then, at the fourth level, the first to fourth streams are delivered by the broadcasting, and the fifth and sixth streams are delivered by the network.

Such resource allocation can be optimized and streamlined with reference to such a policy.

<First MPD Extension Method>

A first MPD extension method of enabling the hint information (policy) for optimizing the allocation of the delivery medium to be described in the MPD will be described.

For example, a new DistributionPolicy element (multiple can be placed under Period) is defined under Period.

As elements/attributes included in DistributionPolicy, there are tag, PolicyDistribution, NumLevels, Level[1]AdaptationSetIDs, Level[2]AdaptationSetIDs, . . . , Level[NumLevels]AdaptationSetIDs, and DistributionMediaDependantExtension.

Tag is a character string (unique within the MPD) identifying DistributionPolicy itself. PolicyDistribution is a character string (hint) representing a policy. Note that tag and PolicyDistribution are optional. NumLevels is a level number (number) representing a level.

Level[1]AdaptationSetIDs is a sequence of as-id belonging to the level 1, Level[2]AdaptationSetIDs is a sequence of as-id belonging to the level 2, and for the subsequent levels, similarly, Level[NumLevels]AdaptationSetIDs is a sequence belonging to a corresponding level. Further, as an option, an area capable of storing information which is likely to be a hint which is likely to be involved in deciding resource allocation such as a bit rate sum of each level (calculated and obtained from a maximum MPD) may be prepared.

As DistributionMediaDependantExtension, for example, there are maxLevelToBeApplied indicating a level index of AdaptationSet group up to which the following extension is applied, AttributeToBeApplied: "baseURL='/bc' (URL for broadcasting or the like) which is an element to be added to corresponding AdaptationSet, and an attribute (character string) for describing other DistributionMedia.

In the first MPD extension method, such a generic stream group definition scheme is introduced.

Figure 9:
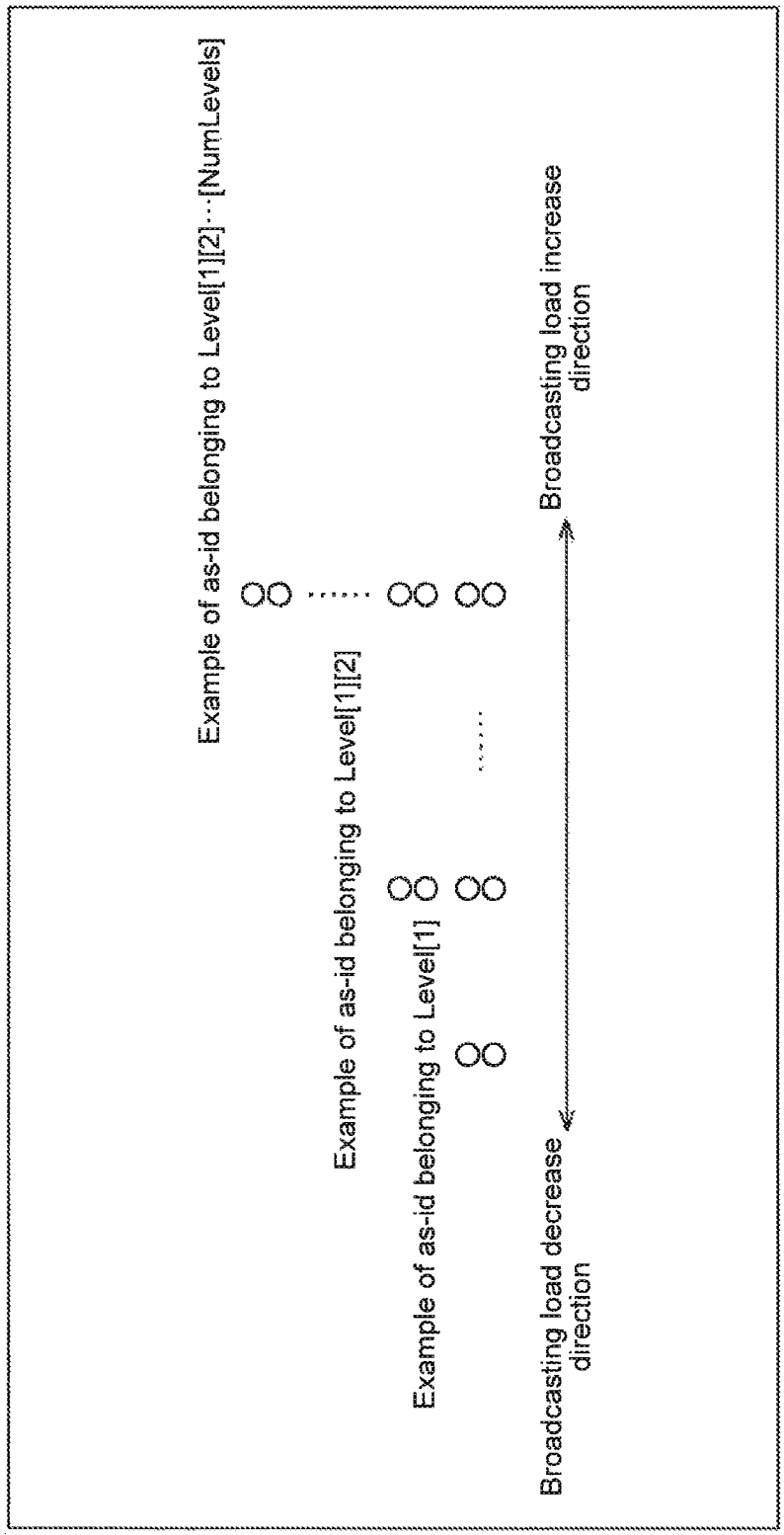
FIG. 9 is a diagram illustrating a relation between a level and a broadcasting load.

Further, it is possible to reduce or increase the broadcasting load as illustrated in FIG. 9 by selecting the level of DistributionPolicy (Level [1], Level [2], . . . , and Level [NumLevels]).

For example, in FIG. 9, the levels are arranged so that the broadcasting load is reduced as it goes to the left, and the broadcasting load is increased as it goes to the right, and the sequence of as-id belonging to the level 1 is smallest in the broadcasting load, and the sequence of as-id belonging to the level 1 and the level 2 is second smallest in the broadcasting load. As described above, the broadcasting load tends to increase as the level increases.

Figure 10:
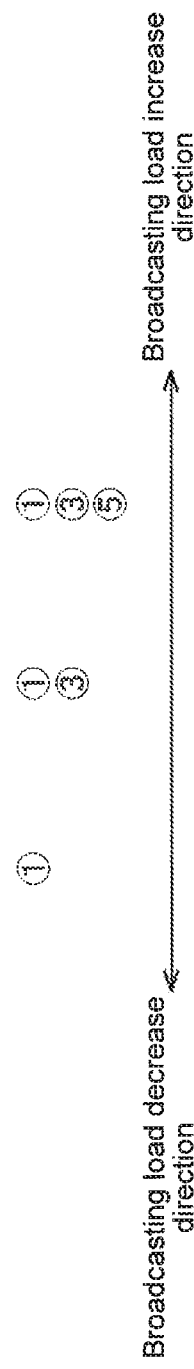
FIG. 10 is a diagram illustrating content of a DistributionPolicy element representing an example of allocation in a case where a priority seat is pushed by broadcasting if possible.
Figure 11:
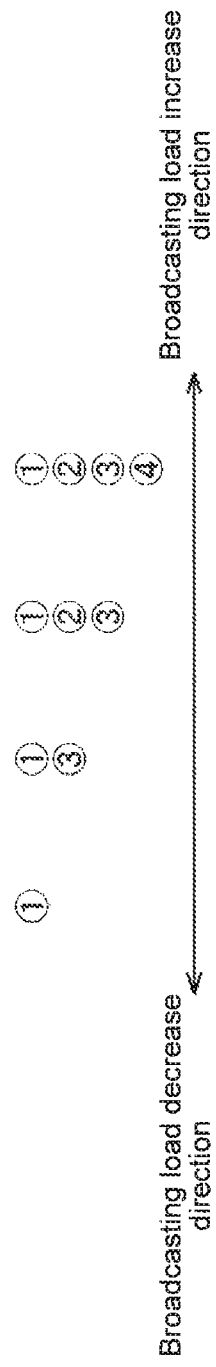
FIG. 11 is a diagram illustrating content of a DistributionPolicy element representing an example of allocation in a case where a ROI angle view is pushed by broadcasting if possible.

FIGS. 10 and 11 show content of the DistributionPolicy element representing the two types of resource allocation examples described above with reference to FIGS. 7 and 8. In other words, FIG. 10 shows a DistributionPolicy element in a case where "Reserve seat by broadcasting if possible", and FIG. 11 shows a DistributionPolicy element in a case where "ROI angle by broadcasting if possible."

As illustrated in FIG. 10, DistributionPolicy identified by Tag: "1" is a policy in which the priority seat is delivered by the broadcasting (Reserved over Broadcast) if possible, and the broadcasting load has three levels from the level 1 to the level 3. Further, as described above with reference to FIG. 7, only the first stream is delivered by the broadcasting at the level 1, the first and third streams are delivered by the broadcasting at the level 2, and the first stream, the third stream, and the fifth stream are delivered by the broadcasting at the level 3. As described above, resources are allocated so that the broadcasting load is small at the level 1, and the broadcasting load is increased at the level 3.

As illustrated in FIG. 11, DistributionPolicy identified by Tag: "2" is a policy in which the ROI angle is delivered by the broadcasting (ROI over Broadcast) if possible, and the broadcasting load has four levels from the level 1 to the level 4. Further, as described above with reference to FIG. 8, only the first stream is delivered by the broadcasting at the level 1, the first and third streams are delivered by the broadcasting at the level 2, the first to third streams are delivered by the broadcasting at the level 3, and the first to fourth streams are delivered by the broadcasting at the level 4. As described above, as described above, the resources is allocated so that the broadcasting load is small at the level 1 and broadcasting load is increased at the level 4.

<Specific Example of DistributionPolicy and MPD Generation Example>

FIG. 12 illustrates an example of XML representation of DistributionPolicy in a case where it is described in the MPD.

Further, XML representation illustrated in FIG. 12 is a basic structure, but for example, an optional ResourceSpecificInformation attribute can be placed as an attribute at each Level, and for example, <Level resourceSpecificInformation=' . . . ' . . . /> can be described. Note that it can also be defined as an element. Here, an area capable of storing information which is likely to be a hint which is likely to be involved in deciding load resource allocation such as a bit rate sum of each level may be prepared.

For example, in a case where a sum (maxBitRate) of a maximum bit rates of an AdaptationSet sequence belonging to this Level is used, <Level maxBitRate='sum value of a maximum bit rate of an AdaptationSet sequence belonging to that Level' . . . /> can be described as ResourceSpecificInformation.

Further, an element (Element) or an attribute (Attribute) to be added to a group of AdaptationSet elements up to a certain level can be defined. For example, an AdaptationSet element which is to be delivered by the broadcasting can be indicated by adding BaseURL='(a prefix of url indicating broadcasting delivery)'.

Therefore, a description illustrated in FIG. 13 can be arranged in DistributionPolicy as an optional DistributionMediaDependantExtension element that can indicate "BaseURL='(a prefix of url indicating broadcasting delivery)" of a part to be added to this AdaptationSet element. The description illustrated in FIG. 13 means that an element stored in an <ElementToBeAppended> element is added to the AdaptationSet sequence included in a Level up to a certain level value. Note that there are cases where a special element is prepared to apply such a simple extension, and there are cases where element addition extension is expressed using XML Query Update or the like.

Figure 16:
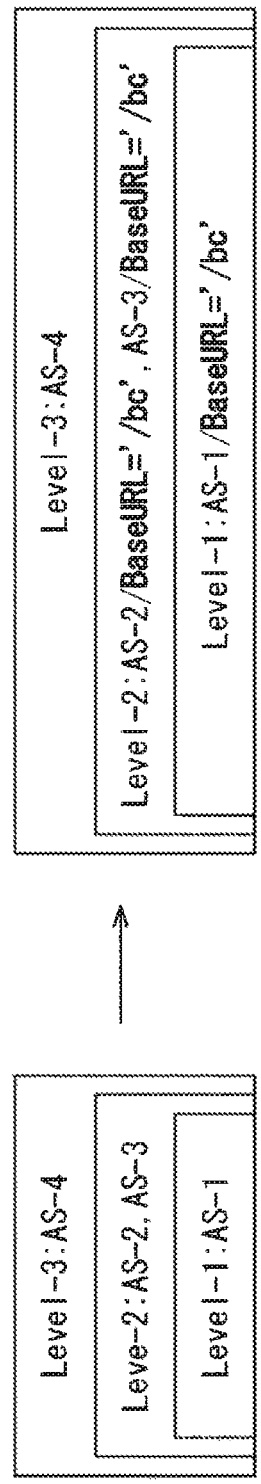
FIG. 16 is a diagram structurally illustrating reconfiguration of an MPD.

For example, in a case where there is an MPD described as illustrated in FIG. 14, a valid MPD to be generated is described as illustrated in FIG. 15. In other words, adding BaseURL='/bc' which is DistributionMediaDependantExtension is applied up to Level-2 as illustrated in FIG. 16.

On the other hand, if there is no maxLevelToBeApplied attribute or maxLevelToBeApplied is specified as 0, the MPD is described as illustrated in FIG. 17. Then, an MPD to be generated when it becomes valid is described as illustrated in FIG. 18. Here, a notification of a value of the maxLevelToBeApplied attribute of the DistributionMediaDependantExtension element can be given to an entity that generates a valid MPD with a data structure (an event, a message, signaling, or the like) different from an MPD to be described later.

Further, as another example, in a case where the client is connected with two or more types of broadcasting networks (for example, ATSC broadcasting and a 3GPP-MBMS network), the ATSC broadcasting is designated by <BaseURL>/atscBc</BaseURL>, the 3GPP-MBMS network is designated by <BaseURL>/3gppBc</BaseURL>, and resource allocation policies are different for them, an MPDs with the following two types of DistributionPolicy is defined.

For example, in a case where the MPD is described as illustrated in FIG. 19, maxLevelToBeApplied is designated to be up to 2 for DistributionPolicy@tag='1' of the ATSC broadcasting, and maxLevelToBeApplied is designated to be up to 1 for DistributionPolicy@tag='2' of the 3GPP MBMS broadcasting, an MPD illustrated in FIG. 20 is generated.

Figure 21:
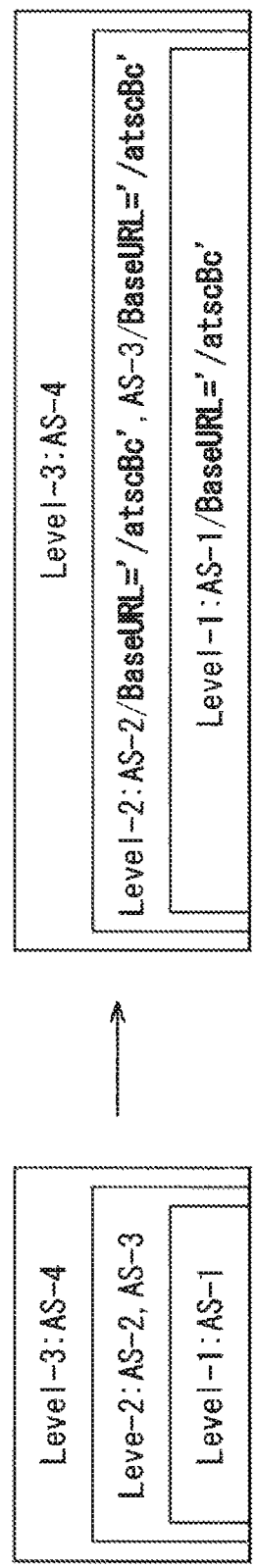
FIG. 21 is a diagram structurally illustrating reconfiguration of an MPD.
Figure 22:
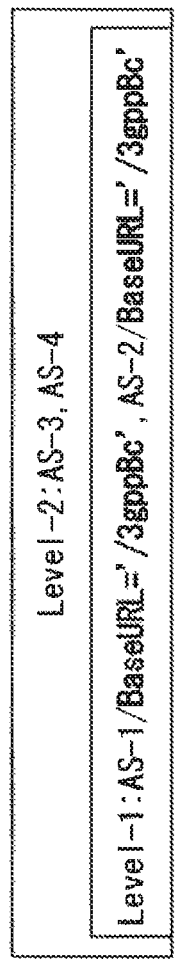
FIG. 22 is a diagram structurally illustrating reconfiguration of an MPD.

In other words, as illustrated in FIG. 21, for tag=1 (applicable to the case of the ATSC broadcasting), adding BaseURL='/atscBc' which is DistributionMediaDependantExtension is applied up to Level-2. Similarly, as illustrated in FIG. 22, for tag=2 (applicable to the case of the 3GPP broadcasting), adding BaseURL='/3gppBc' which is DistributionMediaDependantExtension is applied up to Level-1.

<First Configuration Example of Content Presentation System>

Figure 23:
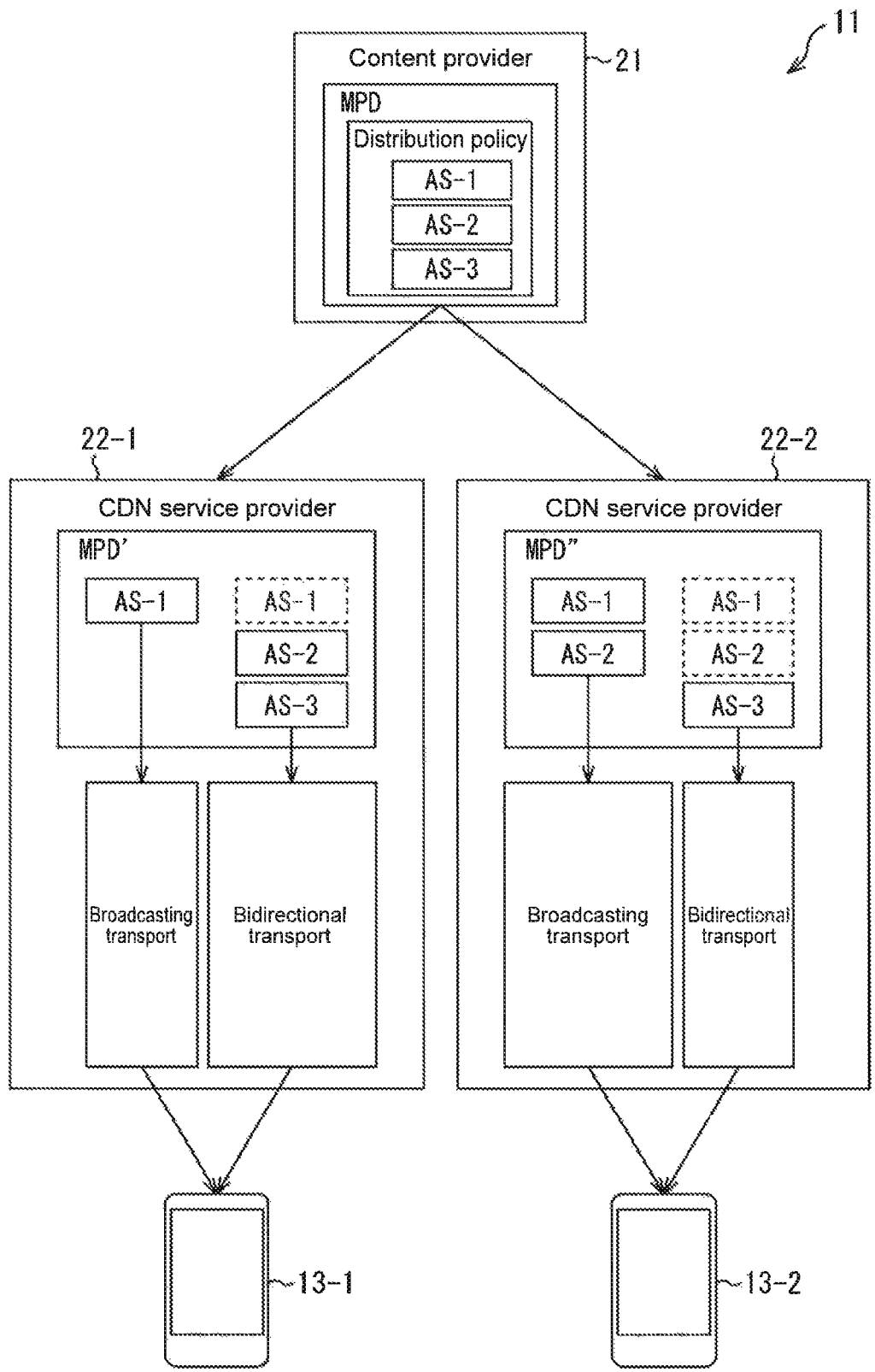
FIG. 23 is a diagram illustrating a first configuration example of a content presentation system.

FIG. 23 illustrates a configuration example of a content presentation system 11 constituted by a content provider 21, CDN service providers 22-1 and 22-2, and clients 13-1 and 13-2.

As illustrated in FIG. 23, in a case where delivery resources are managed in a group of service providers with different CDN platforms, an MPD optimized for each CDN is generated using MPD/DistributionPolicy as a hint in view of band distribution of broadcasting or bidirectional resources of each CDN.

Figure 24:
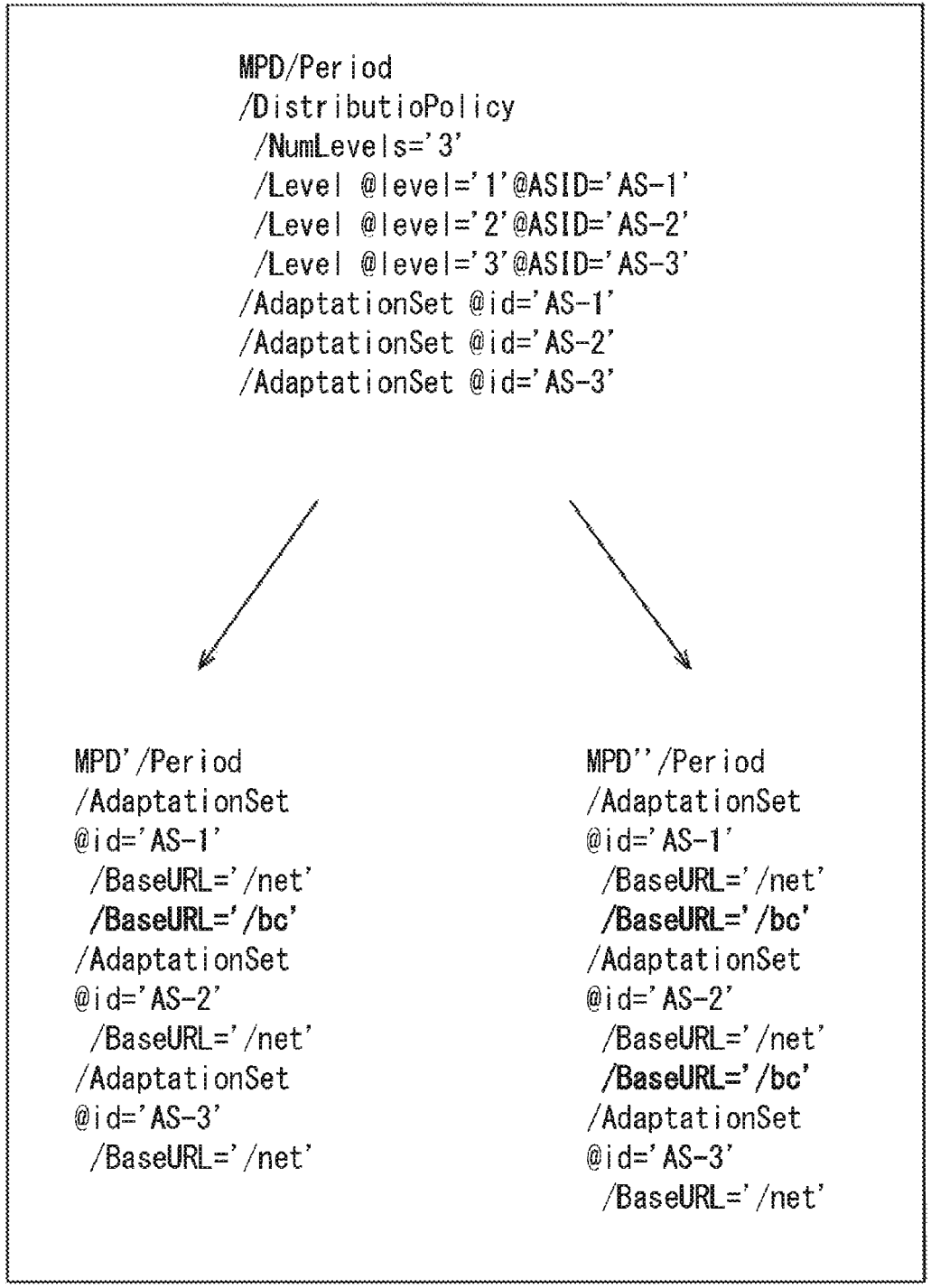
FIG. 24 is a diagram for describing an MPD generated using an MPD/DistrictionGroup as a hint.

For example, in a case where the MPD of the content provider 21 is described as illustrated on an upper side of FIG. 24, the CDN service provider 22-1 generates an MPD' illustrated on a lower left side of FIG. 24 using MPD/DistricutionGroup as a hint. Similarly, in this case, the CDN service provider 22-2 generates an MPD" illustrated on the lower right side of FIG. 24 using MPD/DistricutionGroup as a hint.

At this time, the CDN service provider 22-1 delivers AS-1 by the broadcasting transport as described in MPD', but some copies of AS-1 are prepared even on a server capable of performing bidirectional delivery in order to rescue the client unexpectedly defeated by the broadcasting transport. Similarly, the CDN service provider 22-2 delivers AS-1 and AS-2 by the broadcasting transport as described in MPD", some copies of AS-1 and AS-2 are prepared even on a server capable of performing bidirectional delivery in order to rescue the client unexpectedly defeated by the broadcasting transport.

<Second Configuration Example of Content Presentation System>

Figure 25:
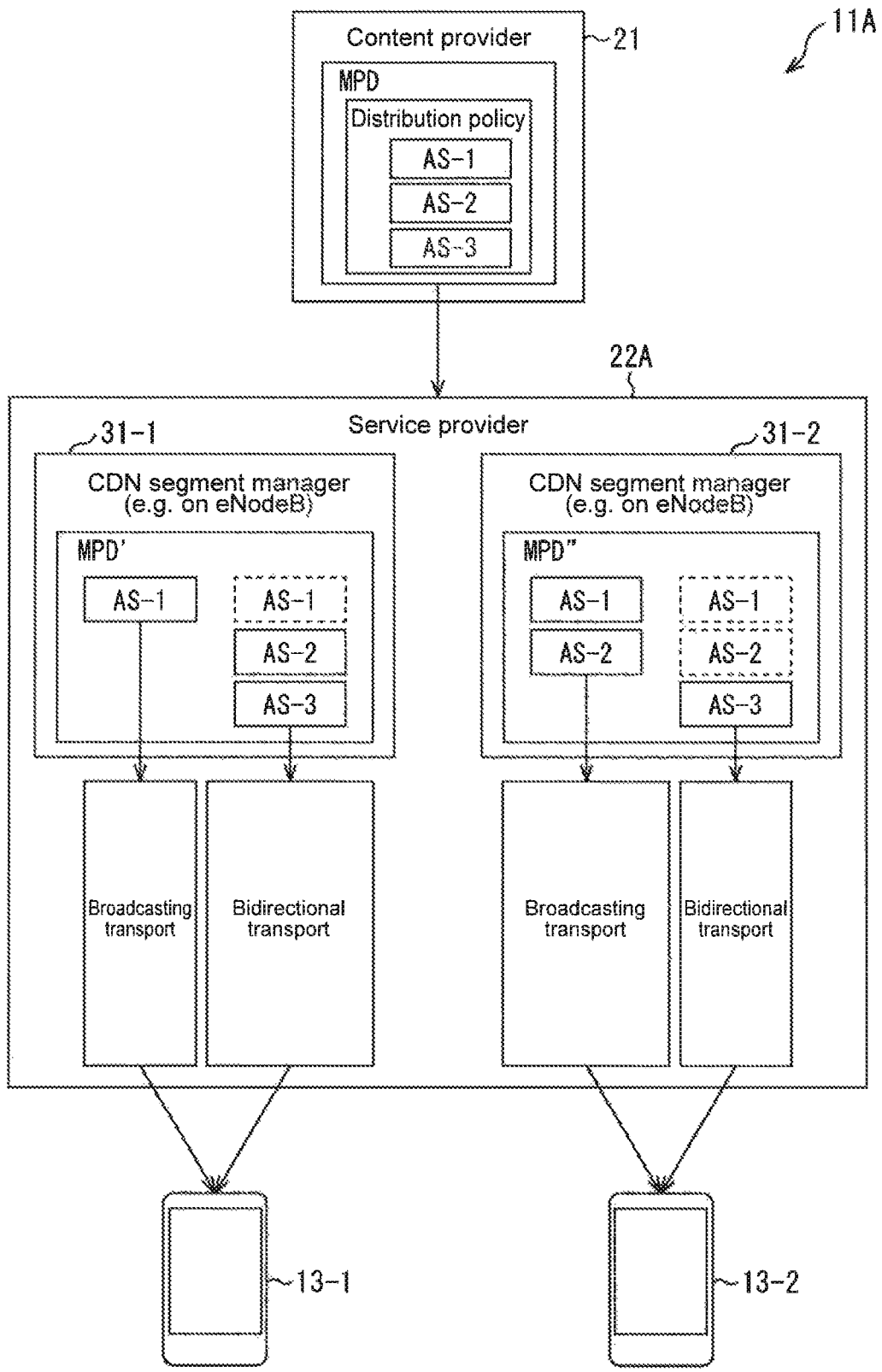
FIG. 25 is a diagram illustrating a second configuration example of a content presentation system.

FIG. 25 illustrates a configuration example of a content presentation system 11A constituted by a content provider 21, a service provider 22A including CDN segment managers 31-1 and 31-2, and clients 13-1 and 13-2.

As illustrated in FIG. 25, within one carrier (service provider) having a delivery platform supporting 3GPP-eMBMS, the CDN segment manager (a module that manages multicast/unicast stream allocation distribution) on each eNodeB generates an MPD optimized for each CDN segment using MPD/DistributionPolicy as a hint in view of band distribution of broadcasting/bidirectional resources of each CDN segment.

For example, in a case where the MPD of the content provider 21 is described as illustrated in the upper side of FIG. 24 described above, the CDN segment manager 31-1 generates the MPD' illustrated on the lower left side of FIG. 24 using MPD/DistricutionGroup as a hint. Similarly, in this case, the CDN segment manager 31-2 generates an MPD" illustrated on the lower right side of FIG. 24 using MPD/DistrictionGroup as a hint.

At this time, the CDN segment manager 31-1 delivers AS-1 by the broadcasting transport as described in MPD', but some copies of AS-1 are prepared even on a server capable of performing bidirectional delivery in order to rescue the client unexpectedly defeated by the broadcasting transport. Similarly, the CDN segment manager 31-2 delivers AS-1 and AS-2 by the broadcasting transport as described in MPD", some copies of AS-1 and AS-2 are prepared even on a server capable of performing bidirectional delivery in order to rescue the client unexpectedly defeated by the broadcasting transport.

<Content Delivery Process>

Figure 26:
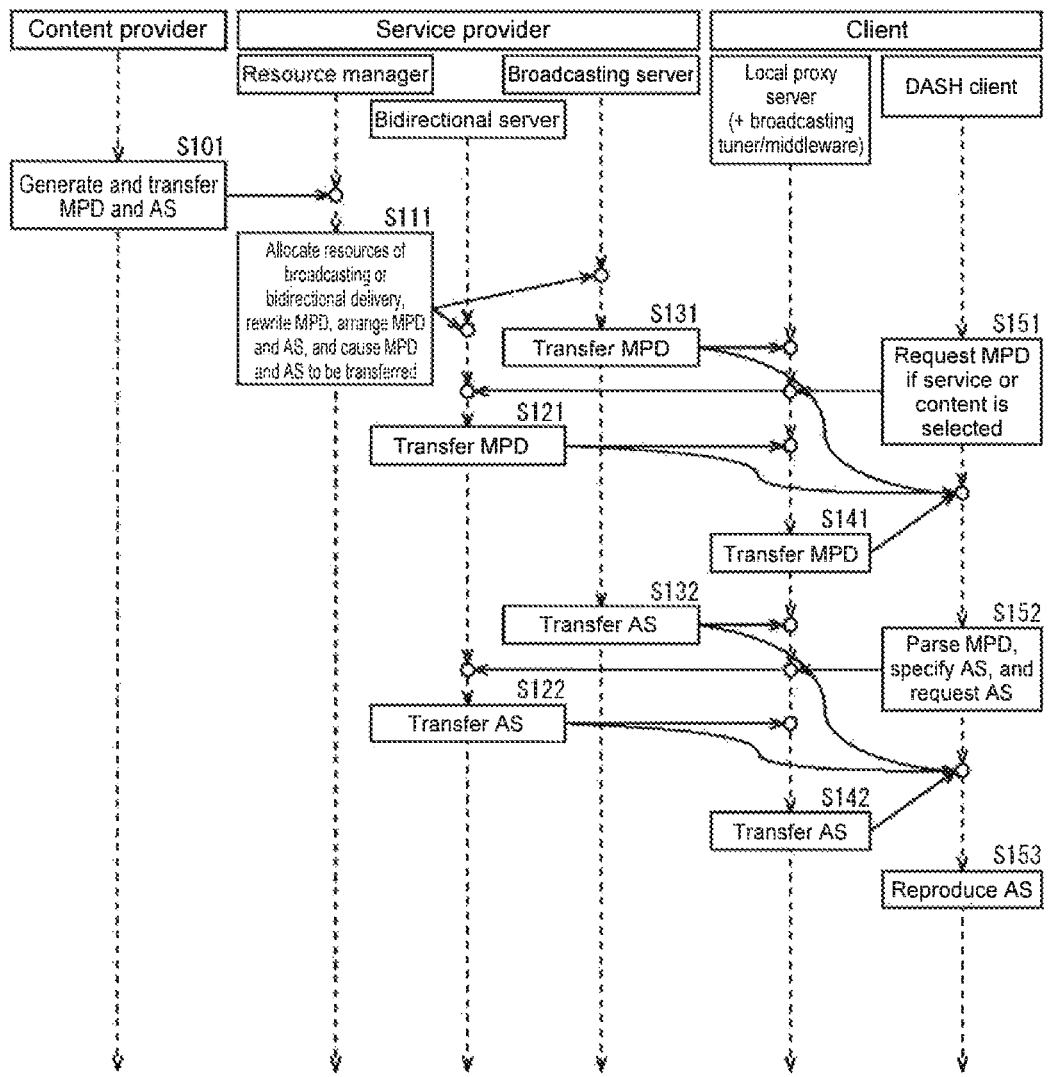
FIG. 26 is a flowchart for describing a content delivery process.

An example of a content delivery process of delivering content in the content presentation system 11 of FIG. 23 will be described with reference to FIG. 26.

In step S101, the content provider 21 generates an MPD and an AS (a sequence of AdaptationSet and a DASH segment), and transfers them to the CDN service provider 22.

The resource manager of the CDN service provider 22 receives the MPD and the AS transferred by the content provider 21 in step S101. Then, in step S111, the resource manager of the CDN service provider 22 allocates resources of broadcasting or bidirectional delivery, rewrites the MPD, arranges the MPD and the AS in the bidirectional server and the broadcasting server, and transfers them.

in step S121, the bidirectional server of the CDN service provider 22 transfers the MPD to the client 13 if there is a request for the MPD from the client 13 after the MPD and the AS are arranged by the resource manager in step S111. Thereafter, in step S122, the bidirectional server of the CDN service provider 22 transfers the AS to the client 13 if there is a request for the AS from the client 13.

In step S131, the broadcasting server of the CDN service provider 22 transfers the MPD to the client 13 after the MPD and the AS are arranged by the resource manager. Thereafter, in step S132, the broadcasting server of the CDN service provider 22 transfers the AS to the client 13.

A local proxy server (in which a broadcasting tuner and middleware are installed) of the client 13 acquires the MPD transferred by the broadcasting server of the CDN service provider 22 in step S131. Further, the local proxy server of the client 13 transmits a request for the MPD by the DASH client to the CDN service provider 22, and acquires the MPD transferred by the bidirectional server of the CDN service provider 22 1 in response to the request in step S12. Then, in step S141, the local proxy server of the client 13 transfers any one MPD out of the MPD acquired from the broadcasting server and the MPD acquired from the bidirectional server to the DASH client.

Thereafter, the local proxy server of the client 13 acquires the AS transferred by the broadcasting server of the CDN service provider 22 in step S132. Further, the local proxy server of the client 13 transmits a request for the AS by the DASH client to the CDN service provider 22, and acquires the AS transferred by the bidirectional server of the CDN service provider 22 in response to that request in step S122. Then, in step S142, the local proxy server of the client 13 transfers any one of the AS acquired from the broadcasting server or the AS acquired from the bidirectional server to the DASH client.

In step S151, if a service or content is selected, the DASH client of the client 13 requests the MPD of the selected service or content. Thereafter, the DASH client of the client 13 acquires the MPD transferred by the local proxy server of the client 13 in step S141.

Then, in step S152, the DASH client of the client 13 parses the acquired MPD, specifies the AS, and requests the specified AS. Thereafter, the DASH client of the client 13 acquires the AS transferred by the local proxy server of the client 13 in step S142. Then, in step S153, the DASH client of the client 13 reproduces the acquired AS.

As described above, in the content presentation system 11, the CDN service provider 22 can undertake broadcasting or bidirectional transport resource allocation. Then, it is possible to notify the client of the allocation of the transport resources by rewriting the MPD in the resource manager of the CDN service provider 22.

Note that, even in the content presentation system 11A of FIG. 25, a content delivery process similar to that in the content presentation system 11 is performed, and the broadcasting or bidirectional transport resource allocation is performed by the CDN segment manager 31 of the service provider 22A.

<Notification of DistributionPolicy and Level Thereof by DASH Event>

In MPEG DASH, an event notification mechanism called DASH Event is defined, and two types of Event transfer methods are defined. A first Event transfer method is an MPD Event, and a second Event transfer method is In-band Event Signaling.

For example, by adding an EventStream element in in units of Periods of DASH-MPD, it is possible to describe an Event firing schedule and event data to be processed (to be transferred to an application operating on the client) by the client at an Event firing timing thereof in units of Periods in the MPD.

FIG. 27 illustrates an example of a general MPD Event.

For example, in the MPD Event, it is possible to define a type of event by an EventStream/@schemeIdUri (and optional EventStream/@value) attribute and add event data to a content part of an EventStream/Event element. In other words, a format of Event-related data stored in a content part of an MPD/Period/EventStream/Event element (what should be stored) is specified (defined) by a value of the EventStream/@schemeIdUri attribute ('urn: xxx' in the following example). For example, the MPD Event is applicable only in a case where content of Period described in the MPD can be determined before the MPD is transmitted.

FIG. 28 illustrates an example of the In-band Event Signaling.

In the In-band Event Signaling, an mp4 box called "DASHEventMessageBox" with an MP4 brand name "emsg" box type is inserted into the DASH Segment and transferred in the segment stream (in-stream). For example, in the case of the In-band Event Signaling, the type of event is defined in a scheme_id_uri field (and an optional value field) of DASHEventMessageBox, and the event data is added to a message_data field. Here, "presentation_time_delta=0" illustrated in FIG. 28 indicates an offset from EarliestPresentationStime of a segment in which the emgs box is included, and "event_duration=0xFFFF" indicates infinity.

Further, DASHEventMessageBox is arranged in a box structure of the DASH segment.

Figure 29:
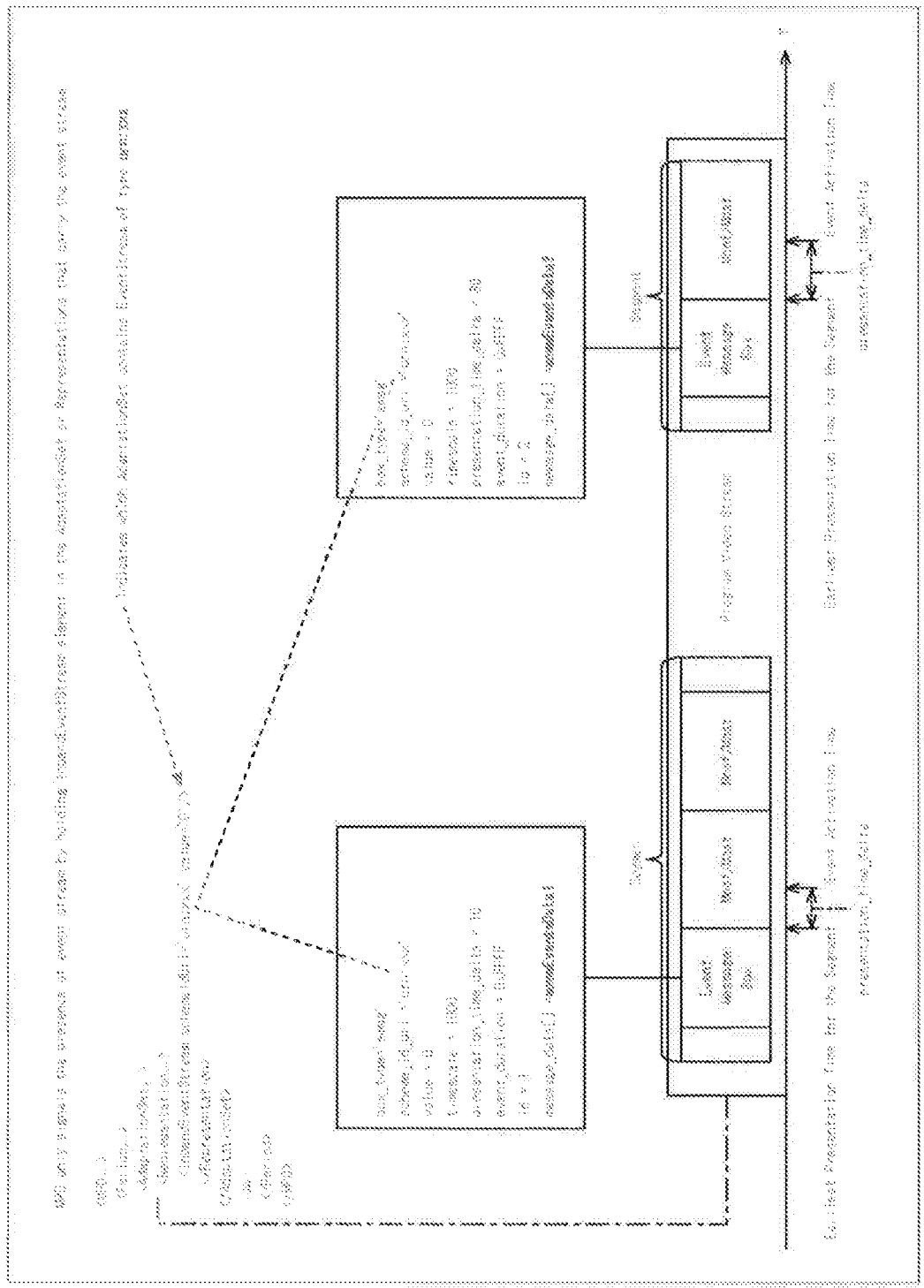
FIG. 29 is a diagram illustrating an example in which an InbandEventStream element is arranged in an AdaptationSet/Representation element of an MPD.

For example, to specify which stream (AdaptationSet/Representation) is used to transfer the DASH segment storing emgs box illustrated in FIG. 28, as illustrated in FIG. 29, the InbandEventStream element in the AdaptationSet/Representation element of the MPD is placed.

The tag value "tag" and the level value "level" of DistributionPolicy are designated by the DASH Event (the MPD Event and the In-band Event) described above, and it is possible to determine whether DistributionPolicy/DistributionMediaDependantExtension/ElementToBeAppended is applied up to which level of which DistributionPolicy definition (DistributionPolicy/DistributionMedia DependantExtension/maxLevelToBeApplied) at the client side. Accordingly, it is possible to dynamically reconfigure the stream allocation of the delivery resources at the Event transmission timing without rewriting the MPD on the server side, and thus it is possible to control perform fine-grained resource allocation control.

Note that FIG. 30 illustrates an example of a policy/level notification by the DASH Event.

Further, in a case where the tag and the level of DistributionPolicy is notified of by the MPD Event, MPD/Period/EventStream @schemeIdUri is set in "urn:mpeg:dash:event:distributionPolicy," and "tag value, level value" is stored in the content part of the MPD/Period/EventStream/Event element as illustrated in FIG. 31.

On the other hand, in a case where the tag and the level of DistributionPolicy are notified of by the In-band Event, "urn:mpeg:dash:event:distributionPolicy" is stored in the scheme_id_uri field of the emsg box as illustrated in FIG. 32, a character string of "tag value, level value" is stored in the message_data[ ] field, and a notification is given to the client side by designating MPD/Period/AdaptationSet/Representation/InbanedEventStream @schemeIdUri='urn:mpeg:dash:event:distributionPolicy' as Representation in which the DASH segment including the emsg box is likely to be delivered.

Here, the emsg box is described as illustrated in FIG. 32. Further, the MPD for designating AdaptationSet/Representation in which the In-band Event is likely to be extracted is described as illustrated in FIG. 33.

<Third Configuration Example of Content Presentation System>

Figure 34:
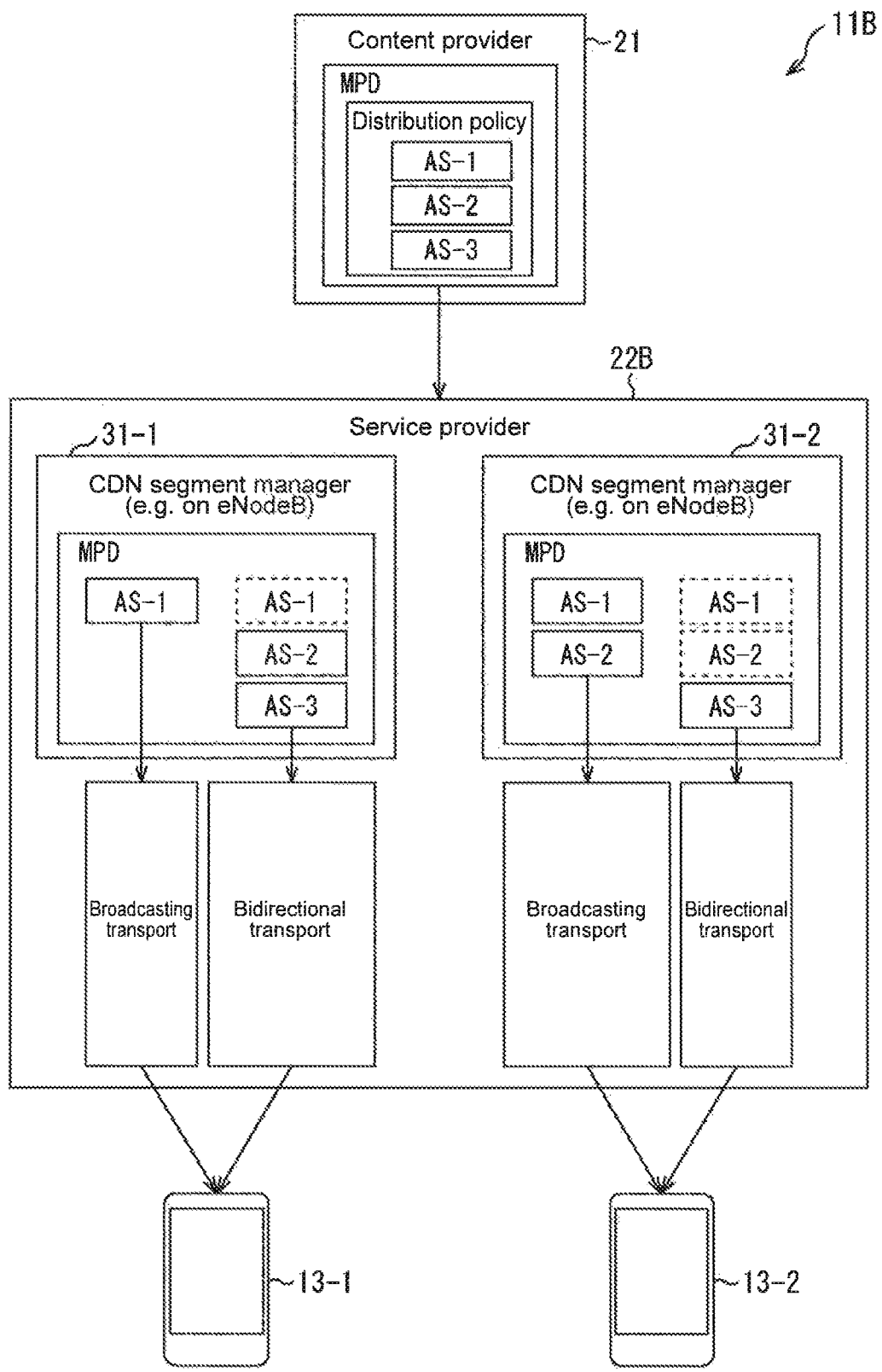
FIG. 34 is a diagram illustrating a third configuration example of a content presentation system.

FIG. 34 illustrates a third configuration example of a content presentation system 11B constituted by a content provider 21, a CDN service provider 22B including CDN segment managers 31-1 and 31-2, and clients 13-1 and 13-2.

In the content presentation system 11B illustrated in FIG. 34, each CDN segment manager 31 transmits an MDP including DistributionPolicy to the client 13, the client 13 detects the DASH Event (In-band Event) in any one AdaptationSet, and the MPD optimized for each CDN segment is generated dynamically. As described above, the extension of the DASH Event for realizing the dynamic MDP generation by the DASH Event is described.

For example, the MPD of the content provider 21 is described as illustrated on an upper side of FIG. 35. Then, as illustrated on a lower side of FIG. 35, the MPD of the CDN segment manager 31 can reconfigure the MPD on the client 13 side by DistributionPolicy and the DistributionPolicy@tag value+Level value which is signaled separately. Further, the CDN segment manager 31 dynamically notifies the client 13 of the MPD Event without rewriting the MPD.

At this time, the CDN segment manager 31-1 delivers AS-1 by the broadcasting transport as described in the MPD, but some copies of AS-1 are prepared even on the server capable of performing the bidirectional delivery in order to rescue the client that is unexpected defeated by the broadcasting transport. Similarly, the CDN segment manager 31-2 delivers AS-1 and AS-2 by the broadcasting transport as described in the MPD, but some copies of AS-1 and AS-2 are prepared even on the server capable of performing the bidirectional delivery in order to rescue the client that is unexpected defeated by the broadcasting transport.

Then, as illustrated in FIG. 36, the In-band Event in the DASH segment of any one AS of the CDN segment manager 31-1 is dynamically notified of to the client 13-1 by the MPD Event. Then, the client 13-1 generates the MPD' on the basis of the Level value.

Similarly, as illustrated in FIG. 37, the In-band Event in the DASH segment of any one AS of the CDN segment manager 31-2 is dynamically notified of to the client 13-2 by the MPD Event. Then, the client 13-2 generates the MPD" on the basis of Level value.

<Content Delivery Process>

An example of a content delivery process of delivering content in the content presentation system 11B of FIG. 34 will be described with reference to FIGS. 38 to 43.

Figure 38:
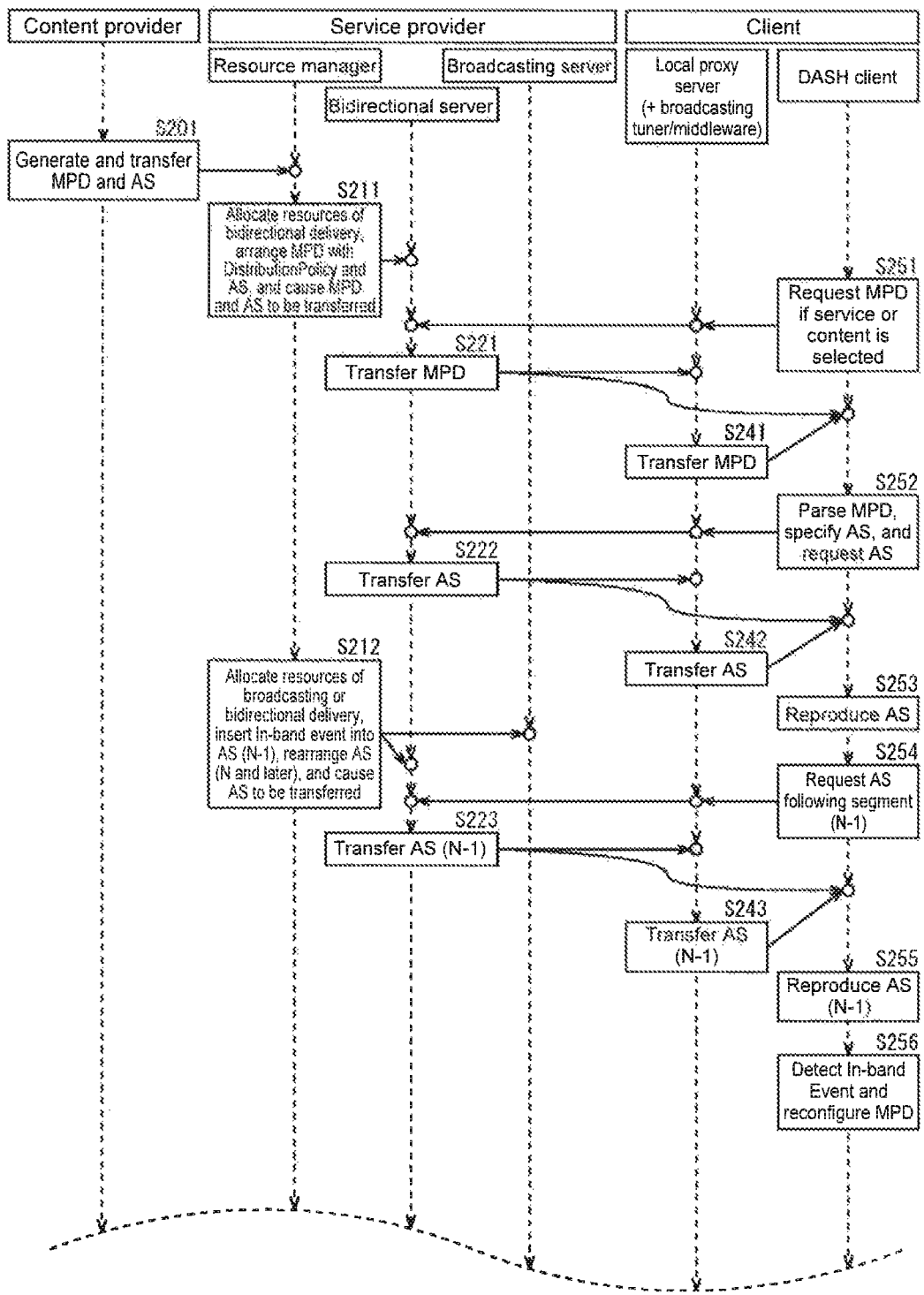
FIG. 38 is a flowchart for describing a content delivery process.

In step S201 of FIG. 38, the content provider 21 generates an MPD and an AS, and transfers them to the CDN service provider 22B.

In step S211 of FIG. 38, the resource manager of the CDN service provider 22B allocates resources of the bidirectional delivery, arranges an MPD with DistributionPolicy and the AS in the bidirectional server, and transfers them. In step S212, the resource manager of the CDN service provider 22B allocates resources of the broadcasting or bidirectional delivery, inserts the in-band Event into the AS (N−1), rearranges the AS (N and later) in each of the bidirectional server and the broadcasting server, and causes them to be transferred.

Similarly, in step S213 of FIG. 39, the resource manager of the CDN service provider 22B allocates resources of the broadcasting or bidirectional delivery, inserts the In-band Event into the AS (M−1), rearranges AS (M and later) in each of the bidirectional server and the broadcasting server, and causes them to be transferred.

If there is a request for the MPD from the client 13 after the MPD with DistributionPolicy and the AS are arranged by the resource manager in step S211, in step S221 of FIG. 38, the bidirectional server of the CDN service provider 22B transfers the MPD to the client 13. Thereafter, if there is a request for the AS from the client 13, in step S222, the bidirectional server of the CDN service provider 22 B transfers the AS to the client 13. Further, if there is a request for the AS from the client 13 after the AS (N or later) is rearranged by the resource manager in step S212, in step S223, the bidirectional server of the CDN service provider 22B transfers the AS (N−1) to the client.

Figure 39:
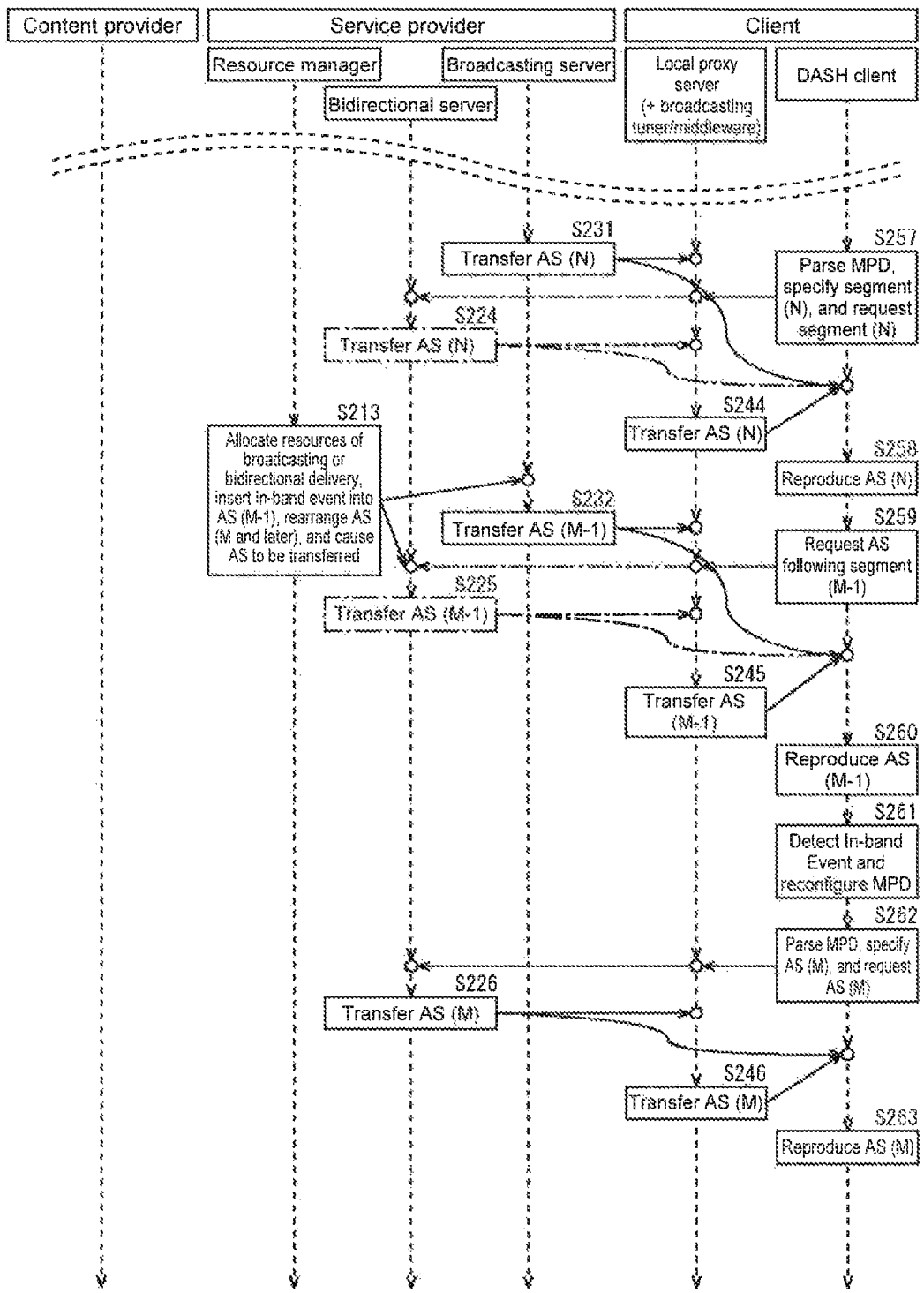
FIG. 39 is a flowchart for describing a content delivery process.

Similarly, if there is a request for the AS from the client 13, in step S224 of FIG. 39, the bidirectional server of the CDN service provider 22 B transfers the AS (N) to the client 13. Thereafter, if there is a request for the AS (M−1) from the client after the AS (M or later) is rearranged by the resource manager, the bidirectional server of the CDN service provider 22B transfers the AS (M−1) to the client 13. Further, if there is a request for the AS (M) from the client 13, in step S226, the bidirectional server of the CDN service provider 22 B transfers the AS (M) to the client 13.

After the AS (N and later) is rearranged by the resource manager in step S212, in step S231 of FIG. 39, the broadcasting server of the CDN service provider 22 B transfers the AS (N) to the client 13. Thereafter, after the AS (M and later) is rearranged by the resource manager in step S213, in step S232, the broadcasting server of the CDN service provider 22B transfers the AS (M−1) to the client 13.

The local proxy server of the client 13 transmits the request for the MPD by the DASH client to the CDN service provider 22B, and acquires the MPD transferred from the bidirectional server of the CDN service provider 22B in step S221 in response to the request. Then, in step S241, the local proxy server of the client 13 transfers the MPD to the DASH client. Further, the local proxy server of the client 13 transmits the request for the AS by the DASH client to the CDN service provider 22B, and acquires the AS transferred from the bidirectional server of the CDN service provider 22B in step S222 in response to the request. Then, in step S242, the local proxy server of the client 13 transfers the AS to the DASH client.

Further, the local proxy server of the client 13 transmits a request for an AS following segment (N−1) by the DASH client to the CDN service provider 22B, and acquires the AS (N−1) transferred from the bidirectional server of the CDN service provider 22B in step S223 in response to the request. Then, in step S243, the local proxy server of the client 13 transfers the AS (N−1) to the DASH client.

Thereafter, similarly, the local proxy server of the client 13 transfers the AS (N) to the DASH client in step S244 of FIG. 39, transfers the AS (M−1) to the DASH client in step S245, and transfer the AS (M) to the DASH client in step S246.

In step S251, if a service or content is selected, the DASH client of the client 13 requests the MPD of the selected service or content. Thereafter, the DASH client of the client 13 acquires the MPD transferred from the bidirectional server of the CDN service provider 22 in step S221 B, that is, the MPD transferred from the local proxy server of the client 13 in step S241.

Subsequently, in step S252, the DASH client of the client 13 parses the acquired MPD, specifies an AS, and requests the specified AS. Note that an example of the parsed MPD is illustrated in FIG. 40.

Thereafter, the DASH client of the client 13 acquires the AS transferred from the bidirectional server of the CDN service provider 22 in step S222, that is, the AS transferred from the local proxy server of the client 13 in step S242. Then, in step S253, the DASH client of the client 13 reproduces the acquired AS.

Further, in step S254, the DASH client of the client 13 requests an AS following segment (N−1). Thereafter, the DASH client of the client 13 acquires the AS (N−1) transferred from the bidirectional server of the CDN service provider 22 in step S223, that is, the AS (N−1) transferred from the local proxy server of the client 13 in step S243. Then, in step S255, the DASH client of the client 13 reproduces the acquired AS (N−1).

Then, in step S256, the DASH client of the client 13 detects the In-band Event and reconfigures the MPD. Note that an example of the detected In-band Event and the reconfigured MPD is illustrated in FIG. 41.

Similarly, the DASH client of the client 13 parses the MPD in step S257 in FIG. 39, specifies the segment (N), requests the specified AS (N), and reproduces the AS (N) in step S258. Note that an example of the MPD parsed in step S257 is illustrated in FIG. 42.

Further, similarly, the DASH client of the client 13 requests an AS following segment (M−1) in step S259, and reproduces the AS (M−1) in step S260. Further, similarly, the DASH client of the client 13 detects the In-band Event in step S261, reconfigures the MPD, parsed the MPD in step S262, specifies the segment (M), and requests the specified AS (M), and reproduces the AS (M) in step S263. Note that an example of the detected In-band Event and the reconfigured MPD is illustrated in FIG. 43.

As described above, in the content presentation system 11B, the CDN segment manager 31 of the CDN service provider 22B transmits the MDP including DistributionPolicy to the client 13. Further, the client 13 can detect the DASH Event (In-band Event) in any one AdaptationSet and dynamically generate the MPD optimized for each CDN segment.

<Content Delivery Process>

Another example of a content delivery process of delivering content in the content presentation system 11B of FIG. 34 will be described with reference to FIGS. 44 to 49.

In the content delivery process described above with reference to the flowcharts of FIG. 37 and FIG. 38, the DASH client can acquire the segment without being conscious of the difference of the network (the broadcasting or the network) from the local proxy server in which the broadcast tuner or the middleware is implemented. In addition, for example, the process may be performed without passing through such local proxy server.

Further, the CDN service provider 22 can be configured to include two bidirectional servers instead of the broadcasting server described above. For example, different IP addresses are assigned to a first bidirectional server and a second bidirectional server, and for example, a url of a segment provided to the first bidirectional server starts from No. 1, and a url of a segment provided to the second bidirectional server starts from No. 2.

Figure 44:
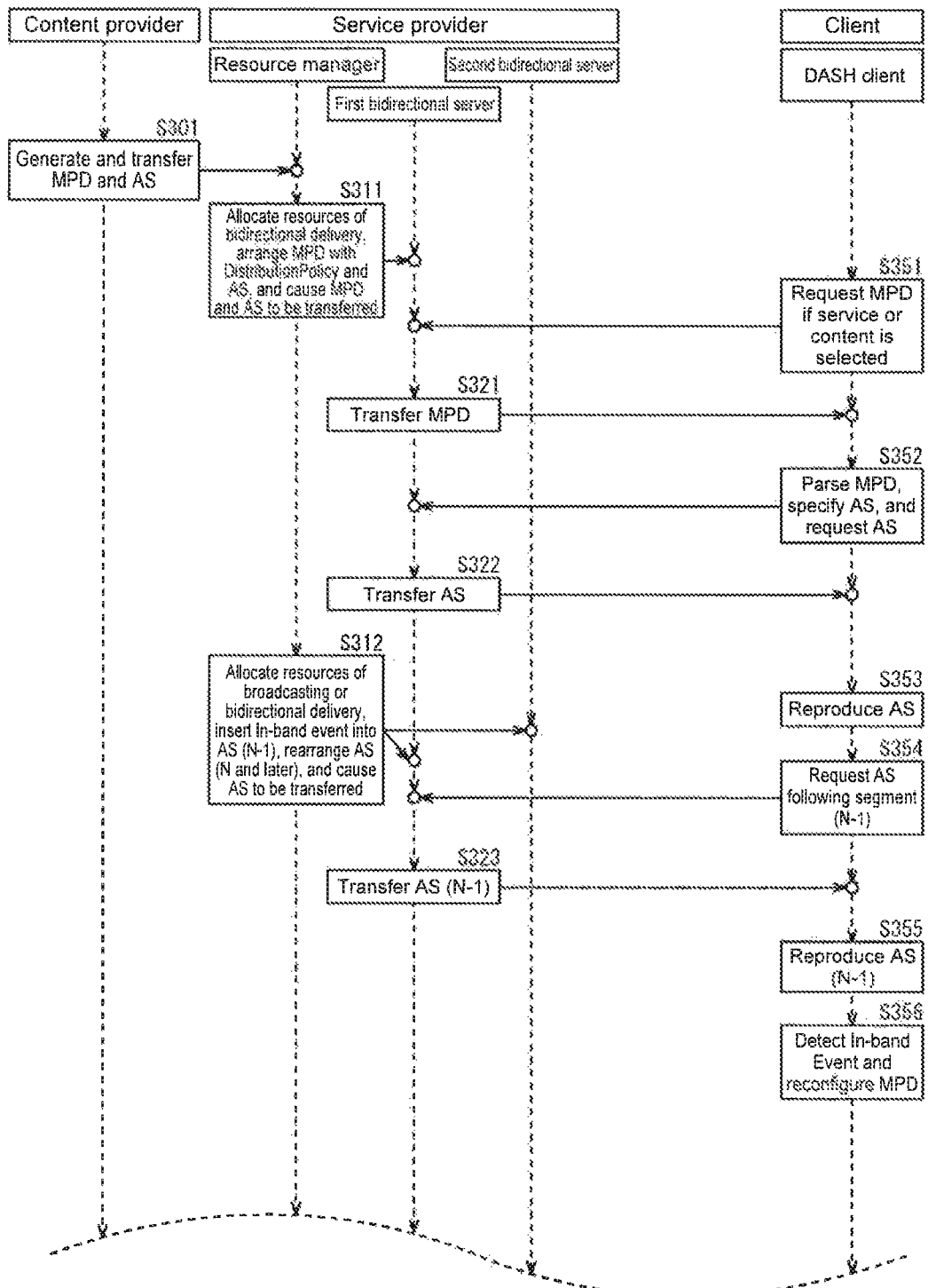
FIG. 44 is a flowchart for describing a content delivery process.

In step S301 of FIG. 44, the content provider 21 generates an MPD and an AS, and transfers them to the CDN service provider 22B.

Figure 45:
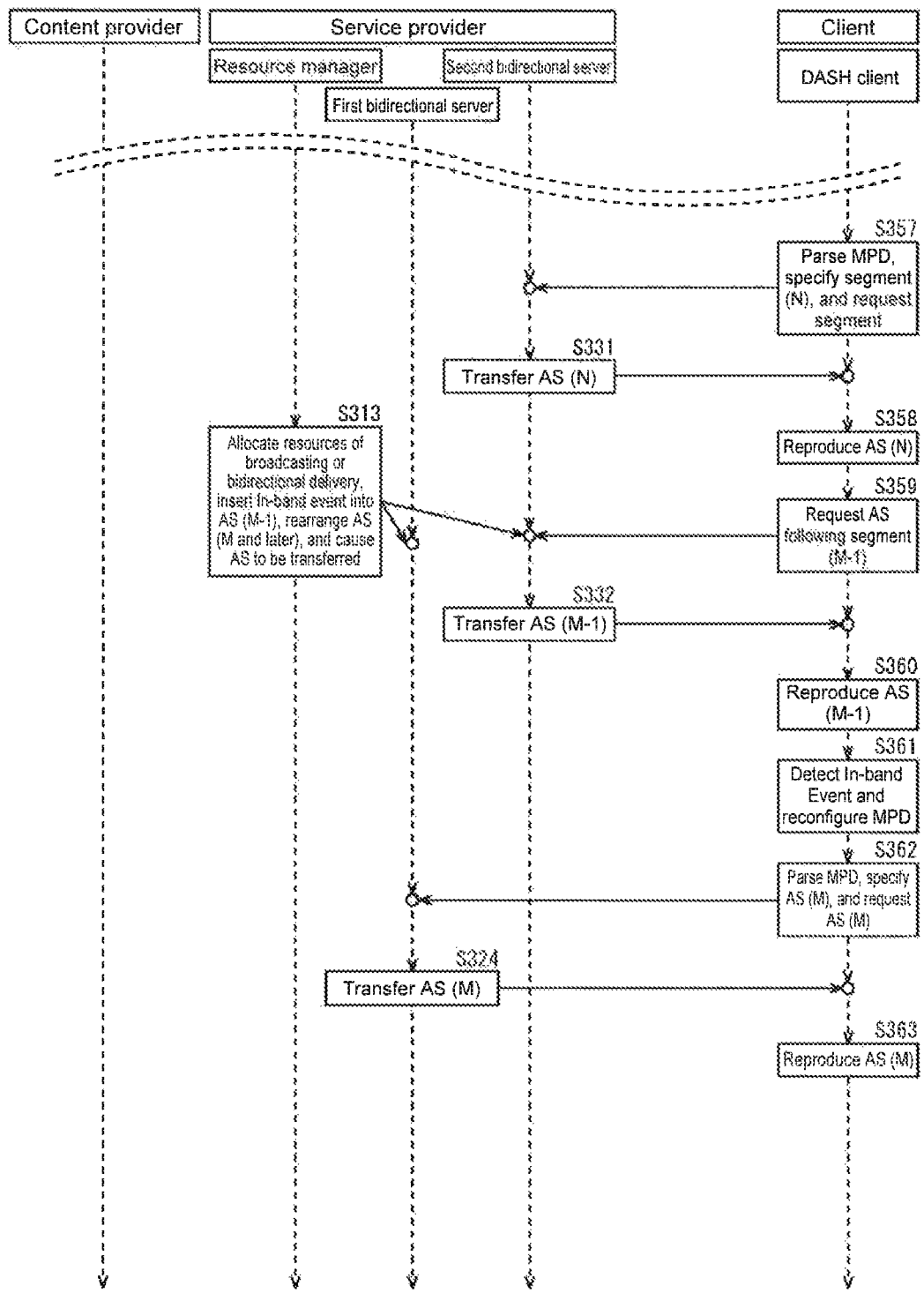
FIG. 45 is a flowchart for describing a content delivery process.

In steps S311 to S313 of FIGS. 44 and 45, the resource manager of the CDN service provider 22B performs a process similar to steps S211 to S213 of FIGS. 38 and 39.

If there is a request for the MPD from the client 13 after the MPD with DistributionPolicy and the AS are arranged by the resource manager in step S311, in step S321 of FIG. 44, the first bidirectional server of the CDN service provider 22B transfers the MPD to the client 13. Then, if there is a request for the AS from the client 13, in step S322, the first bidirectional server of the CDN service provider 22 B transfers the AS to the client 13. Further, if there is a request for the AS from the client 13 after the AS (N and later) is rearranged from the resource manager in step S312, in step S323, the first bidirectional server of the CDN service provider 22B transfers the AS (N−1) to the client 13.

Thereafter, if there is a request for the AS (M) from the client 13 after the AS (M and later) is rearranged by the resource manager, in step S324, the first bidirectional server of the CDN service provider 22B transfers the AS (M) to the client 13.

If there is a request for the AS (N) from the client 13 after the AS (N and later) is rearranged by the resource manager in step S312, in step S331, the second bidirectional server of the CDN service provider 22B transfers the AS (N) to the client 13. Thereafter, if there is a request for the AS (M−1) from the client 13 after the AS (M and later) is rearranged by the resource manager in step S313, in step S332, the second bidirectional server of the CDN service provider 22B transfers the AS (M−1) to the client 13.

In step S351, if a service or content is selected, the DASH client of the client 13 requests the first bidirectional server of the CDN service provider 22B to provide the MPD of the selected service or content. Thereafter, the DASH client of the client 13 acquires the MPD transferred from the first bidirectional server of the CDN service provider 22B in step S321.

Then, in step S352, the DASH client of the client 13 parses the acquired MPD, specifies an AS, and requests the specified AS. Note that an example of the parsed MPD is illustrated in FIG. 46.

Thereafter, the DASH client of the client 13 acquires the AS transferred from the first bidirectional server of the CDN service provider 22 in step S322. Then, in step S353, the DASH client of the client 13 reproduces the acquired AS.

Further, in step S354, the DASH client of the client 13 requests the first bidirectional server of the CDN service provider 22B to provide the AS following segment (N−1). Thereafter, the DASH client of the client 13 acquires the AS (N−1) transferred from the first bidirectional server of the CDN service provider 22 in step S323. Then, in step S355, the DASH client of the client 13 reproduces the acquired AS (N−1).

Then, in step S356, the DASH client of the client 13 detects the In-band Event and reconfigures the MPD. Note that an example of the detected In-band Event and the reconfigured MPD is illustrated in FIG. 47. Here, as illustrated in FIG. 47, since /BaseURL='No. 2' is described in the reconfigured MPD, acquisition from the second bidirectional server of the CDN service provider 22B is also possible.

Therefore, in step S357 of FIG. 45, the DASH client of the client 13 parses the MPD, specifies the segment (N), and requests the second bidirectional server of the CDN service provider 22B to provide the specified AS (N). Then, the DASH client of the client 13 acquires the AS (N) transferred from the second bidirectional server of the CDN service provider 22B in step S331, and reproduces the AS (N) in step S358. Note that an example of the MPD parsed in step S357 is illustrated in FIG. 48.

Further, in step S359, the DASH client of the client 13 requests the second bidirectional server of the CDN service provider 22B to provide the AS following segment (M−1). Thereafter, the DASH client of the client 13 acquires the AS (M−1) transferred from the second bidirectional server of the CDN service provider 22 in step S332. Then, in step S360, the DASH client of the client 13 reproduces the acquired AS (N−1).

Further, the DASH client of the client 13 detects the In-band Event in step S361, reconfigures the MPD, parses the MPD in step S362, specifies the segment (M), and requests the first bidirectional server of the CDN service provider 22 to provide the specified AS (M). Thereafter, the DASH client of the client 13 acquires the AS (M) transferred from the first bidirectional server of the CDN service provider 22 in step S324. Then, in step S363, the DASH client of the client 13 reproduces the acquired AS (M).

Note that an example of the detected In-band Event and the reconfigured MPD is illustrated in FIG. 49. Here, as illustrated in FIG. 49, since only /BaseURL='No. 1' is described in the reconfigured MPD, it can be acquired only from the first bidirectional server of the CDN service provider 22B.

As described above, in the content presentation system 11B, for example, the content delivery process can be performed more simply than the content delivery process of FIGS. 37 and 38.

<Variation of MPD Extension>

A variation of the MPD extension will be described with reference to FIGS. 50 and 51.

For example, as illustrated in FIG. 51, it is configured so that a SupplementalProperty element can be arranged under each AdaptationSet element, "urn:mpeg:dash:event:distributionPolicy" can be set as a SupplementalProperty@schemeIdUri attribute value, and a value attribute value can be described as in "tag=value), (policyDescription=value), (level=value), (attributeToBeAppended=value), . . . ."

It means that AdaptationSet belongs to the level of DistributionPolicy (indicated by the level value) indicated by the tag value, PolicyDescription of DistributionPolicy is a policyDescription value, and addition indicated in a plurality of attributeToBeAppended values is reflected in the AdaptationSet element when DistributionPolicy.level (maxLevelToBeApplied) is applied. In each attributeToBeAppended, for example, an element to be added is described by an appropriate description method such as <!CDATA[<BaseURL>/bc</BaseURL>]]>.

Further, FIG. 51 illustrates a representation equivalent to the description of the MPD illustrated in FIG. 50.

<Extension of DASH-SAND>

Extension of DASH-SAND will be described with reference to FIGS. 52 to 60.

The DASH Event can be used to indicate which level is applied to DistributionPolicy defined in the MPD to reconfigure the MPD as described with reference to FIG. 27. In addition, for example, it is possible to notify of DistributionPolicy and the level thereof using DASH-SAND so that the MPD can be reconfigured on the client side or the server side.

Figure 52:
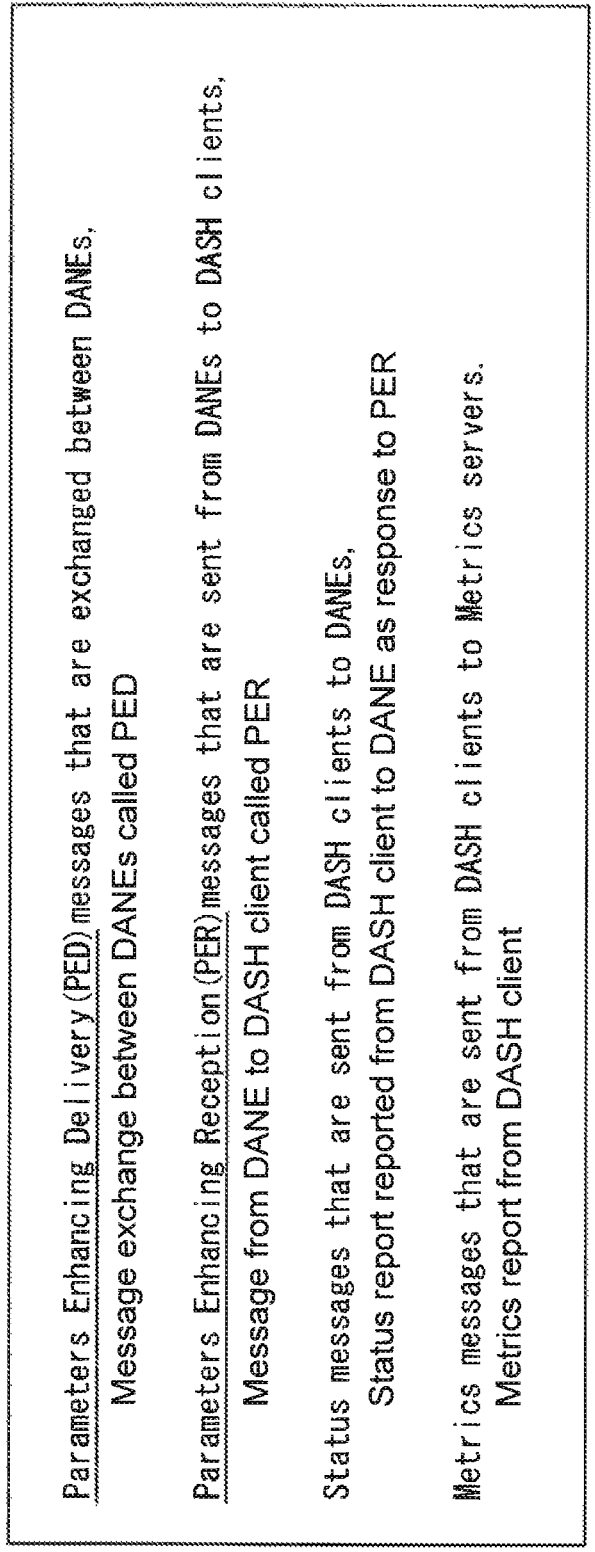
FIG. 52 is a diagram illustrating a definition of a messaging interface.
Figure 53:
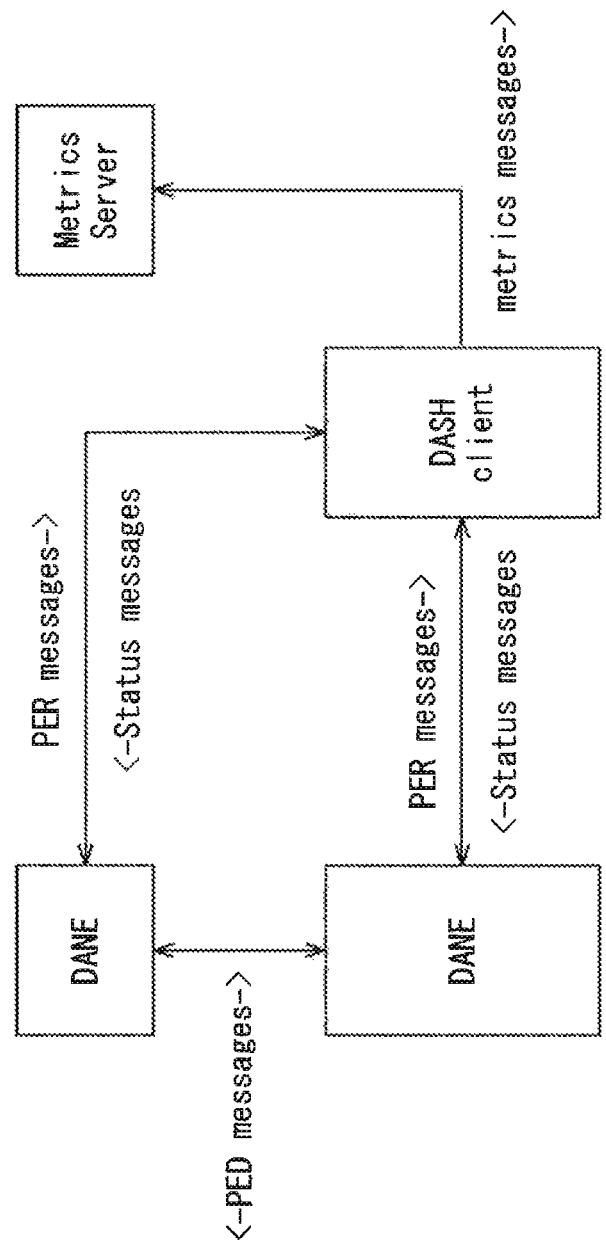
FIG. 53 is a diagram for describing a message exchanged between DANEs.

For example, in SAND, as illustrated in FIG. 52 and FIG. 53, a network component/server having a function of understanding a DASH protocol called a DASH aware network element (DANE) and optimizing DASH streaming and a messaging interface that enables interactions between the network component/server and the DASH client are defined.

Further, as illustrated in FIG. 53, for a parameter enhancing distribution (PED) which is a message exchanged between DANEs, only the existence of an interface of the interface (PED) is defined in current DASH-SAND, and a specific message is not defined yet.

Figure 54:
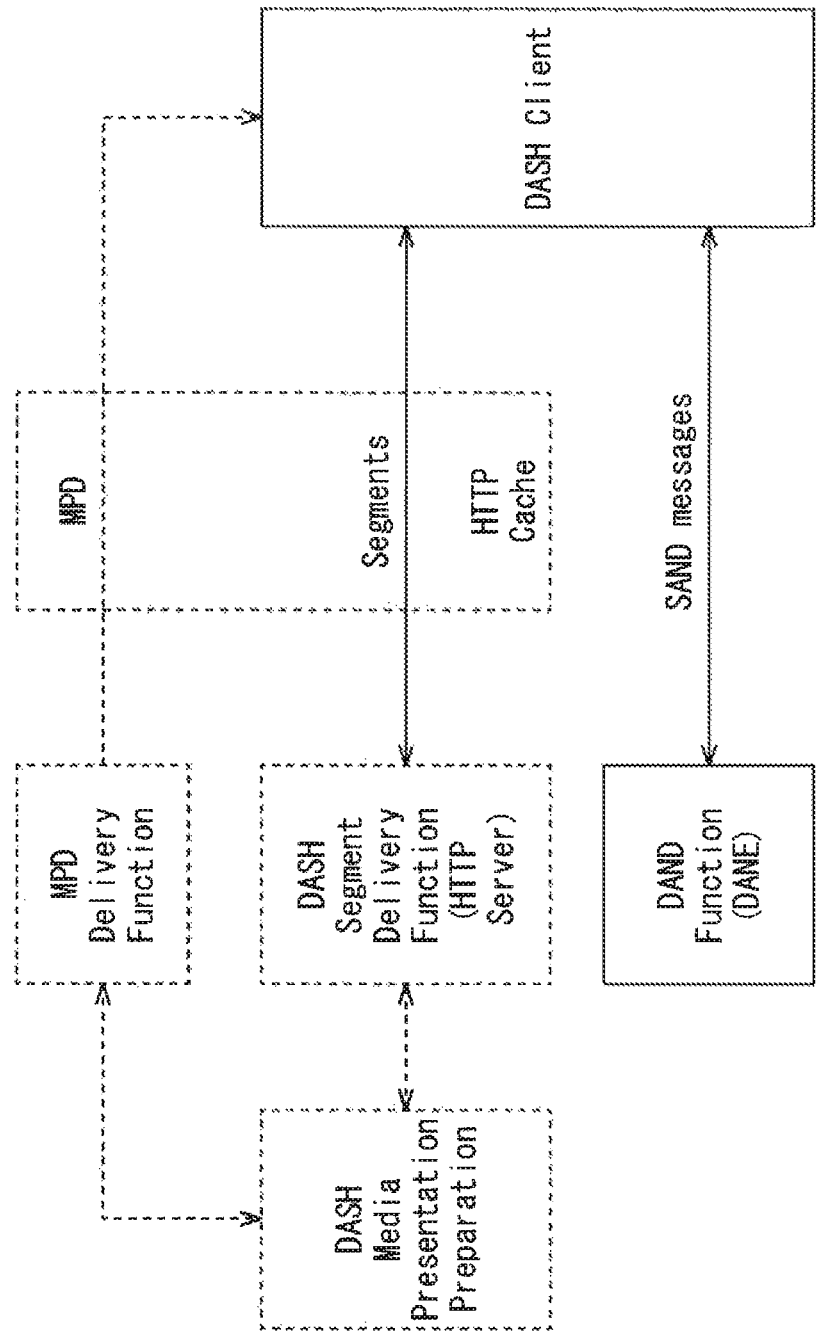
FIG. 54 is a diagram for describing exchange of a message of SAND.

Further, the MPD and the media segment used by the DASH client are provided by the Web server via the HTTP, but as illustrated in FIG. 54, SAND messages are exchanged in a path different from that of a HTTP transaction.

Figure 55:
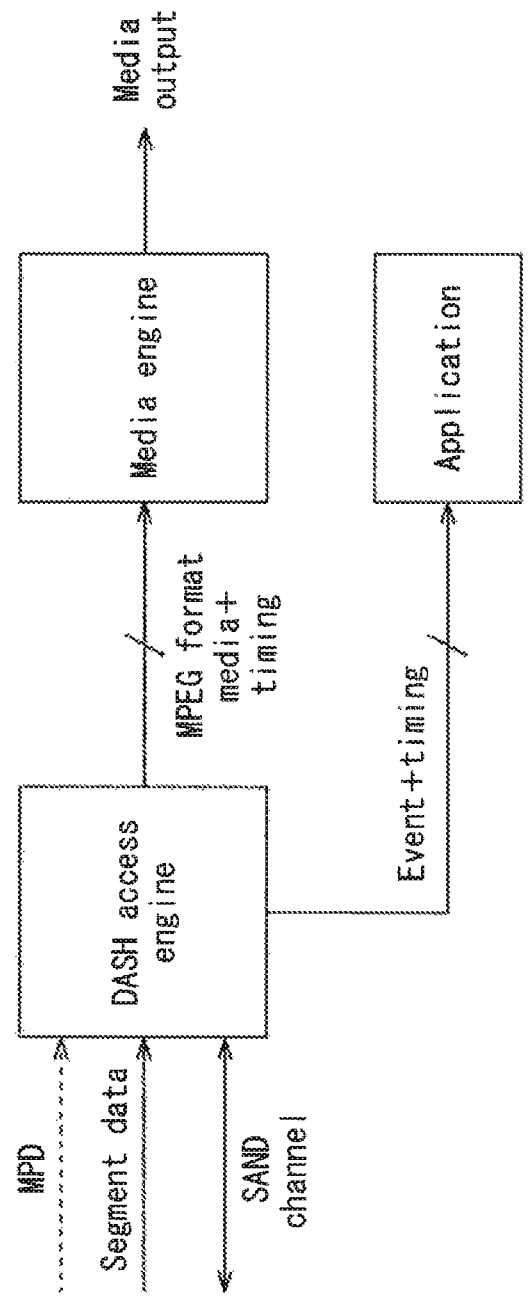
FIG. 55 is a diagram illustrating a flow of a process in a DASH client.

For example, although FIG. 55 illustrates the flow of a process in the DASH client, the MPD and the media segment are used for streaming reproduction itself, whereas SAND is used for optimizing the DASH streaming.

Figure 56:
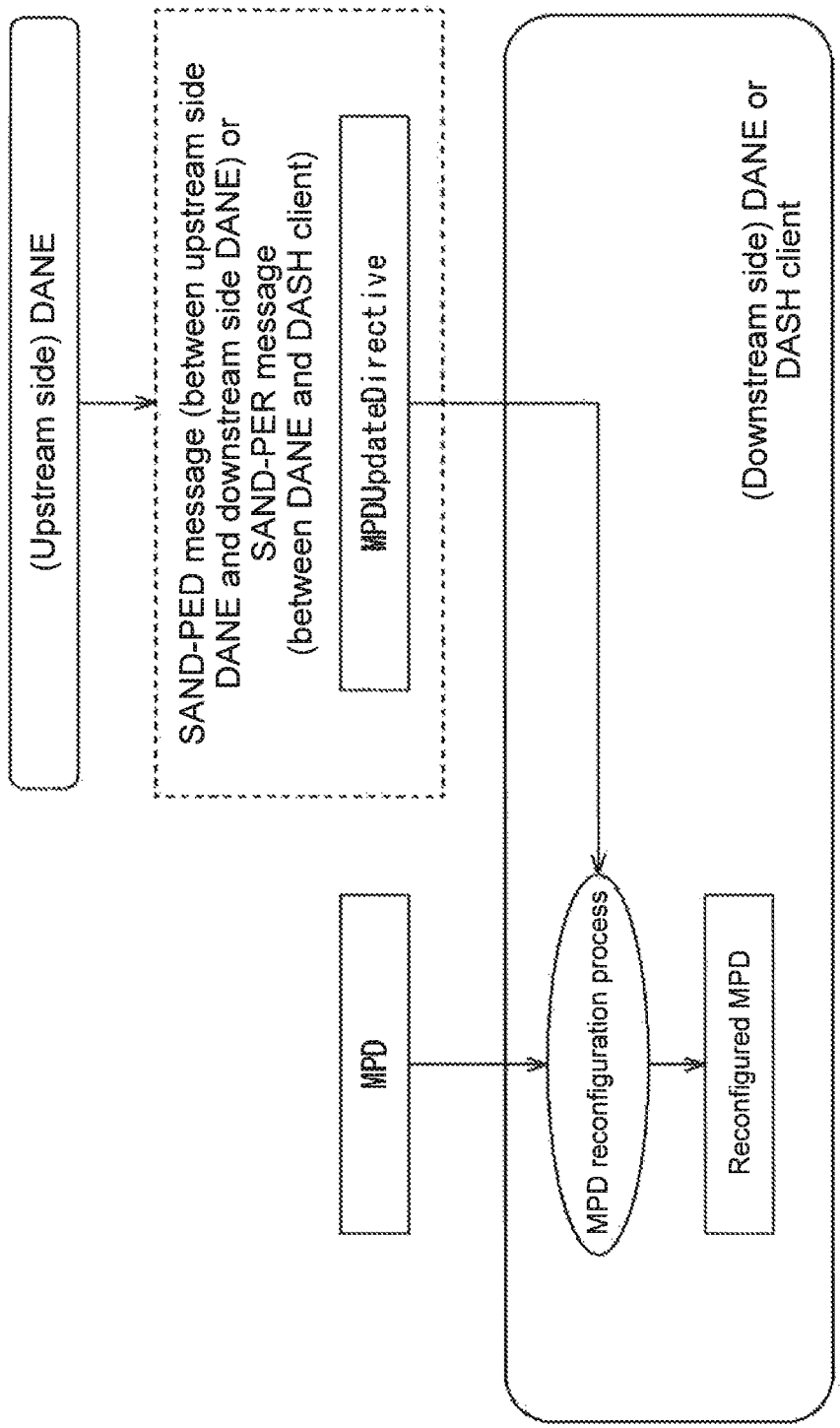
FIG. 56 is a diagram for describing an MPDUpdateDirective message.

Here, as illustrated in FIG. 56, a DANE provided by the content provider (upstream side) and a DANE provided by the service provider (downstream side) are assumed. Note that there are cases where a plurality of DANEs is configured in each content provider or each service provider.

For example, an MPDUpdateDirective message is introduced as a PED message between DANEs or a PER message from the DANE to the DASH client.

The MPDUpdateDirective message is a message having an element that describes how to update content of the MPD to be modified. The MPDUpdateDirective element which is a root element of the MPDUpdateDirective message has mpdUriReference as an optional attribute so that a URI of a target MPD instance can be designated. A child element has a plurality of DistributionPolicyChange elements, and the DistributionPolicyChange element has an optional PolicyReference attribute as its attribute so that the tag value of target DistributionPolicy can be designated. Further, it has an optional DistiributionPolicy element (the MPD/Period/DistributionPolicy element itself described above) and a LevelChange element. The LevelChange element is configured to be able to store the level value to be updated as an attribute.

Further, for example, the MPDUpdateDirective message of SAND is transferred by HTTP-POST as in the example illustrated in FIG. 57.

Figure 58:
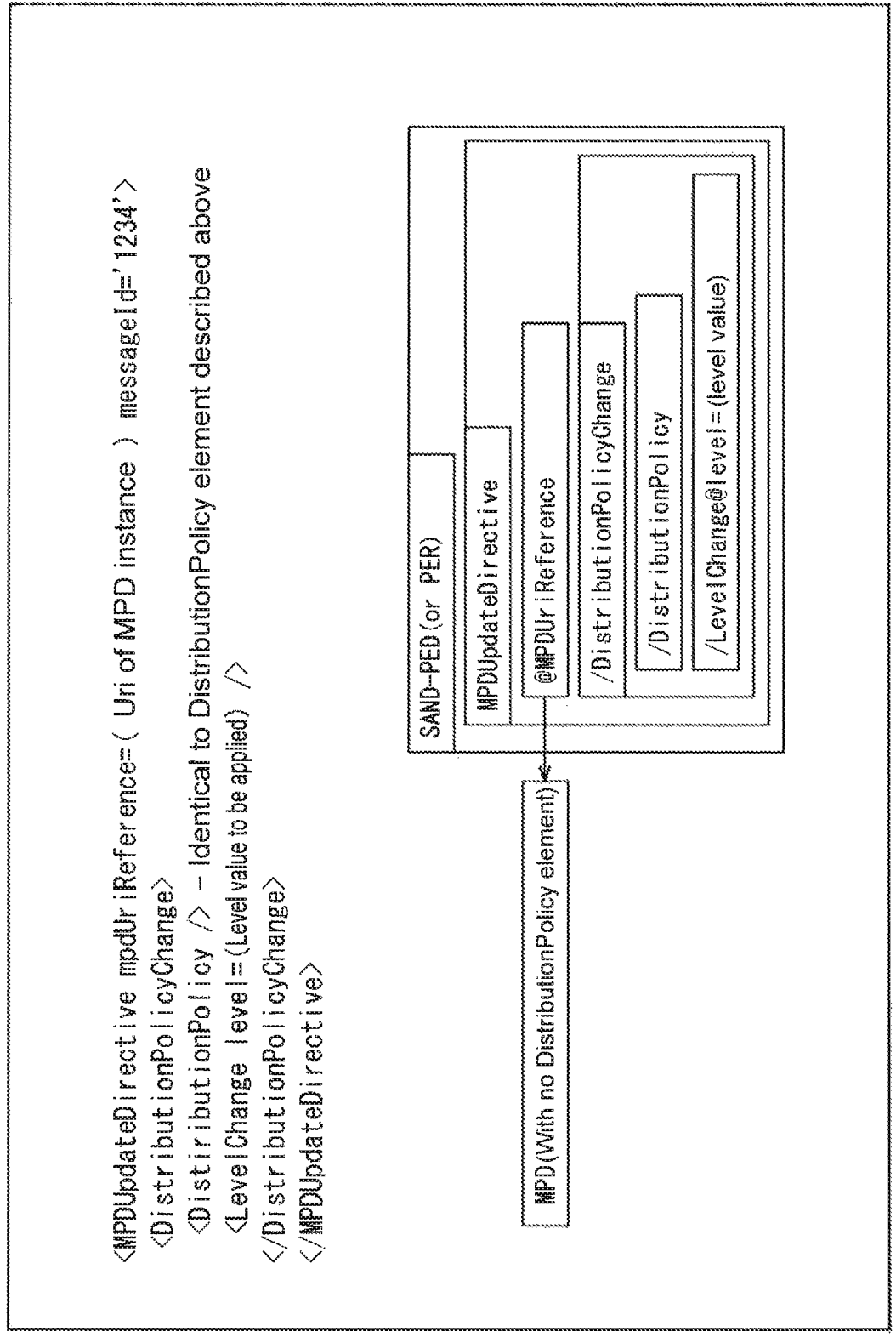
FIG. 58 is a diagram illustrating a first description example of an instance of an MPDUpdateDirective fragment.

FIG. 58 illustrates a first description example of an instance of MPDUpdateDirective fragment. For example, in a case where the MPD does not include the DistributionPolicy element, it is configured to be able to indicate DistributionPolicy and the level to be applied in a case where the MPD is reconfigured by an MPDUpdateDirective fragment illustrated in FIG. 58.

Figure 59:
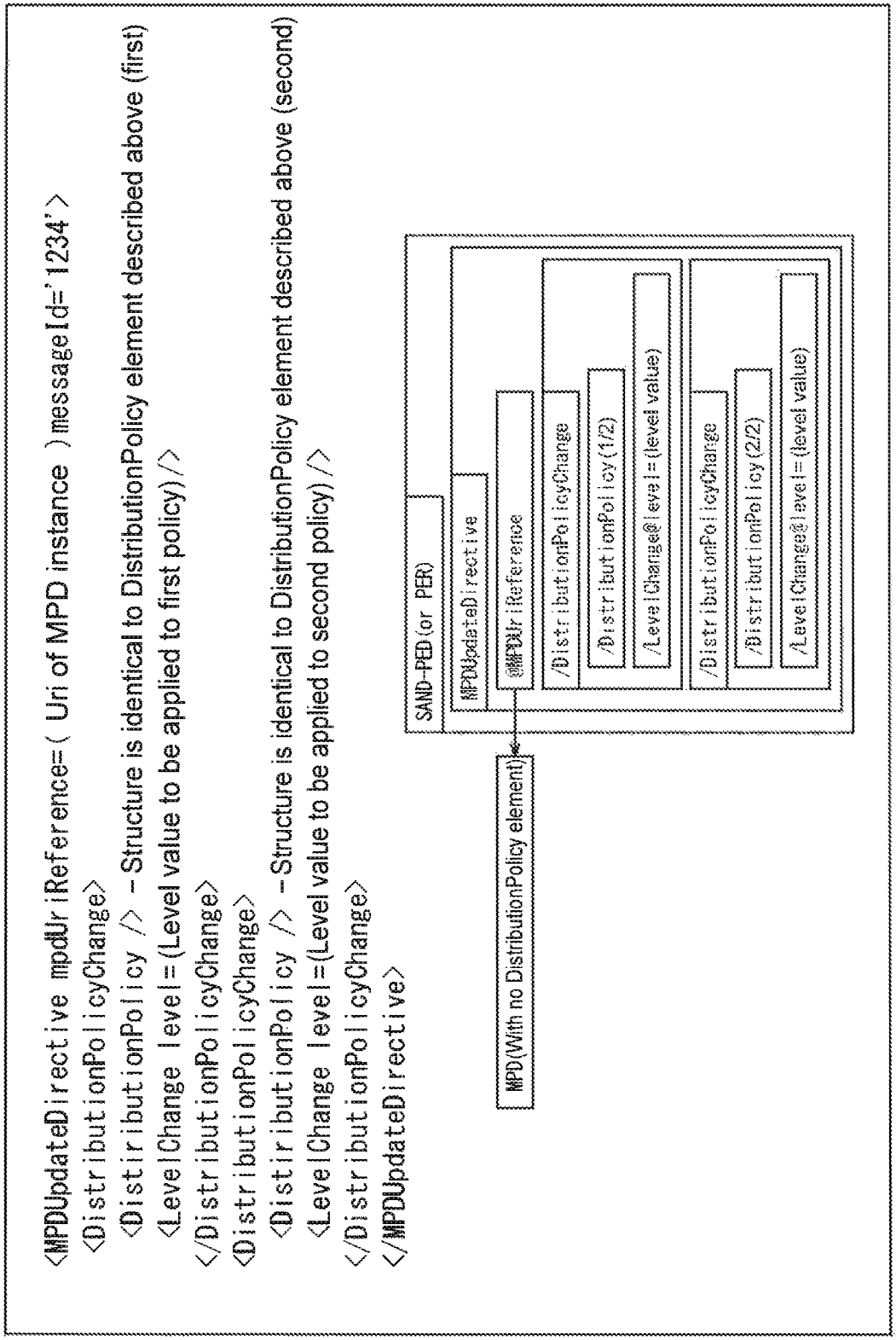
FIG. 59 is a diagram illustrating a second description example of an instance of an MPDUpdateDirective fragment.

FIG. 59 illustrates a second description example of an instance of MPDUpdateDirective fragment. For example, in a case where an MPD does not include the DistributionPolicy element, it is configured to be able to indicate two DistributionPolicies and the levels thereof applied in a case where the MPD by an MPDUpdateDirective fragment illustrated in FIG. 59.

Figure 60:
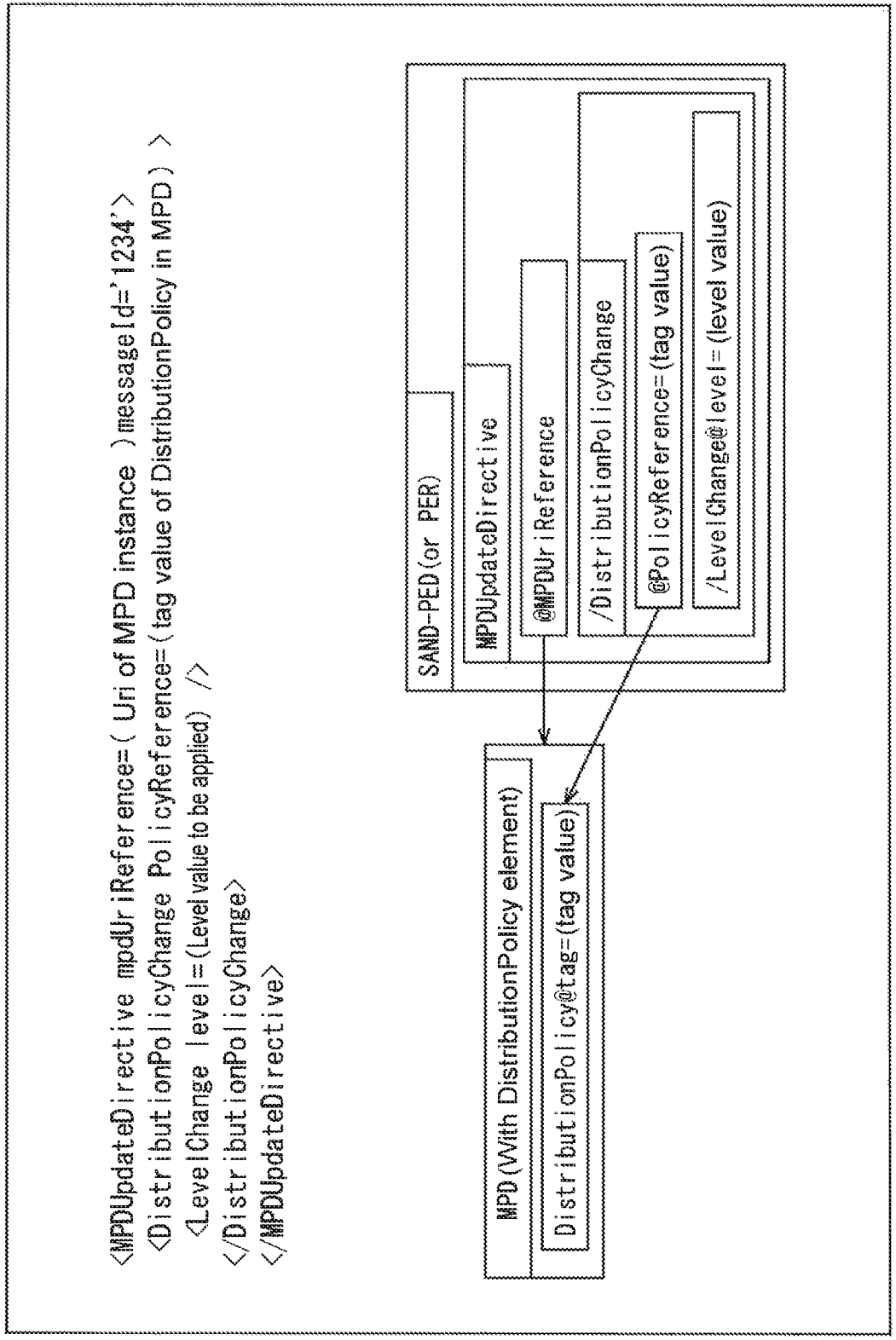
FIG. 60 is a diagram illustrating a third description example of an instance of an MPDUpdateDirective fragment.

FIG. 60 illustrates a third description example of an instance of the MPDUpdateDirective fragment. For example, in a case where the MPD includes one DistributionPolicy element, it is configured to be able to indicate DistributionPolicy and the level to be applied in a case where the MPD is reconfigured by an MPDUpdateDirective fragment illustrated in FIG. 60.

Figure 61:
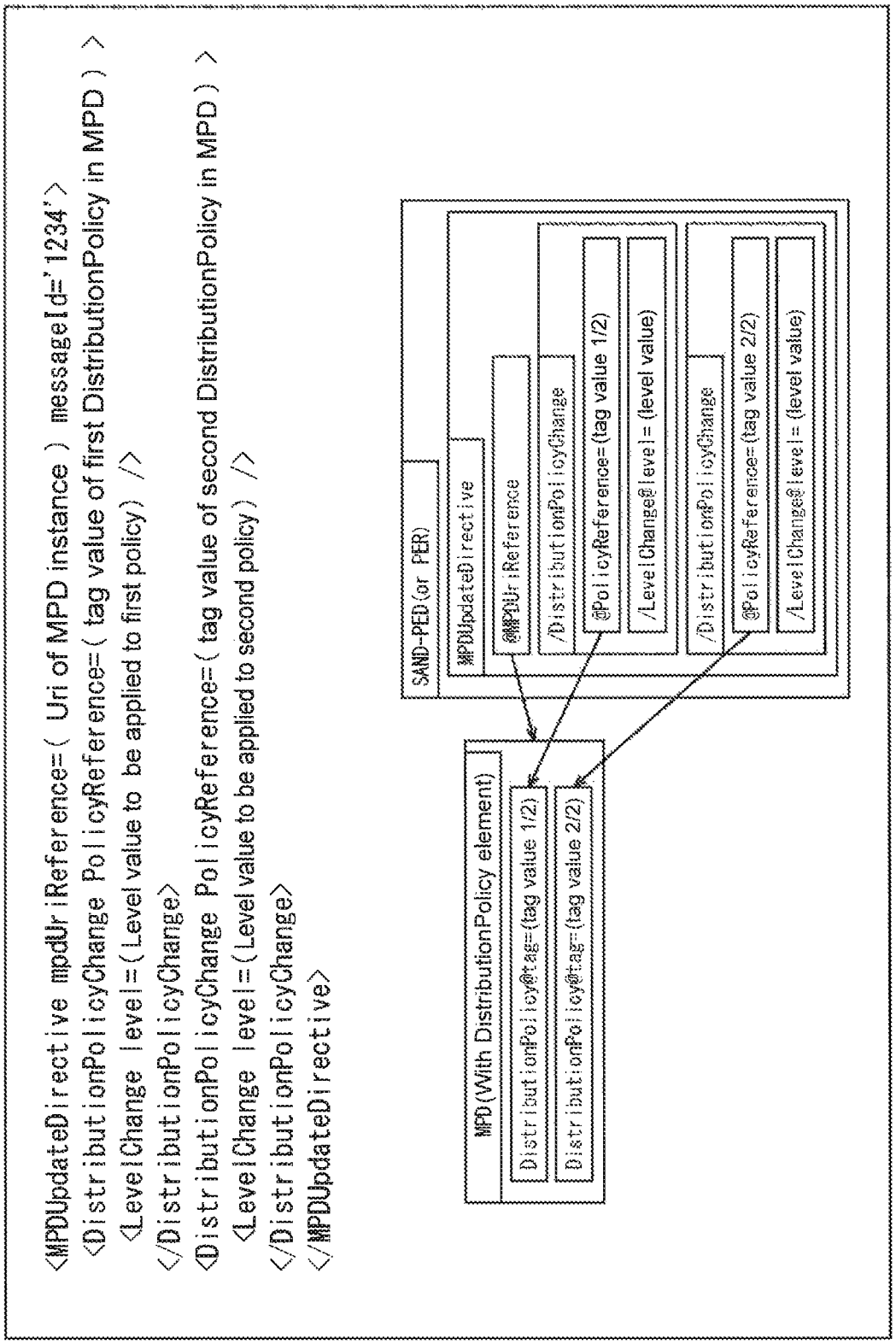
FIG. 61 is a diagram illustrating a fourth description example of an instance of an MPDUpdateDirective fragment.

FIG. 61 illustrates a fourth description example of an instance of the MPDUpdateDirective fragment. For example, in a case where the MPD includes two DistributionPolicy elements, it is configured to be able to indicate each DistributionPolicy and the level to be applied in a case where the MPD is reconfigured by an MPDUpdateDirective fragment illustrated in FIG. 61.

Note that, since messageId identifying the SAND message instance is given to all the SAND messages as an attribute, messageId is added as an attribute of the MPDUpdateDirective element.

<Content Delivery Process>

An example of a content delivery process using MPDUpdateDirective transferred as the SAND-PED will be described with reference to FIGS. 62 to 69.

Figure 62:
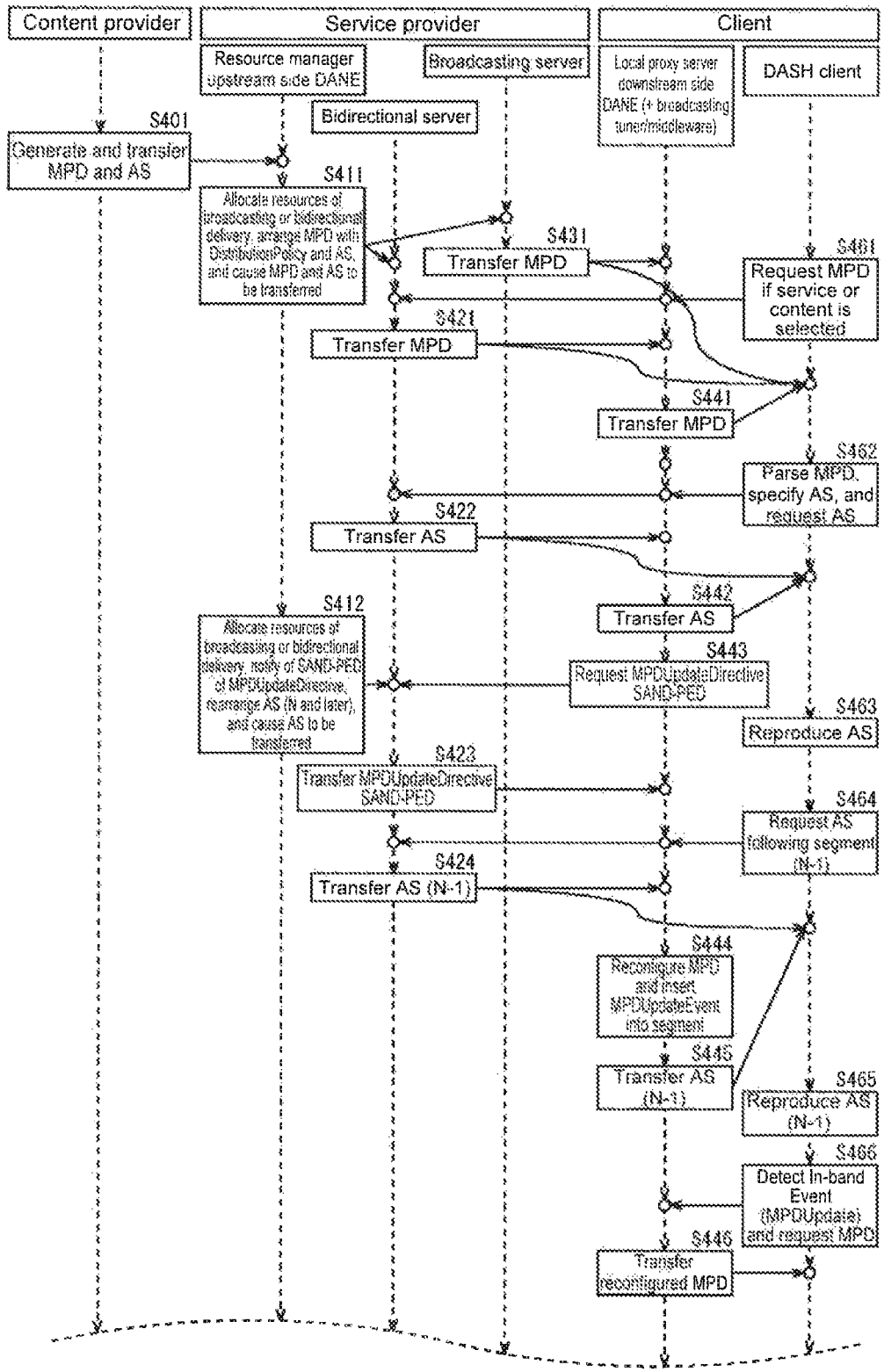
FIG. 62 is a flowchart for describing a content delivery process.

In step S401 of FIG. 62, the content provider 21 generates an MPD and an AS, and transfers them to the CDN service provider 22B.

In step S411 of FIG. 38, a resource manager upstream DANE of the CDN service provider 22 allocates resources of the broadcasting or bidirectional delivery, arranges the MPD with DistributionPolicy and the AS in the bidirectional server and the broadcasting server, and transfers them. In step S412, the resource manager upstream DANE of the CDN service provider 22 allocates resources of the broadcasting or bidirectional delivery, notifies of the SAND-PED of MPDUpdateDirective, rearranges the AS (N and later) in the bidirectional server, and causes the AS to be transferred.

Similarly, in step S413 of FIG. 63, the resource manager upstream DANE of the CDN service provider 22 allocates resources of the broadcasting or bidirectional delivery, notifies of the SAND-PED of MPDUpdateDirective, rearranges the AS (M and later) in the bidirectional server, causes the AS to be transferred.

If there is a request for the MPD from the client 13 after the MPD with DistributionPolicy and the and AS are arranged by the resource manager in step S411, in step S421 of FIG. 62, the bidirectional server of the CDN service provider 22 transfers the MPD to the client 13. Thereafter, if there is a request for the AS from the client 13, in step S422, the bidirectional server of the CDN service provider 22 transfers the AS to the client 13. Further, if there is a request for the MPDUpdateDirective SAND-PED from the client 13 after the AS (N and later) is rearranged by the resource manager in step S412, in step S423, the bidirectional server of the CDN service provider 22 transfers the MPDUpdateDirective SAND-PED to the client 13. Note that an example of MPDUpdateDirective is illustrated in FIG. 65. Then, if there is a request for the AS from the client 13, in step S424, the bidirectional server of the CDN service provider 22 transfers the AS (N−1) to the client 13.

Similarly, if there is a request for the AS (N) from the client 13, in step S425, the bidirectional server of the CDN service provider 22 transfers the AS (N) to the client 13. Thereafter, if there is a request for MPDUpdateDirective from the client 13 after the AS (M and later) is rearranged by the resource manager, in step S426, the bidirectional server of the CDN service provider 22 transfers MPDUpdateDirective to the client 13. Note that an example of transferred MPDUpdateDirective is illustrated in FIG. 68.

Further, if there is a request for the AS following segment (M−1) from the client 13, in step S427, the bidirectional server of the CDN service provider 22 transfers the AS (M−1) to the client 13. Then, if there is a request for the AS following segment (M) from the client 13, in step S428, the bidirectional server of the CDN service provider 22 transfers the AS (M) to the client 13.

In step S431 in FIG. 62, the broadcasting server of the CDN service provider 22 transfers the MPD to the client 13 after the MPD with DistributionPolicy and the and AS are arranged by the resource manager in step S411. Thereafter, the bidirectional server of the CDN service provider 22 transfers the AS (N) to the client 13 in step S432, and transfers the AS (M−1) to the client 13 in step S443.

The local proxy server downstream side DANE of the client 13 acquires the MPD transferred from the broadcasting server of the CDN service provider 22 in step S431. Then, the local proxy server downstream side DANE of the client 13 transmits the request for the MPD by the DASH client to the CDN service provider 22, and acquires the MPD transferred from the bidirectional server of the CDN service provider 22 in step S421 in response to the request. Then, in step S441, the local proxy server downstream side DANE of the client 13 transfers any one MPD out of the MPD acquired from the broadcasting server and the MPD acquired from the bidirectional server to the DASH client.

Further, the local proxy server downstream side DANE of the client 13 transmits the request for the AS by the DASH client to the CDN service provider 22, and acquires the AS transferred from the bidirectional server of the CDN service provider 22 in step S422 in response to the request. Then, in step S442, the local proxy server downstream side DANE of the client 13 transfers the AS to the DASH client.

In step S443, the local proxy server downstream side DANE of the client 13 requests the MPDUpdateDirective SAND-PED to the CDN service provider 22, and acquires the MPDUpdateDirective SAND-PED transferred from the bidirectional server of the CDN service provider 22 in step S423 in response to the request. Further, the local proxy server downstream side DANE of the client 13 transmits the request for the AS following segment (N−1) by the DASH client to the CDN service provider 22, and acquires the AS (N−1) transferred from the bidirectional server of the CDN service provider 22 in step S424 in response to that request.

Then, in step S444, the local proxy server downstream side DANE of the client 13 reconfigures the MPD, and inserts MPDUpdateEvent into the segment. Note that an example of the reconfigured MPD is illustrated in FIG. 66. In step S445, the local proxy server downstream side DANE of the client 13 transfers the AS (N−1) to the DASH client. Thereafter, if the MPD is requested from the DASH client, in step S466, the local proxy server downstream side DANE of the client 13 transfers the MPD reconfigured in step S444 to the DASH client.

Similarly, the local proxy server downstream side DANE of the client 13 transfers the AS (N) to the DASH client in step S447, and requests the CDN service provider 22 to provide MPDUpdateDirective in step S448. Further, the local proxy server downstream side DANE of the client 13 reconfigures the MPD in step S449, inserts MPDUpdateEvent into the segment, and transfers the AS (M−1) to the DASH client in step S450. Note that an example of the reconfigured MPD is illustrated in FIG. 69.

Then, the local proxy server downstream side DANE of the client 13 transfers the MPD reconfigured in step S449 to the DASH client in step S451, and transfers the AS (M) to the DASH client in step S452.

In step S461, if a service or content is selected, the DASH client of the client 13 requests the MPD of the selected service or content. Thereafter, the DASH client of the client 13 acquires the MPD transferred from the local proxy server downstream side DANE of the client 13 in step S441.

Then, in step S462, the DASH client of the client 13 parses the acquired MPD, specifies the AS, and requests the specified AS. Note that an example of the parsed MPD is illustrated in FIG. 64.

Thereafter, the DASH client of the client 13 acquires the AS transferred from the bidirectional server of the CDN service provider 22 in step S422, and the AS transferred from the local proxy server downstream side DANE of the client 13 in step S442. Then, in step S463, the DASH client of the client 13 reproduces the acquired AS.

Further, in step S464, the DASH client of the client 13 requests the AS following segment (N−1). Thereafter, the DASH client of the client 13 acquires the AS (N−1) transferred from the bidirectional server of the CDN service provider 22 in step S424, that is, the AS transferred from the local proxy server downstream side DANE of the client 13 in step S445. Then, in step S465, the DASH client of the client 13 reproduces the acquired AS (N−1).

Then, in step S466, the DASH client of the client 13 detects the In-band Event and requests the MPD. Then, the local proxy server downstream side DANE of the client 13 acquires the MPD transferred in step S446.

Figure 63:
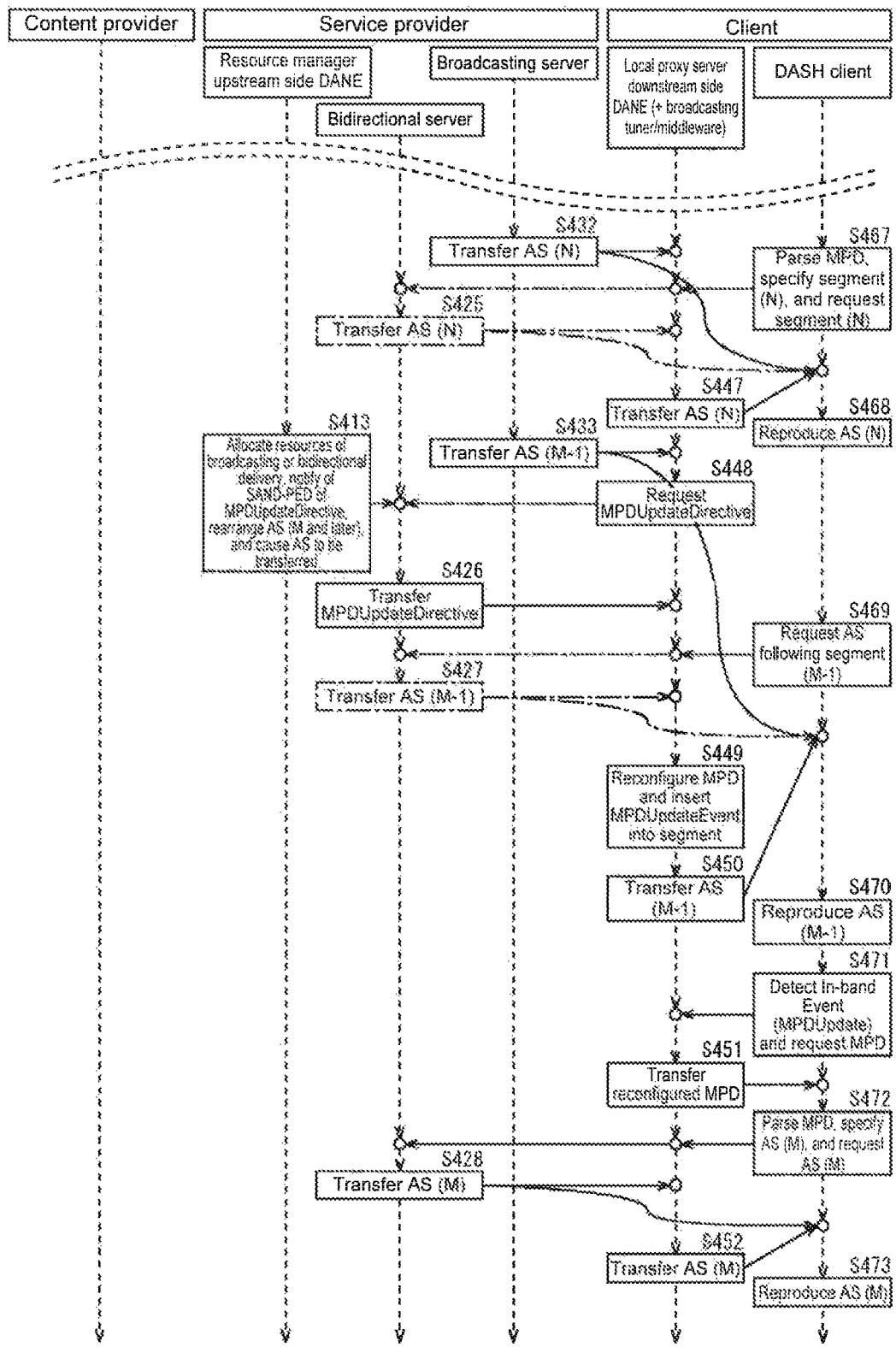
FIG. 63 is a flowchart for describing a content delivery process.

Similarly, the DASH client of the client 13 parses the MPD in step S467 of FIG. 63, specifies the segment (N), requests the specified AS (N), and reproduces the AS (N) in step S468. Note that an example of the MPD parsed in step S467 is illustrated in FIG. 67.

Further, similarly, the DASH client of the client 13 requests the AS following segment (M−1) in step S469, and reproduces the AS (M−1) in step S470. Further, similarly, in step S471, the DASH client of the client 13 detects the In-band Event and requests the MPD. Then, the local proxy server downstream side DANE of the client 13 acquires the MPD transferred in step S451. The DASH client of the client 13 detects the In-band Event in step S471, requests the MPD, parses the MPD in step S472, specifies the segment (M), specifies the specified segment (M), and reproduces the AS (M) in step S473. Note that an example of the reconfigured MPD is illustrated in FIG. 69.

As described above, in a case where the service provider (or the CDN segment manager in the service provider) undertakes the allocation of the broadcast/bidirectional transport resources, the resource manager can notify the client side of the allocation of the transport resource by MPDUpdateDirective transferred as the SAND-PED without rewriting the MPD, and the client side can reconfigure the MPD.

<Signaling Extension of Broadcasting System>

Signaling extension of the broadcasting system will be described with reference to FIG. 70 to FIG. 74.

As described above with reference to FIG. 27, the DASH Event can be used to indicate which the level is applied to DistributionPolicy defined in the MPD to reconfigure the MPD. On the other hand, for example, it is possible to separately define a method of encouraging the reconfiguration of the MPD on the client side without using DASH Event.

For example, in the ATSC and 3GPP-MBMS broadcasting environments, each service layer signaling protocol is extended so that DistributionPolicy and the level thereof can be notified in order to realize the above-described function without using DASH Event.

Figure 70:
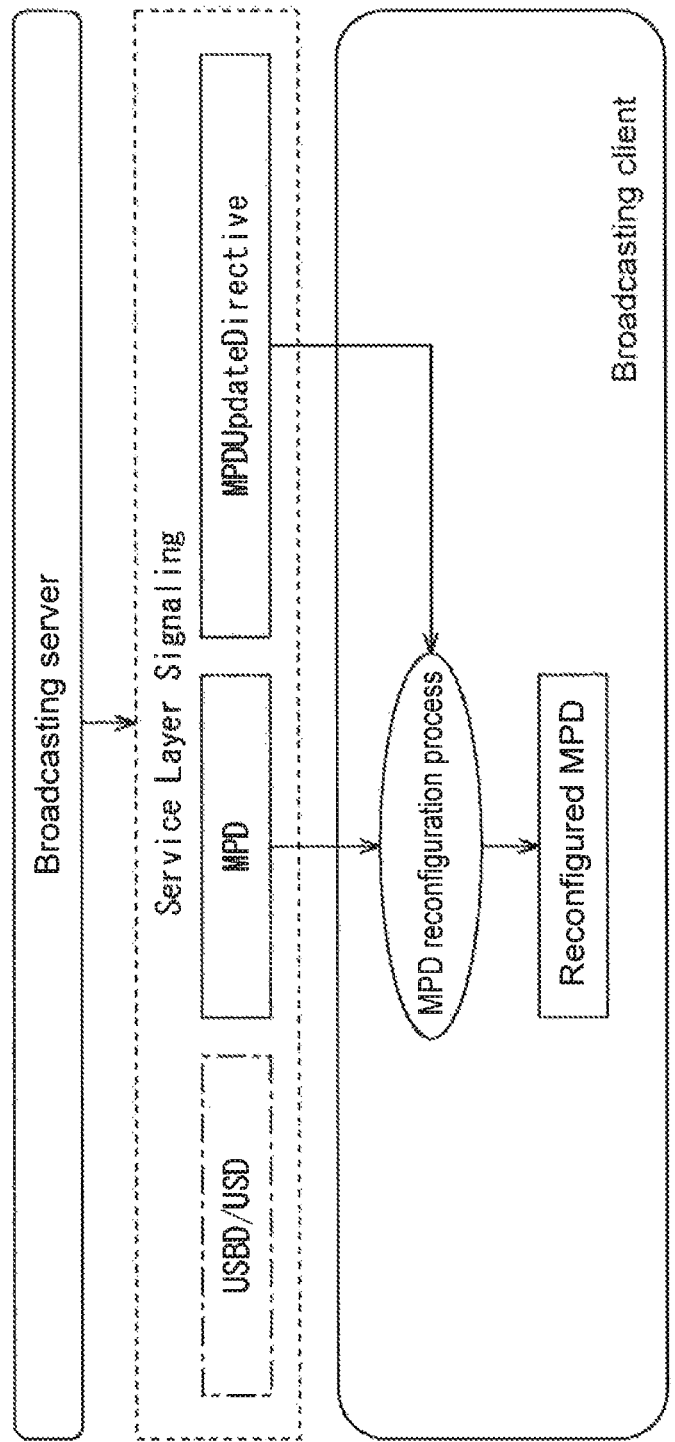
FIG. 70 is a diagram for describing signaling extension of a broadcasting system.

In other words, as illustrated in FIG. 70, in ATSC 3.0, an valid MPD can be transmitted to the client at a time point at which the signaling is delivered by a signaling fragment (XML) of Service Layer Signaling (SLS). Further, here, the MPDUpdateDirective fragment is introduced as a new signaling fragment.

For example, the MPDUpdateDirective fragment is an element that describes a method of updating content of the valid MPD at that point in time. The MPDUpdateDirective element which is the root element of MPDUpdateDirective fragment has mpdUriReference as an optional attribute so that the URI of the target MPD instance can be designated. A child element has a plurality of DistributionPolicyChange elements, and the DistributionPolicyChange element has an optional PolicyReference attribute as its attribute so that the tag value of target DistributionPolicy can be designated. Further, it has an optional DistributionPolicy element (the MPD/Period/DistributionPolicy element itself described above) and a LevelChange element. The LevelChange element is configured to be able to store the level value to be updated as an attribute.

Figure 71:
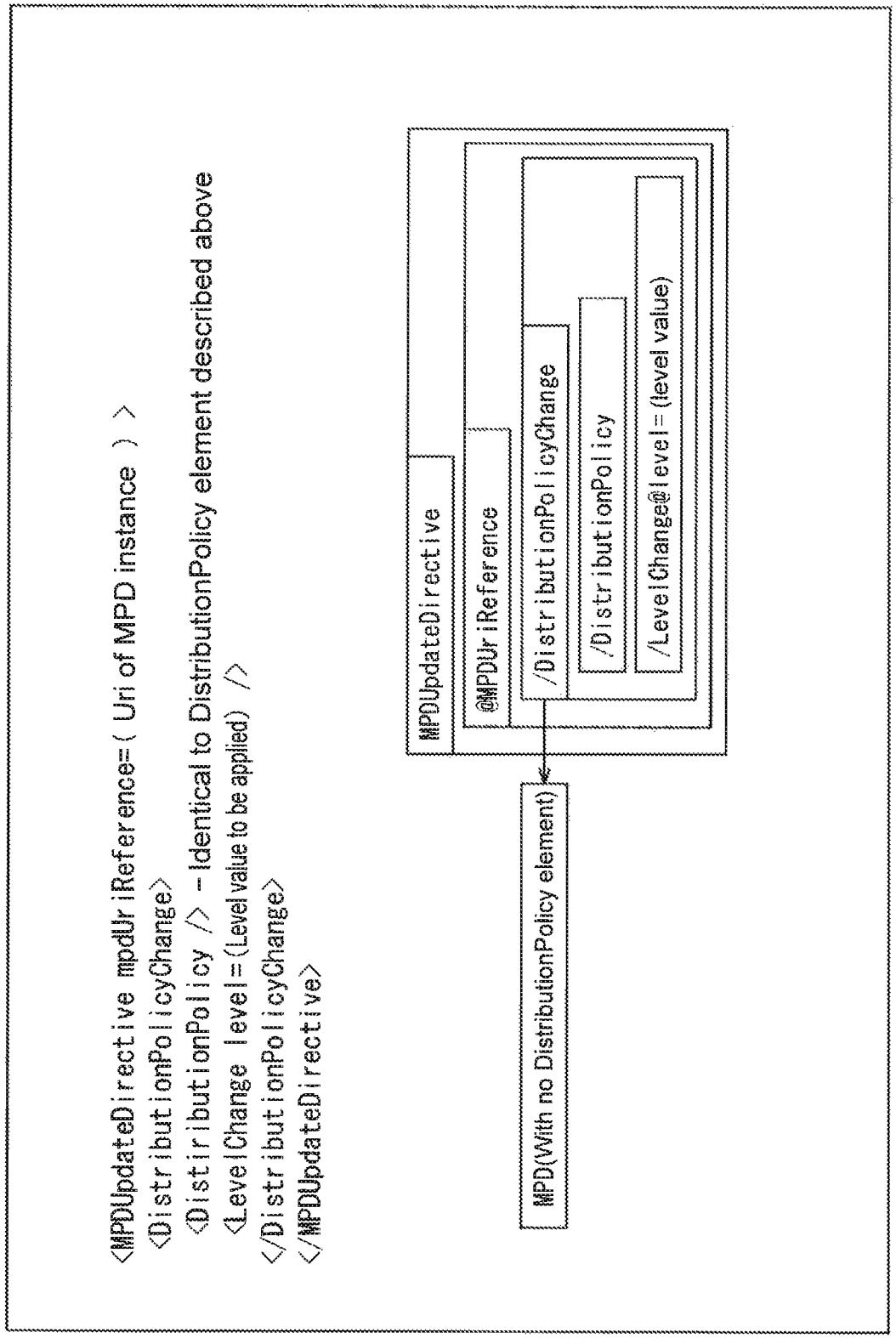
FIG. 71 is a diagram illustrating a first description example of an instance of an MPDUpdateDirective fragment.

FIG. 71 illustrates a first description example of an instance of MPDUpdateDirective fragment. For example, in a case where the MPD does not include the DistributionPolicy element, it is configured to be able to indicate DistributionPolicy and the level to be applied in a case where the MPD is reconfigured by an MPDUpdateDirective fragment illustrated in FIG. 71.

Figure 72:
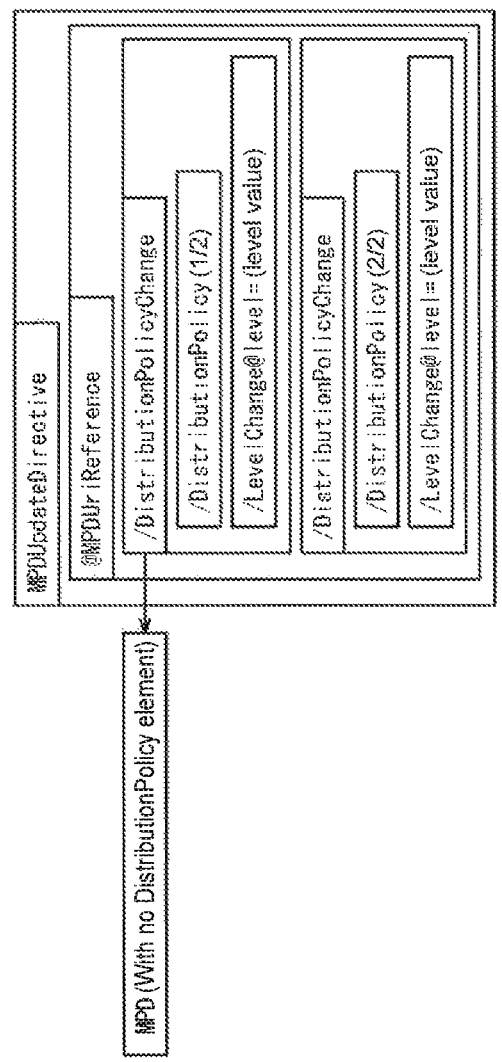
FIG. 72 is a diagram illustrating a second description example of an instance of an MPDUpdateDirective fragment.

FIG. 72 illustrates a second description example of an instance of MPDUpdateDirective fragment. For example, in a case where an MPD does not include the DistributionPolicy element, it is configured to be able to indicate two DistributionPolicies and the levels thereof applied in a case where the MPD by an MPDUpdateDirective fragment illustrated in FIG. 59.

Figure 73:
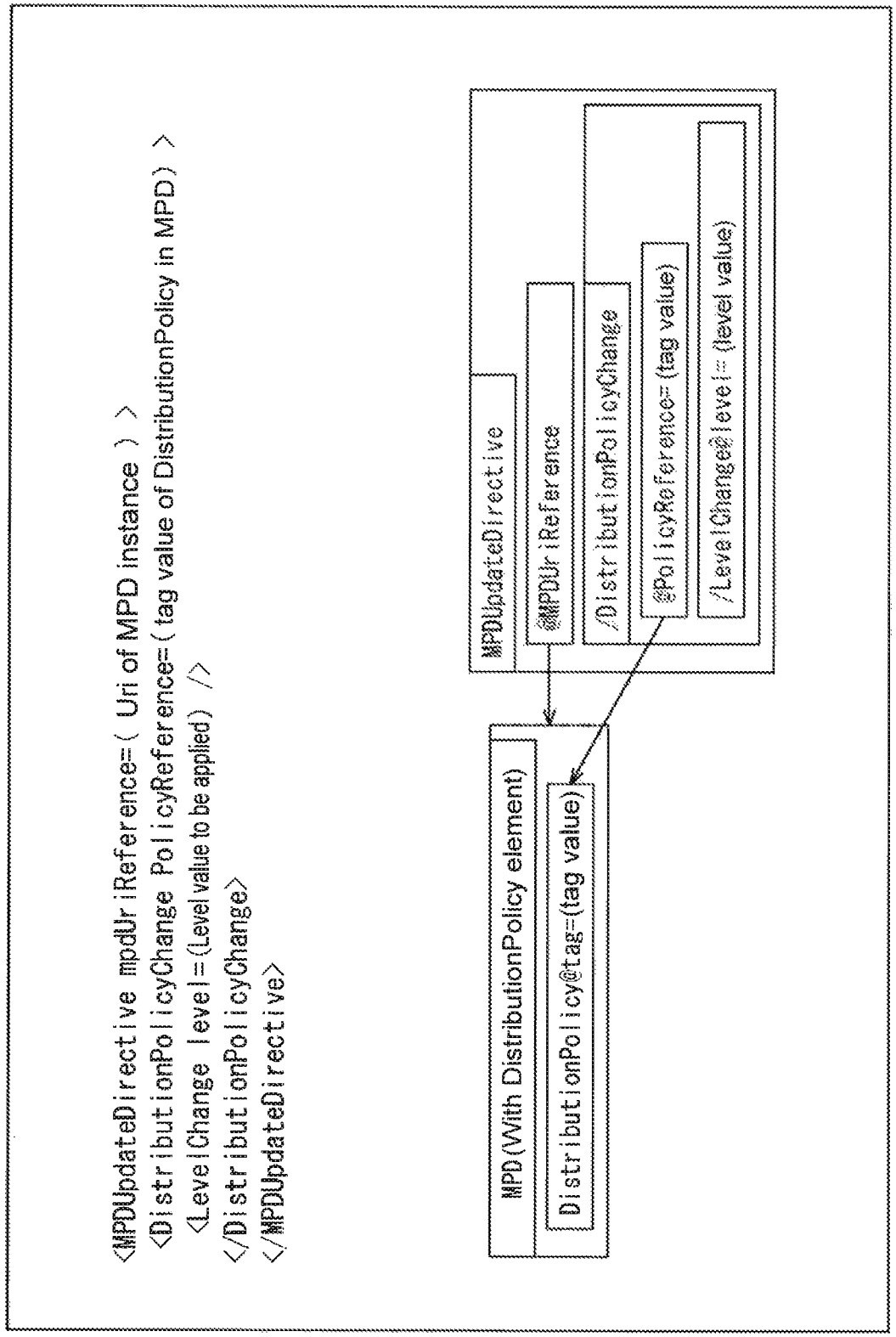
FIG. 73 is a diagram illustrating a third description example of an instance of an MPDUpdateDirective fragment.

FIG. 73 illustrates a third description example of an instance of the MPDUpdateDirective fragment. For example, in a case where the MPD includes one DistributionPolicy element, it is configured to be able to indicate DistributionPolicy and the level to be applied in a case where the MPD is reconfigured by an MPDUpdateDirective fragment illustrated in FIG. 60.

Figure 74:
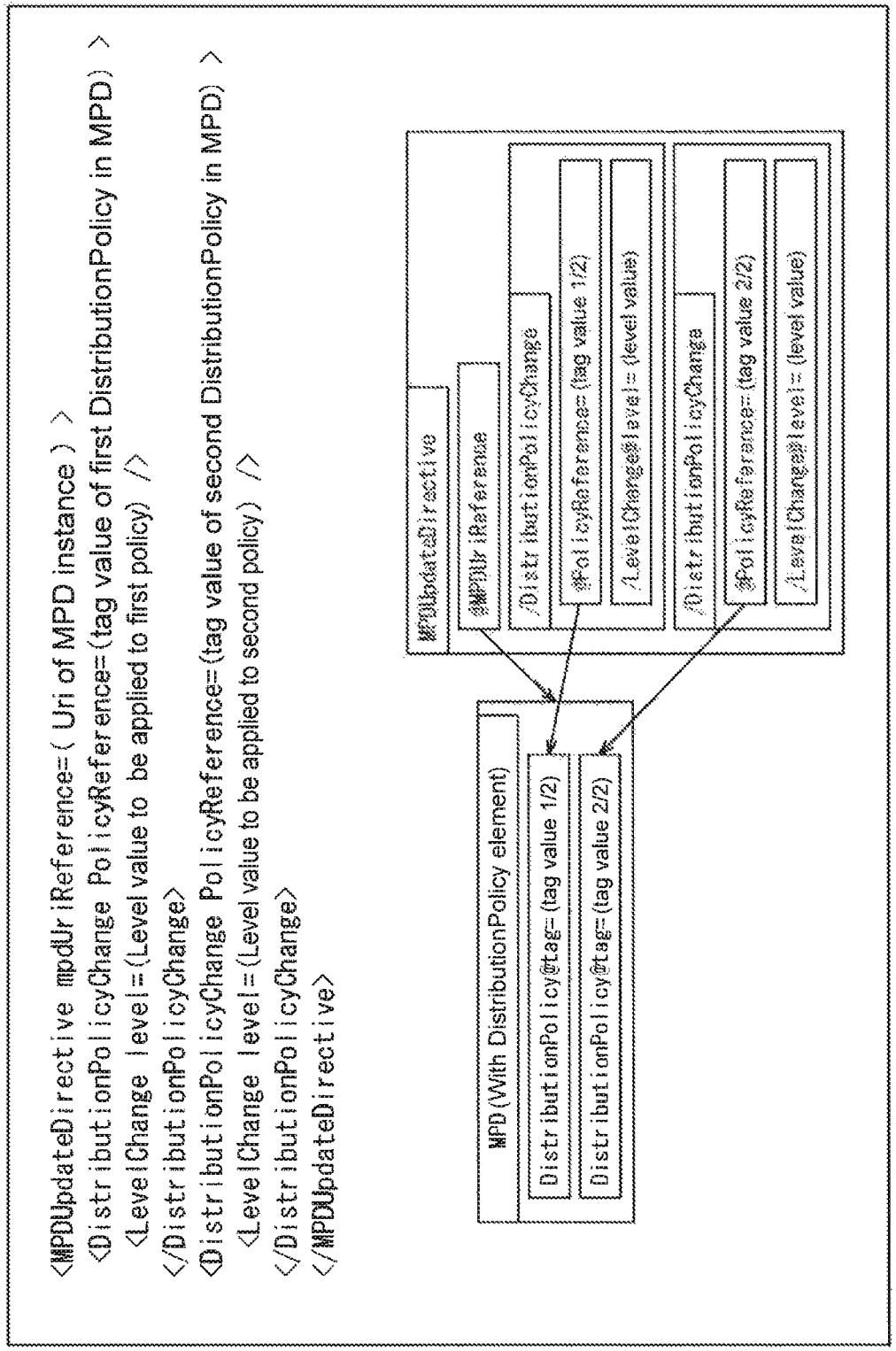
FIG. 74 is a diagram illustrating a fourth description example of an instance of an MPDUpdateDirective fragment.

FIG. 74 illustrates a fourth description example of an instance of the MPDUpdateDirective fragment. For example, in a case where the MPD includes two DistributionPolicy elements, it is configured to be able to indicate each DistributionPolicy and the level to be applied in a case where the MPD is reconfigured by an MPDUpdateDirective fragment illustrated in FIG. 61.

<Content Delivery Process>

An example of a content delivery process using MPDUpdateDirective transferred as the signaling fragment of ATSC 3.0 or 3GPP-MBMS will be described with reference to FIGS. 75 to 80.

In step S501, the content provider 21 generates an MPD and an AS, and transfers them to the CDN service provider 22.

The resource manager of the CDN service provider 22 receives the MPD and the AS transferred from the content provider 21 in step S501. Then, in step S511, the resource manager of the CDN service provider 22 allocates resources of the broadcasting or bidirectional delivery, rewrites the MPD, arranges the MPD and the AS in the bidirectional server and the broadcasting server, and transfers them. In step S512, the resource manager of the CDN service provider 22 allocates resources of the broadcasting or bidirectional delivery, performing signaling broadcasting of MPDUpdateDirective, rearranges the AS (N and later) in the bidirectional server and the broadcasting server, and causes it to be transferred. Note that an example of MPDUpdateDirective is illustrated in FIG. 65.

Similarly, in step S513 of FIG. 76, the resource manager of the CDN service provider 22 allocates resources of the broadcasting or bidirectional delivery, performs signaling broadcasting of MPDUpdateDirective, rearranges the AS (M and later) in the bidirectional server and the broadcasting server, and causes it to be transferred. Note that an example of MPDUpdateDirective is illustrated in FIG. 68.

Figure 75:
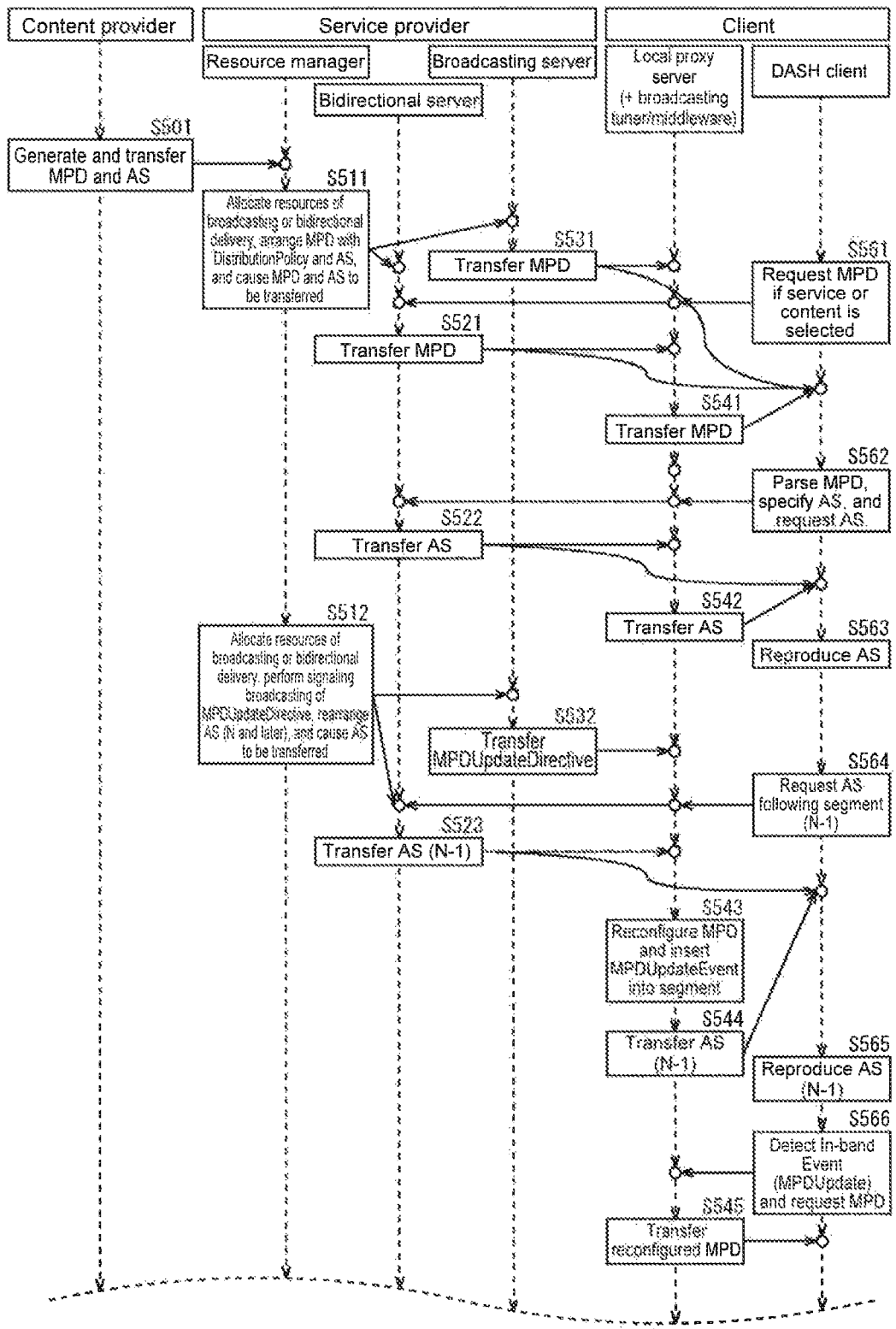
FIG. 75 is a flowchart for describing a content delivery process.

If there is a request for the MPD from the client after the MPD with DistributionPolicy and the AS are arranged by the resource manager in step S511, in step S521 of FIG. 75, the bidirectional server of the CDN service provider 22 transfers the MPD to the client 13. Thereafter, if there is a request for the AS from the client 13, in step S522, the bidirectional server of the CDN service provider 22 transfers the AS to the client 13. Further, if there is a request for the AS from the client 13 after the AS (N and later) is rearranged by the resource manager in step S512, in step S523, the bidirectional server of the CDN service provider 22 transfers the AS (N−1) to the client 13.

Figure 76:
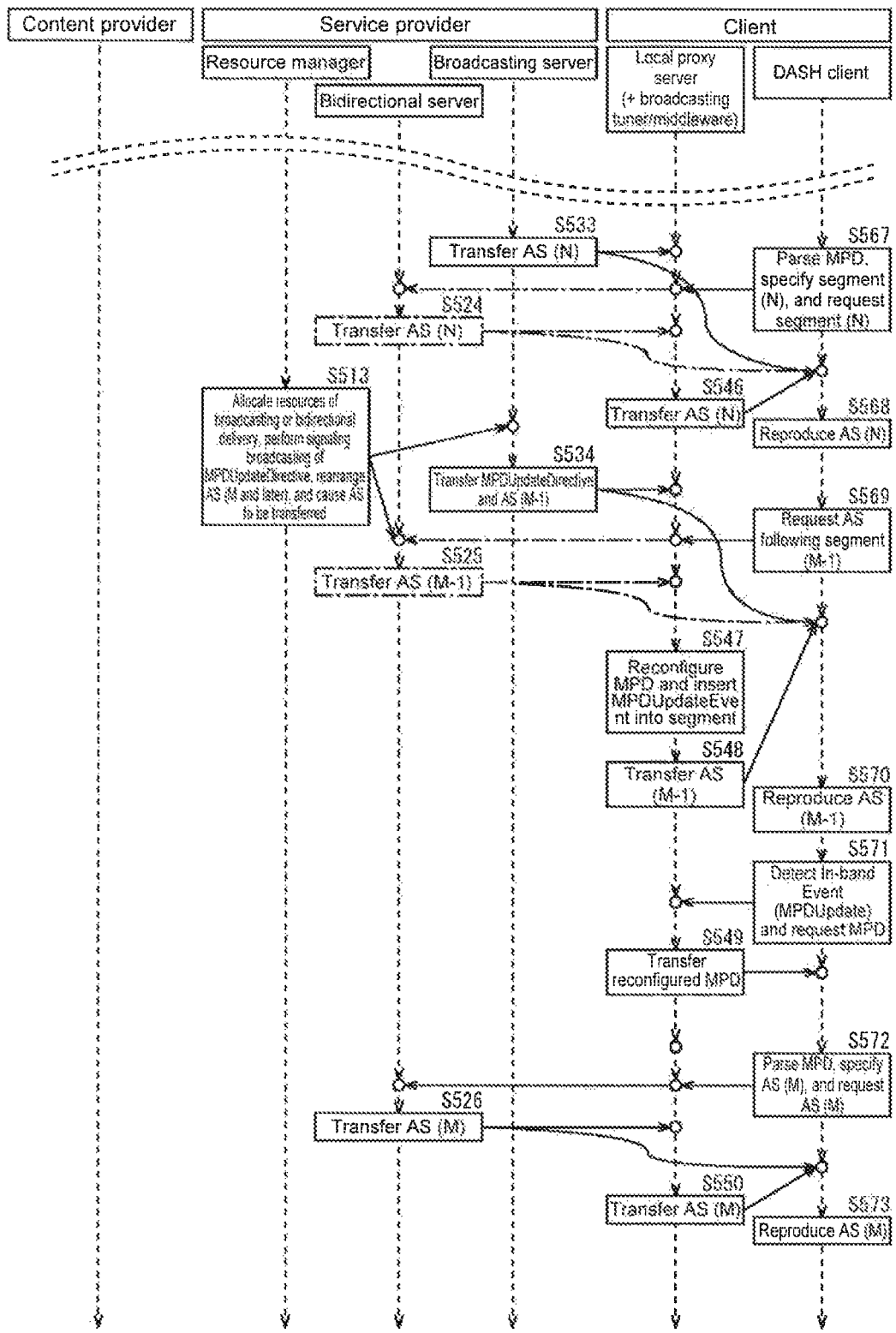
FIG. 76 is a flowchart for describing a content delivery process.

Similarly, if there is a request for the AS from the client 13, in step S524 of FIG. 76, the bidirectional server of the CDN service provider 22 transfers the AS (N) to the client 13. Thereafter, if there is a request for the AS (M−1) from the client 13 after the AS (M and later) is rearranged by the resource manager, in step S525, the bidirectional server of the CDN service provider 22 transfers the AS (M−1) to the client 13. Further, if there is a request for the AS (M) from the client 13, in step S526, the bidirectional server of the CDN service provider 22 transfers the AS (M) to the client 13.

After the MPD with DistributionPolicy and the AS are arranged by the resource manager in step S511, in step S531 of FIG. 75, the broadcasting server of the CDN service provider 22 transfers the MPD to the client 13. Thereafter, the broadcasting server of the CDN service provider 22 acquires MPDUpdateDirective generated by the resource manager in step S512, and transfers MPDUpdateDirective to the client 13 in step S532.

Thereafter, in step S533 of FIG. 76, the broadcasting server of the CDN service provider 22 transfers the AS (N) to the DASH client. Further, the resource manager of the CDN service provider 22 acquires MPDUpdateDirective generated in step S513, acquire the rearranged AS (M and later), and transfers MPDUpdateDirective and the AS (M−1) to the client 13 in step S534. Then, in step S535, the broadcasting server of the CDN service provider 22 transfers the AS (N) to the DASH client.

The local proxy server of the client 13 acquires the MPD transferred by the broadcasting server of the CDN service provider 22 in step S531. Then, the client 13 local proxy server transmits the request for the MPD by the DASH client to the CDN service provider 22, and acquires the MPD transferred by the bidirectional server of the CDN service provider 22 in step S521 in response to the request. Then, in step S541, the local proxy server of the client 13 transfers any one MPD out of the MPD acquired from the broadcasting server and the MPD acquired from the bidirectional server to the DASH client.

Further, the local proxy server of the client 13 transmits the request for the AS by the DASH client to the CDN service provider 22, and acquires the AS transferred from the bidirectional server of the CDN service provider 22 in step S522 in response to the request. Then, in step S542, the local proxy server of the client 13 transfers the AS to the DASH client.

Thereafter, the local proxy server of the client 13 acquires MPDUpdateDirective transferred from the broadcasting server of the CDN service provider 22 in step S532. Further, the local proxy server of the client 13 transmits the request for the AS (N−1) by DASH client to the CDN service provider 22, and acquires the AS transferred from the bidirectional server of the CDN service provider 22 in step S523 in response to the request. Then, in step S543, the local proxy server of the client 13 reconfigures the MPD, and inserts MPDUpdateEvent into the segment. Note that an example of the reconfigured MPD is illustrated in FIG. 78.

Further, in step S544, the local proxy server of the client 13 transfers the AS (N−1) to the DASH client. Thereafter, if the MPD is requested from the DASH client, in step S545, the local proxy server of the client 13 transfers the MPD reconfigured in step S543 to the DASH client.

Further, the local proxy server of the client 13 acquires the AS (N) transferred from the broadcasting server of the CDN service provider 22 in step S533. Then, the local proxy server of the client 13 receives the request for the segment (N) by the DASH client, and if a target segment is not received from the broadcasting server, the local proxy server of the client 13 transmits the segment (N) request to the CDN service provider 22, and acquires the AS (N) transferred from the bidirectional server of the CDN service provider 22 in step S524. Then, in step S546, the local proxy server of the client 13 transfers the AS (N) to the DASH client.

Thereafter, the local proxy server of the client 13 acquires MPDUpdateDirective and the AS (M−1) transferred from the broadcasting server of the CDN service provider 22 in step S534. Then, the local proxy server of the client 13 receives the request for the AS following segment (M−1) by the DASH client, and if the target segment is not received from the broadcasting server, the local proxy server of the client 13 transmits the request for the AS following segment (M−1) to the CDN service provider 22, and acquires the AS (M−1) transferred from the bidirectional server of the CDN service provider 22 in step S525 in response to the request.

Then, in step S547, the local proxy server of the client 13 reconfigures the MPD, and inserts MPDUpdateEvent into the segment. Note that an example of the reconfigured MPD is illustrated in FIG. 80. In step S548, the local proxy server of the client 13 transfers the AS (N−1) to the DASH client. Thereafter, if the MPD is requested from the DASH client, in step S549, the local proxy server of the client 13 transfers the MPD reconfigured in step S547 to the DASH client.

Thereafter, the local proxy server of the client 13 transmits the request for the AS (M) by the DASH client to the CDN service provider 22, and acquires the AS (M) transferred from the bidirectional server of the CDN service provider 22 in step S526 in response to the request. Then, in step S550, the local proxy server of the client 13 transfers the AS (M) to the DASH client.

In step S561, if a service or content is selected, the DASH client of the client 13 requests the MPD of the selected service or content. Thereafter, the DASH client of the client 13 acquires any one MPD transferred from the local proxy server of the client 13 in step S541 out of the MPD transferred from the bidirectional server of the CDN service provider 22 in step S521 and the MPD transferred from the broadcasting server of the CDN service provider 22 in step S531.

Then, in step S562, the DASH client of the client 13 parses the acquired MPD, specifies the AS, and requests the specified AS. Note that an example of the parsed MPD is illustrated in FIG. 77.

Thereafter, the DASH client of the client 13 acquires the AS transferred from the bidirectional server of the CDN service provider 22 in step S522, and the AS transferred from the local proxy server of the client 13 in step S542. Then, in step S563, the DASH client of the client 13 reproduces the acquired AS.

Further, in step S564, the DASH client of the client 13 requests the AS following segment (N−1). Thereafter, the DASH client of the client 13 acquires the AS (N−1) transferred from the bidirectional server of the CDN service provider 22 in step S523, that is, the AS transferred from the local proxy server of the client 13 in step S544. Then, in step S565, the DASH client of the client 13 reproduces the acquired AS (N−1).

Then, in step S566, the DASH client of the client 13 detects the In-band Event (MPDUpdate) and requests the MPD. Then, the local proxy server of the client 13 acquires the MPD transferred in step S545.

Similarly, the DASH client of the client 13 parses the MPD in step S567, specifies the segment (N), requests the specified AS (N), and reproduces the AS (N) in step S568. Note that an example of the MPD parsed in step S567 is illustrated in FIG. 79.

Further, similarly, the DASH client of the client 13 requests the AS following segment (M−1) in step S569, and reproduces the AS (M−1) in step S570. Further, similarly, in step S471, the DASH client of the client 13 detects the In-band Event (MPDUpdate) and requests the MPD. Then, the local proxy server downstream side DANE of the client 13 acquires the MPD transferred in step S549. The DASH client of the client 13 detects the In-band Event in step S571, requests the MPD, parses the MPD in step S572, specifies the AS (M), specifies the specified AS (M), and reproduces the AS (M) in step S573. Note that an example of the reconfigured MPD is illustrated in FIG. 80.

As described above, in a case where the service provider (or the CDN segment manager in the service provider) undertakes the allocation of the broadcast/bidirectional transport resources, the resource manager can notify the client side of the allocation of the transport resource by MPDUpdateDirective transferred as the signaling fragment of ATSC 3.0 or 3GPP-MBMS without rewriting the MPD, and the client side can reconfigure the MPD.

<Other Examples of ResourceSpecificInformation>

Another example of ResourceSpecificInformation will be described with reference to FIGS. 81 to 83.

For example, various types of content for an AdaptationSet group belonging to a certain Level can be described in PolicyDescription of DistributionPolicy. In addition to the above example, it can also be defined on the basis of the constraint of the transport characteristic necessary to transfer the stream. The constraint of the transport characteristic indicates network-requiring quality conditions required when the stream (broadcast) is acquired. For example, there are a delay, delay fluctuation, a loss (error), a throughput, and the like.

Among them, in a case where the delay is used for the constraint description, for example, it is described as in DistributionPolicy.PolicyDescription='one with high delay constraint is broadcast' as illustrated in FIG. 81. Further, it can be described in a ResourceSpecificInformation part of each Level element as in <Level LatencyLimit='100 msec'.../> so that a specific constraint value can be stored for each Level.

Here, for example, Latency is defined as a delay until a first byte of a target segment is acquired after a DASH player issues a segment request. For example, in addition to the delay, delay fluctuation (jitter), an error rate, or the like can be considered, but description rules (attribute name) corresponding to each parameter and its detailed meaning/definition are assumed to be defined separately.

As described above, the MPD using ResourceSpecificInformation is described as illustrated in FIG. 82. As illustrated in FIG. 82, in addition to DistributionMediaDependant Extension/ElementToBeAppended described above, DistributionMediaDependant Extension/ElementToBeRemoved is further described. This indicates an element to be deleted from the AdaptationSet element contained up to the level specified by maxLevelToBeApplied.

Then, the valid MPD to be generated is described as illustrated in FIG. 83. In other words, as illustrated in FIG. 83, BaseURL=/bc is deleted from the AS of AS @id=1 and 2, and BaseURL=/net is added.

It indicates that the bidirectional transport which can be received by the client device to which the MPD illustrated in FIG. 83 is delivered can provide a maximum delay of 50 msec or less, and the AdaptationSet group of (Level [1] and Level [2]) up to Level [2] is transferred thereto. On the other hand, the broadcast transport which can be received by the device can provide a maximum delay of 10 msec or less, and the AdaptationSet group of Level [3] is transferred thereto.

<ATSC 3.0 Client Implementation Model>

Figure 84:
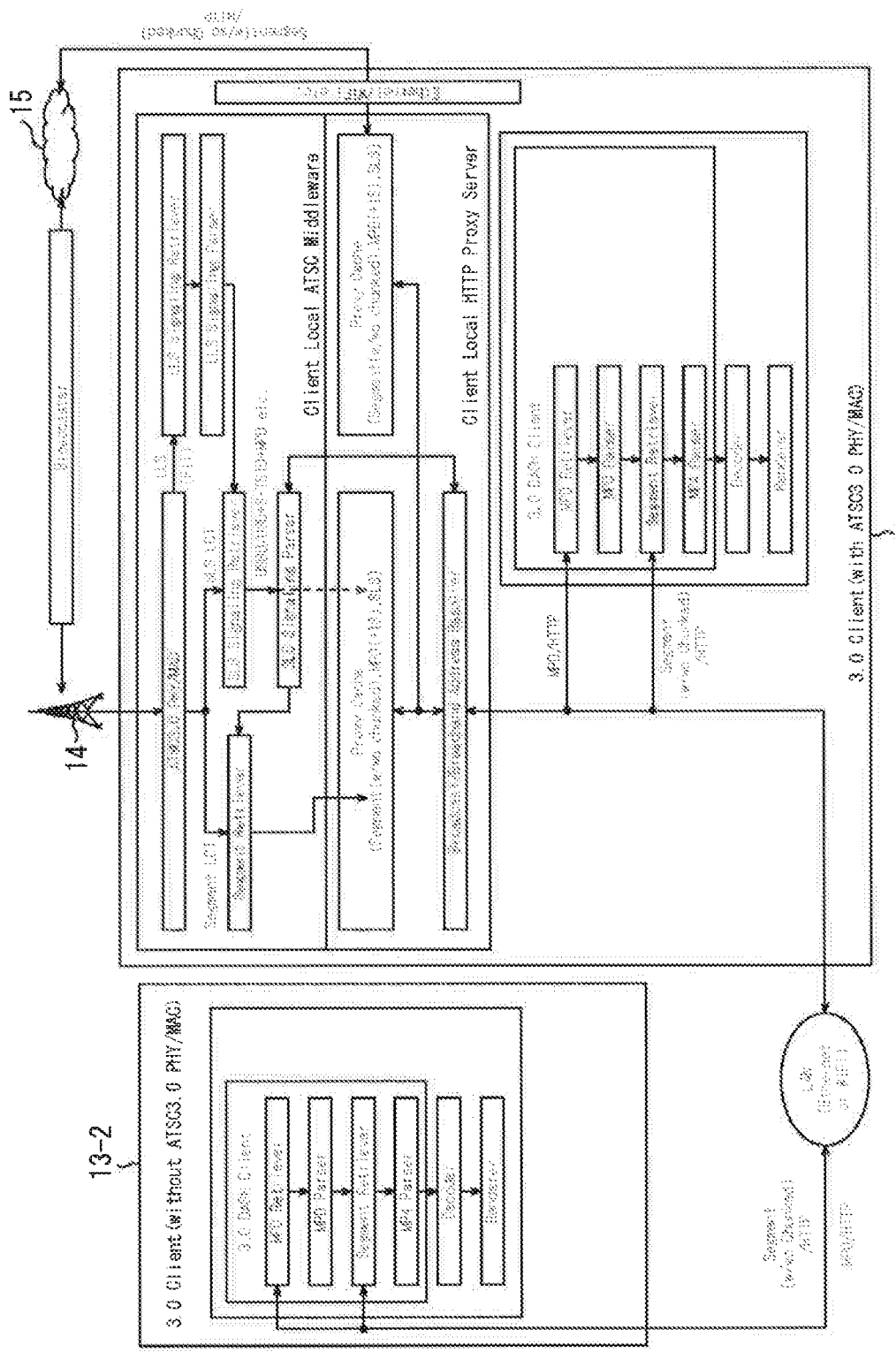
FIG. 84 is a diagram illustrating an ATSC 3.0 client implementation model.

FIG. 84 is a block diagram illustrating a configuration example assumed as an ATSC 3.0 client implementation model.

As illustrated in FIG. 84, an ATSC 3.0 client application ("3.0 DASH Client") is executed on a browser implemented on an ATSC 3.0 broadcast receiving client device ("3.0 Client (with ATSC 3.0 PHY/MAC) having an ATSC 3.0 tuner (PHY/MAC) (there are cases where it is executed not only as browser application but also as a native application).

Further, the ATSC 3.0 client application performs stream rendering or application control in accordance with a DASH-MPD file, a DASH segment file, or a service level signaling (SLS) file which is received by a client local ATSC middleware in which a broadcasting system reception stack is implemented or acquired via a normal network stack that performs a network system transmission/reception process via a client local HTTP proxy server implemented on a client.

Further, the ATSC 3.0 DASH client application can be executed even on a browser (or as a native application) implemented on another device accessible to the ATSC 3.0 broadcast receiving client device via an LAN or the like, and the application also acquires the DASH-MPD file, the DASH segment file, or the service level signaling (SLS) file which is received by the client local ATSC middleware or acquired via the normal network stack via the client local HTTP proxy server implemented on the ATSC 3.0 broadcast receiving client device and performs stream rendering or application control.

For example, in this model, since the application necessarily accesses the outside world via the client local HTTP proxy server, it is not conscious of whether the file group is acquired via the broadcasting or via the network (network transparency is provided), and thus it is possible to increase the portability of the application (it is not necessary to implement it specifically for broadcasting, and the broadcasting can also be implemented regardless of the Internet to be used.

Further, if the ATSC 3.0 DASH client application requests acquisition of the file group (a HTTP request), the client local HTTP proxy server which has received the request performs determination of whether it is acquired via the broadcast reception stack or via the network in "Broadcast/Broadband Address Resolver."

Here, information serving as determination materials is provided by "SLS Signaling Parser." The "SLS Signaling Parser" requests the "SLS Signaling Retriever" to acquire USBD/USD, S-TSID, or the like which is signaling meta of ATSC 3.0. The "SLS Signaling Retriever" extracts the signaling meta carried by an SLS LCT packet which is broadcast and received via an ATSC tuner "ATSC 3.0 PHY/MAC." The "SLS Signaling Parser" also resolves broadcasting delivery address information for acquiring a target file by taking signaling meta from a url included in the segment acquisition request.

Then, if it is known that it is broadcast and delivered or broadcast, the segment LCT packet in which a desired file is stored is acquired from the broadcast stream on the basis of the broadcasting delivery address information and developed in a "Proxy Cache." The client local HTTP proxy server returns the file to the application (as an HTTP response).

As described above, if the url of the requested segment file is not included in the signaling meta, the client local HTTP proxy server acquires the segment file via the normal network stack.

Figure 85:
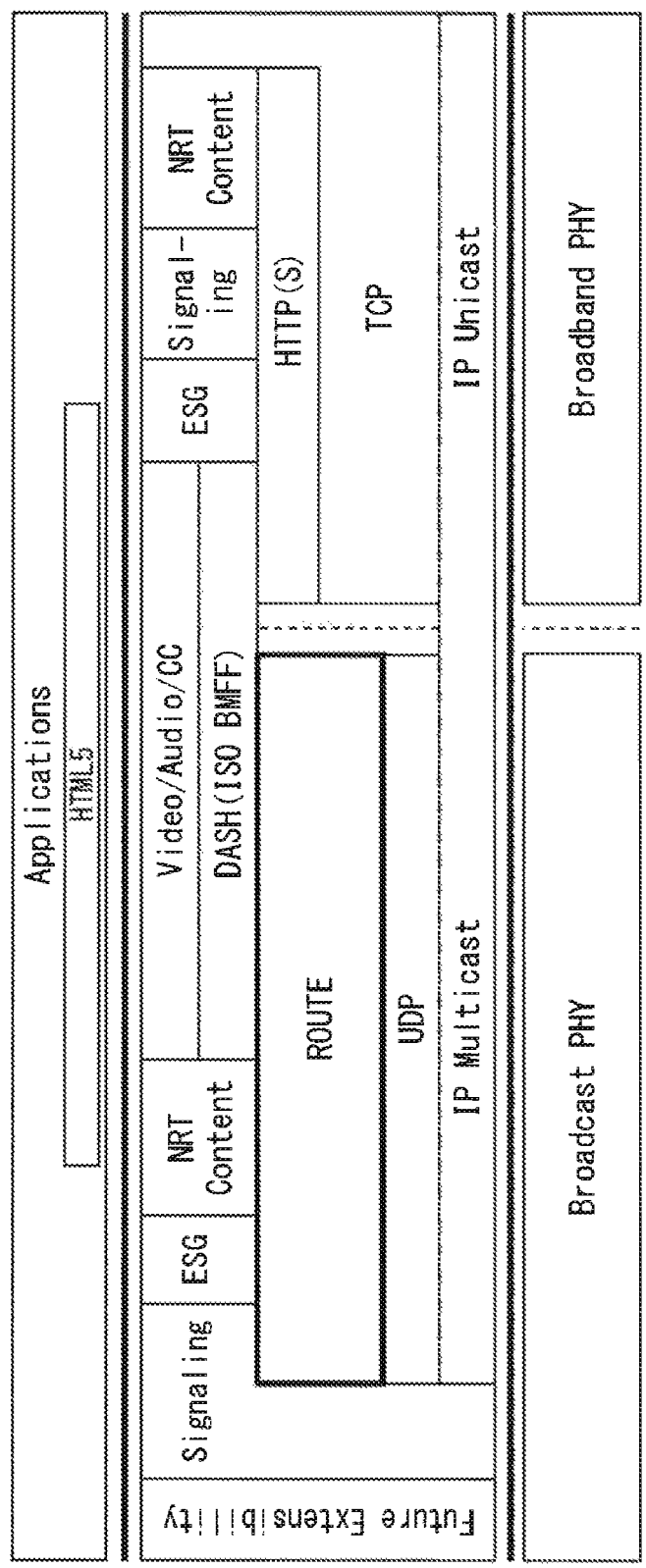
FIG. 85 is a diagram illustrating an Annex.ATSC 3.0 protocol stack.
Figure 86:
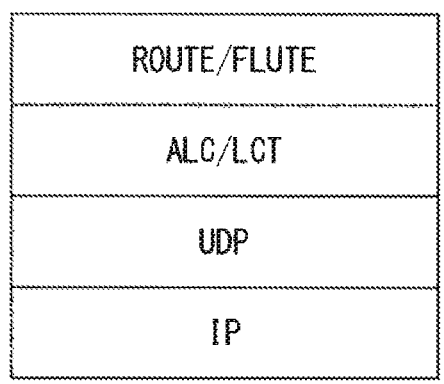
FIG. 86 is a diagram illustrating a ROUTE/DASH-based stack.

Further, FIG. 85 illustrates an ATSC 3.0 protocol stack, and FIG. 86 illustrates a ROUTE/DASH-based stack.

<Second Delivery Method in Content Delivery Method>

Next a second delivery method of the content delivery method to which the present technology is applied will be described.

In the content delivery method (first delivery method) described above, when content is delivered via the service provider that holds a plurality of transport media, either unicast prioritized or broadcast prioritized is selected with reference to the distribution policy. On the other hand, in the second delivery method of the content delivery method, information (priority) to be referred to when the segment is pre-fetched is defined as metadata used similarly to the distribution policy, and thus content is expected to be delivered with a low delay.

For example, the second delivery method of the content delivery method may be employed when a video of a plurality of viewpoints is provided in relay of an event such as sports or in delivery of omnidirectional (360° VR) content or the like. As a method of providing such a video of a plurality of viewpoints, there is, for example, a method of providing a video stream from cameras arranged at a plurality of completely different positions as one content. Further, there are a method of providing an individual video stream for each line of sight direction of the user (referred to as a viewport) in the omnidirectional content and a method of using these methods in combination.

Further, when a video of a plurality of viewpoints is provided, the client may provide various types of (objective) metadata for selecting viewing content for the videos. On the other hand, a recommended viewpoint may be provided on the basis of an intention of a creator (Director's Cut) as in a region of interest (ROI) in the omnidirectional video.

On the other hand, in the second delivery method of the content delivery method, the information (priority) to be referred to when the segment is pre-fetched is provided by the metadata in order to improve the user experience by reducing the delay in the segment data delivery. For example, the priority is allocated such that viewpoints that are expected to be selected by a relatively large number of viewers or angle views of ROIs that are likely to be viewed by the viewers become a high priority. Note that the metadata is different from one used to select a viewing stream on the basis of the user's intention by the client, an interaction including a motion of a viewer wearing an HMD, or the like in the related art.

Further, a content provider, a network, or other sources may be used as a metadata source (a type of a generation source that generates metadata, a provision source that that provides metadata, and an entity that adds metadata). A popularity expected as the intention of the creator that creates the content may be used as metadata provided by the content provider. Further, an actual measurement value (a value based on actually measured statistics) that represents the rate of selection by the user which is measured when content is actually delivered in the past may be used as the metadata provided by the network. Further, the metadata may also be provided by an entity other than the content provider and the network. As described above, the metadata may be provided simultaneously from a plurality of sources, and each piece of metadata may change with time.

As described above, it is necessary to efficiently describe time-varying metadata provided by a plurality of sources in the MPD of MPEG DASH.

An overview of a content presentation system in which a segment is pre-fetched with reference to metadata indicating a priority will be described with reference to FIG. 87.

Figure 87:
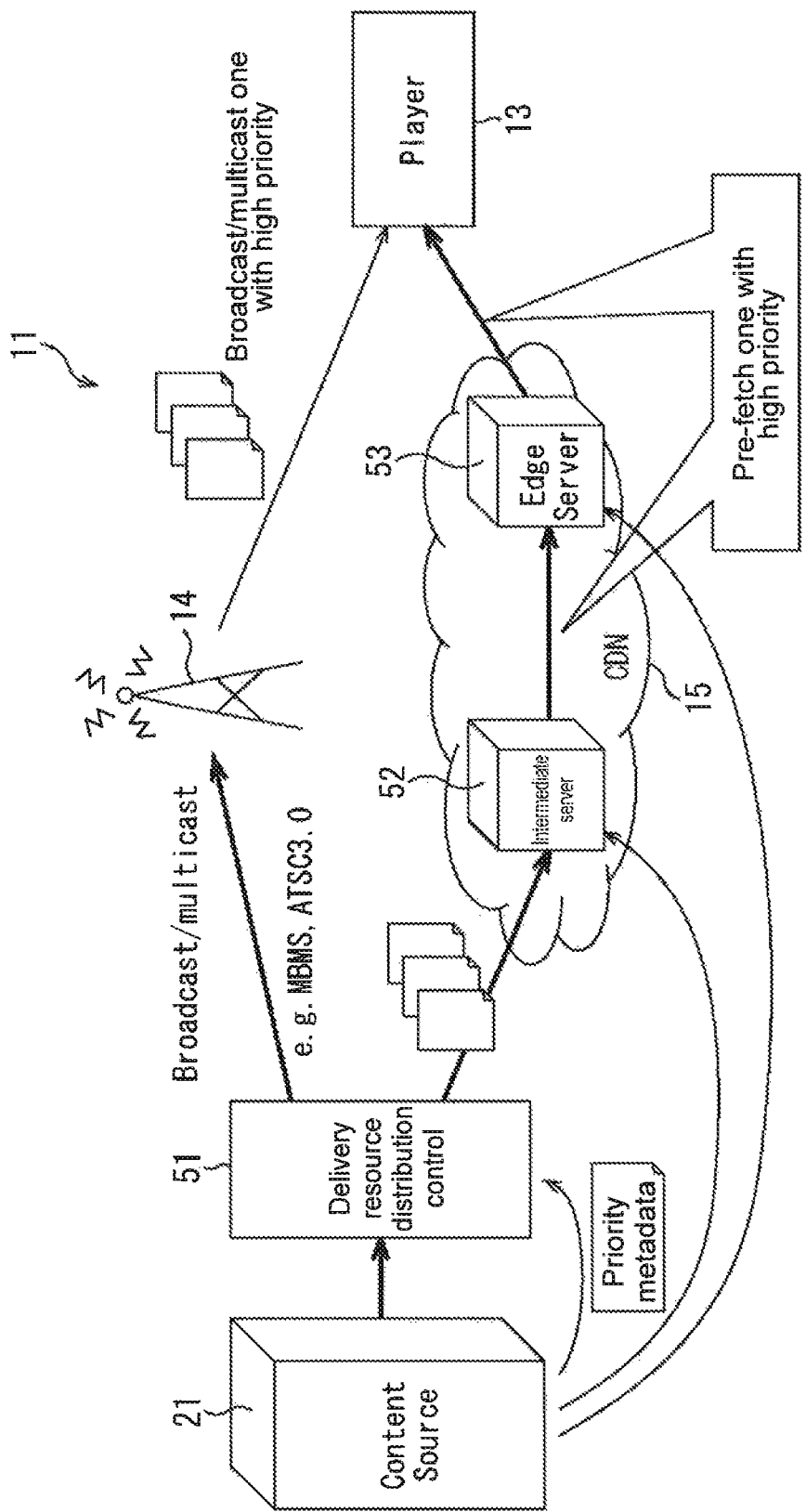
FIG. 87 is a diagram illustrating an overview of a content presentation system in which a segment is pre-fetched with reference to metadata indicating a priority.

In the content presentation system 11 illustrated in FIG. 87, the distribution of the delivery resources for the content delivered from the content provider 21 (origin server) is controlled between the broadcasting network 14 and the bidirectional network 15 by a delivery server 51. Further, the bidirectional network 15 is constituted by a CDN intermediate server 52 and a CDN edge server 53, and content transmitted from the delivery server 51 is delivered to the client 13 which is provided with the content by the CDN edge server 53 via, for example, the CDN intermediate server 52.

Further, metadata indicating a priority can be added to the content delivered from the content provider 21 for each segment, and for example, a high priority is set in a segment of a viewpoint with a high popularity. Then, referring to this metadata, the CDN intermediate server 52 and the CDN edge server 53 can preferentially pre-fetch the segment with the high priority with reference to the metadata, or the client 13 can preferentially pre-fetch the segment with the high priority.

Note that, in a case where broadcasting or multicasting via the broadcasting network 14 and unicasting via the bidirectional network 15 can be used together, a segment with a high priority may be preferentially allocated to broadcasting or multicasting and delivered.

Here, as described above, in a case where a stream is selected by an intention or an interaction of the user in the client 13, for example, information of a file format level can be used. On the other hand, in order to optimize the distribution of the delivery resources by the delivery server 51, signaling at the MPD level of MPEG DASH is desirable. Similarly, in order to pre-fetch the segment by the CDN intermediate server 52 and the CDN edge server 53 which are in the middle of a delivery route on the bidirectional network 15 and the client 13, signaling at the MPD level is desirable.

However, in the method which is already proposed for the MPD description of MPEG DASH, if the metadata is provided from a plurality of sources, and the metadata changes with time, the description becomes complicated. Therefore, it is necessary to efficiently describe such metadata in the MPD of MPEG DASH.

<Definition Example of Element of Segment Popularity Timeline>

First, a method of describing a "popularity" used as information to be referred to when the segment is pre-fetched in the MPD of MPEG DASH will be described. For example, the "popularity" can be obtained on the basis of the height of the probability of the stream being consumed by the client.

As illustrated in FIG. 88, a segment popularity timeline (SegmentPopularityTimeline) is defined as a child element of the adaptation set (AdaptationSet) or the representation (Representation) of the MPD.

For example, the segment popularity timeline specifies the popularity (Popularity rate) of an original segment sequence.

A source (@source) is conditionally necessarily used, and any one of "content," "network," and "other" is designated as a value representing a provision source or type of "popularity." "Content" indicates that the "popularity" is a pre-dicted popularity provided by the content provider. "Network" indicates that the "popularity" is a popularity provided by the network that performs delivery such as a value based on a past viewing history statistics of the user. "Other" indicates that the "popularity" is a popularity by an entity other than the content provider and the network. Note that a source is necessarily designated in a case where a certain element (an adaptation set or a representation) has two or more segment popularity timeline elements.

An SP element is an element in which 1 to N pieces can be described and has a value of popularity (rate). A rate (@rate) designated by the SP element is necessarily used, and the "popularity" is designated by an integer from 1 to 100. For example, the rate is set so that the level 1 has the highest popularity, and the popularity decreases as the number increases. A start (@start) designated by the SP element is optionally used, and a segment number of a first segment among a series of segments to which the value of the rate of the SP element is applied is designated. A segment number (@r) designated by the SP element is optionally used, and the number of a series of subsequent segments to which the rate designated by the SP element is applied is designated. Note that the first segment in which the rate is designated is not included in the segment number.

As described above, it is possible to efficiently describe information to be referred to when the segment is pre-fetched by defining the segment popularity timeline.

Note that, in FIG. 88, the value of the rate designated by the SP element can be associated with a value of Level@index (an index attribute of the Level element) of DistributionPolicy (for example, see FIG. 12) described separately (at the Period level) in the MPD of MPEG DASH.

FIG. 89 illustrates an example of the MPD of MPEG DASH in which the "popularity" provided by two types of provision sources is described using the element of the segment popularity timeline described with reference to FIG. 88.

In the example illustrated in FIG. 89, the "popularity" is specified for six segments starting from t=0 with a duration in which the SP element of the popularity timeline of the segment template (SegmentTemplate) is described is 180180. For example, in the segment popularity timeline in which the source is the content provider (source="content"), 50 is designated as the values of the rates of the first two (first and second) segments. Then, 30 is designated as the values of the rates of subsequent two (third and fourth) segments, and 10 is designated as the values of the rates of subsequent two (fifth and sixth) segments.

Further, FIG. 89 illustrates only a description example of the segment popularity timeline for one adaptation set. In practice, a plurality of adaptation sets is described in a period, and the elements of the segment popularity timeline is described in each adaptation set. Further, the "popularity" designated by the value of the rate of each SP element indicates a relative "popularity" between different adaptation sets in a specific interval in the period. Therefore, the CDN intermediate server 52, the CDN edge server 53, or the client 13 can select and pre-fetch the segment in a specific adaptation set for a specific interval in the period on the basis of this information.

<First Variation of Element of Segment Popularity Timeline>

A first variation of the element of the segment popularity timeline will be described with reference to FIGS. 90 and 91.

In the definition example of the element of the segment popularity timeline illustrated in FIG. 88, the "popularity" is designated in units of segments originally designated in the segment timeline of the element of the adaptation set. On the other hand, for example, the "popularity" can be designated independently of the period of time (duration) of each segment.

In the definition of the segment popularity timeline illustrated in FIG. 90, the source (@source) and the rate (@rate) designated by the SP element are similar to those in the definition of FIG. 88, and description thereof is omitted.

A start time (@start_time) designated by the SP element is optionally used, and the start time (media time) to which the value of the rate of the SP element is applied is described on the basis of a timescale applied to the adaptation set. Note that, in a case where the start time is omitted, an applicable start time is an end time designated in the previous SP element or the start time of the period.

The end time (@end_time) designated by the SP element is optionally used, and an end time (media time) to which the value of the rate of the SP element is applied is described on the basis of a timescale applied to the adaptation set. Note that, in a case where the end time is omitted, the applicable end time is the end time of the period.

FIG. 91 illustrates an example of the MPD of MPEG DASH in which the "popularity" provided by two types of provision sources is described using the element of the segment popularity timeline of the first variation described with reference to FIG. 90.

In the example illustrated in FIG. 91, the time scale described in the S element of the segment timeline (SegmentTemplate.SegmentTimeline) of the segment template is 90000 (the time scale means that 90000 counts in one second). Further, the "popularity" is designated for six segments starting from t=0 in which the period of time (duration) of each segment is 180180 (=180180/90000 seconds).

For example, in the segment popularity timeline in which the source is the content provider (source="content"), 50 is designated as the value of the rate at t=0 to 3.003 seconds regardless of the boundary of the segment. In this example, since the start time is omitted, it is applied from the start time of the period. Further, in a subsequent interval up to t=6.006 seconds, 30 is designated as the rate value, and in a subsequent interval up to t=12.012 seconds, 10 is designated as the rate value.

Further, in the segment popularity timeline in which the source is the network (source="network"), 10 is designated as the rate value in the interval up to t=0 to 3.5 seconds. Then, in a subsequent interval up to t=3.5 to 7.0 seconds, 50 is designated as the rate value, and in a subsequent interval up to t=7.0 to 12.012 seconds, 70 is designated as the rate value. In this example, since the end time is omitted, it is applied up to the end time of the period.

<Second Variation of Element of Segment Popularity Timeline>

A second variation of the element of the segment popularity timeline will be described with reference to FIG. 92.

For example, the element of the segment popularity timeline can be a child element of the element of the representation other than a child element of the element of the adaptation set. In particular, in a case where the source is the network (source="network"), that is, in a case where the "popularity" based on statistical information of the stream acquired by the user in the past, it is described in units of representations, and thus the CDN edge server 53 can refer to it more effectively when the segment is prefetched. In other words, a statistical value indicating a trend of an available band with the client 13 which acquires the stream from the CDN edge server 53.

FIG. 92 illustrates an example of the MPD of MPEG DASH in which the "popularity" is described in units of segments using such element of the segment popularity timeline of the second variation.

Note that, in the example illustrated in FIG. 92, only the segment popularity timeline in which the source is the network (source="network") designates the rate value in units of representations. Note that this does not exclude designating the rate value in units of representations in the segment popularity timeline in which the source is the content provider (source="content"). For example, the priority in units of representations may be designated for the purpose of designating the minimum quality (a value of @bandwidth illustrated in FIG. 92, that is, an encoding bit rate of the stream illustrated in FIG. 92) in which viewing of each interval is recommended in accordance with the intention of the creator.

Further, in the example illustrated in FIG. 92, the "popularity" is designated for the six segments starting from t=0 in which the period of time (duration) described in the S element of the segment timeline (SegmentTemplate.SegmentTimeline) of the segment template is 180180.

For example, in the segment popularity timeline in which the source is the network (source="network"), in the first two (first and second) segments, the value of the rate of the representation of bandwidth="50000" is designated to the highest value. Then, in the subsequent two (third and fourth) segments, the value of the rate of the representation of bandwidth="1000000" is designated to the highest value, and in the subsequent two (fifth and sixth) segments, the rate value of the representation of bandwidth="50000" is designated to the highest value. Note that the "popularity" indicated by these rate values not only represents the relative relation between the representations in the adaptation set but also represents the relative relation between the segments described in other adaptation sets as described above.

<Third Variation of Element of Segment Popularity Timeline>

A third variation of the element of the segment popularity timeline will be described with reference to FIG. 93.

For example, the element of the level (Level) in the element of the distribution policy (distributionPolicy) defined by the first delivery method of the content delivery method described above can be designated in accordance with a time. FIG. 93 illustrates a description example of the element of the distribution policy.

Further, such element of the level in the element of the distribution policy can be replaced with an element of a DP level timeline defined as illustrated in FIG. 94.

For example, the DP level timeline describes the level of the distribution policy that changes with time. 1 to N levels can be described as the level, and the level of the distribution policy of each interval is designated. An index ASIDs (@index_ASIDs) designated by the level is necessarily used, and an index value representing a priority (or a "popularity") applied to the element interval of the level and an adaptation set ID to which it is applied are delimited by a command and listed.

A start time (@start_time) designated by the level is optionally used, and the start time (media time) to which the value of the rate of the element of the level is applied is described in units of seconds. Note that, in a case where the start time is omitted, the applicable start time is the end time designated in the element of the previous level, or the start time of the period.

The end time (@end_time) designated by the level is optionally used, and the end time (media time) to which the value of the element of the level is applied is described in units of seconds. Note that, in a case where the end time is omitted, the applicable end time is the end time of the period.

FIG. 95 illustrates a description example of the third variation distribution policy described with reference to FIG. 94.

In the example illustrated in FIG. 95, a Level value (index value) 1 is designated in the AS-1 at t=0 to 3.003 seconds, a Level value (index value) 2 is designated in the AS-2 and the AS-3, and a Level value (index value) 3 is designated in the AS-4. In this example, since the start time is omitted, it is applied from the start time of the period. Further, in the subsequent interval up to t=6.006 seconds, the Level value (index value) 1 is designated in the AS-1 and the AS-2, the Level value (index value) 2 is designated in the AS-3, and the Level value (index value) 3 is designated in the AS-4. Further, in the subsequent interval up to t=12.012 seconds, the Level value (index value) 1 is designated in the AS-1, the Level value (index value) 2 is designated in the AS-2 and the AS-4, and the Level value (index value) 3 is designated in the AS-3.

<First Process Example of Pre-Fetching Process of Pre-Fetching Segment>

Figure 96:
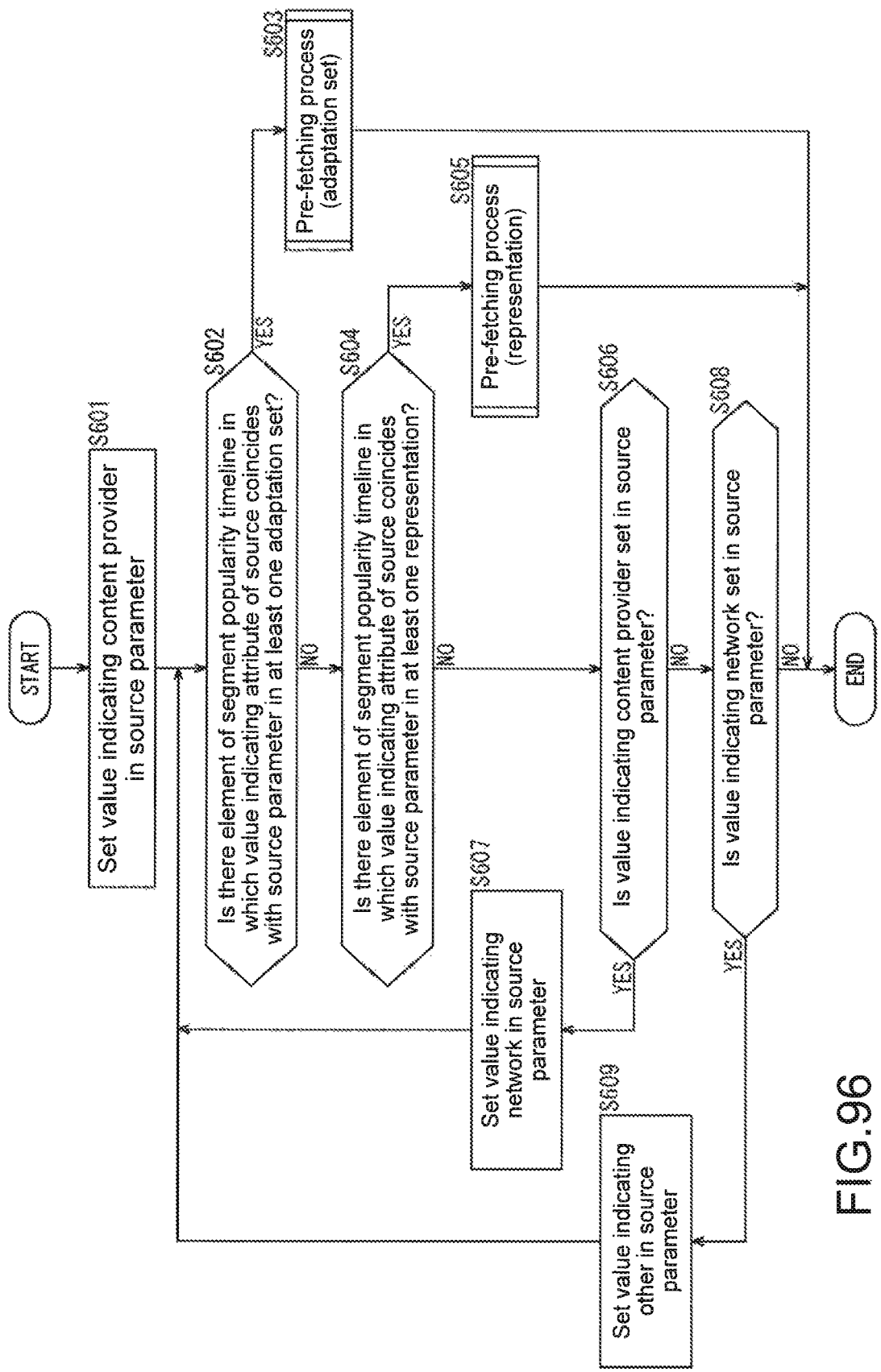
FIG. 96 is a flowchart for describing a first process example of a pre-fetching process of pre-fetching a segment.

A first process example of the pre-fetching process of pre-fetching the segment will be described with reference to FIG. 96. Further, the pre-fetching process is performed in each of the CDN intermediate server 52, the CDN edge server 53, and the client 13, and any one of them is hereinafter described as a process main entity.

For example, the process is started when each of the CDN intermediate server 52, the CDN edge server 53, and the client 13 acquires the MPD. In step S601, the process main entity that performs the process first sets a value indicating the content provider in a source parameter for setting the source serving as the determination criterion ($SourceParam$="content"). Accordingly, the determination based on the information provided by the content provider is preferentially performed.

In step S602, the process main entity determines whether or not there is an element of the segment popularity timeline in which a value indicating an attribute of the source coincides with the value set in the source parameter (@source=$SourceParam$) in at least one adaptation set.

In a case where the process main entity determines in step S602 that there is an element of the segment popularity timeline in which the value indicating the attribute of the source coincides with the value set in the source parameter in at least one adaptation set, the process proceeds to step S603. In step S603, as will be described later with reference to FIG. 97, the pre-fetching process (adaptation set) of pre-fetching the segment on the basis of the segment popularity timeline information of the adaptation set (and the representation) is performed, and then the process ends.

On the other hand, in a case where the process main entity determines in step S602 that there is no element of the segment popularity timeline in which the value indicating the attribute of the source coincides with the value set in the source parameter in at least one adaptation set, the process proceeds to step S604.

In step S604, the process main entity determines whether or not there is an element of the segment popularity timeline in which a value indicating an attribute of the source coincides with the value set in the source parameter (@source=$SourceParam$) in at least representation.

In a case where the process main entity determines in step S604 that there is an element of the segment popularity timeline in which the value indicating the attribute of the source coincides with the value set in the source parameter in at least one representation, the process proceeds to step S605. In step S605, as will be described later with reference to FIG. 98, the pre-fetching process (adaptation set) of pre-fetching the segment on the basis of the segment popularity timeline information of the representation is performed, and then the process ends.

On the other hand, in a case where the process main entity determines in step S604 that there is no element of the segment popularity timeline in which the value indicating the attribute of the source coincides with the value set in the source parameter in at least one representation, the process proceeds to step S606.

In step S606, the process main entity determines whether or not the value indicating the content provider is set in the source parameter.

In a case where the process main entity determines in step S606 that the value indicating the content provider is set in the source parameter, the process proceeds to step S607. In step S607, the process main entity sets the value indicating network in the source parameter ($SourceParam$="network"). Accordingly, the determination based on the information provided by the network is performed, and then the process returns to step S602, and a similar process is subsequently repeated.

On the other hand, in a case where the process main entity determines in step S606 that the value indicating the content provider is not set in the source parameter, the process proceeds to step S608.

In step S608, the process main entity determines whether or not the value indicating the network is set in the source parameter.

In a case where the process main entity determines in step S608 that the value indicating the network is set in the source parameter, the process proceeds to step S609. In step S609, the process main entity sets the value indicating the network in the source parameter ($SourceParam$="other"). As a result, the determination based on the information provided by the other is performed, and then the process returns to step S602, and a similar process is subsequently repeated.

On the other hand, in a case where the process main entity determines in step S608 that the value indicating the network is not set in the source parameter, the process of setting the content provider, the network, and the other in the source parameter is performed. Therefore, the process ends.

In the above example, the CDN intermediate server 52, the CDN edge server 53, and the client 13 first give a priority to the rate of the segment popularity timeline in which the source is the content provider (source="content"), and in a case where such information is not provided, the rate of the segment popularity timeline in which the source is the network (source="network") is used. Further, in a case where it is not described, determination using the rate of the segment popularity timeline in which the source is the other (source="other") is performed.

Figure 97:
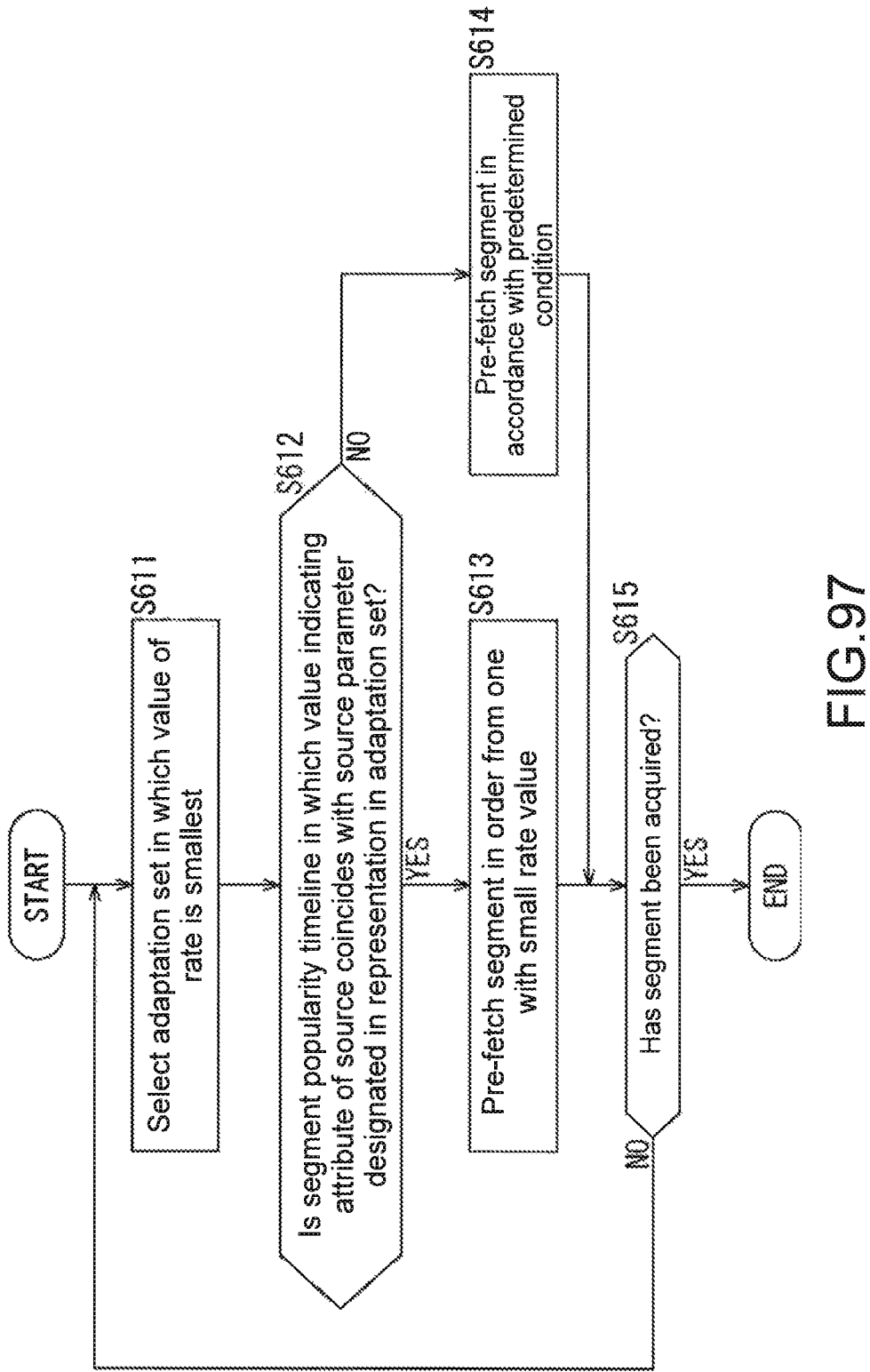
FIG. 97 is a flowchart for describing a pre-fetching process (adaptation set).

The pre-fetching process performed in step S603 of FIG. 96 will be described with reference to a flowchart illustrated in FIG. 97. Note that, in the pre-fetching process, determination for selecting the segment in the adaptation set in which the value of the rate (SP@rate) of the segment popularity timeline in which the value indicating the attribute of the source coincides with the value set in the source parameter (@source=$SourceParam$) is smallest is performed for a segment to be acquired next, that is, a segment of a time subsequent to an acquired segment on the timeline of the segment.

In step S611, the process main entity selects the adaptation set in which the value indicating the attribute of the source coincides with the value (SP@rate) of the segment popularity timeline is smallest.

In step S612, it is determined whether or not the segment popularity timeline in which the value indicating the attribute of the source coincides with the value set in the source parameter is designated in the representation in the adaptation set selected in step S611.

If it is determined in step S612 that the segment popularity timeline in which the value indicating the attribute of the source coincides with the value set in the source parameter is designated in the representation in the adaptation set selected in step S611, the process proceeds to step S613.

In step S613, the process main entity selects a representation in which the value indicating the attribute of the source coincides with the value set in the source parameter among the representations in the adaptation set selected in step S611, and pre-fetches the segment. At this time, the process main entity can pre-fetch one or more segments of the same time interval on the timeline.

On the other hand, if it is determined in step S612 that the segment popularity timeline in which the value indicating the attribute of the source coincides with the value set in the source parameter is not designated in the representation in the adaptation set selected in step S611, the process proceeds to step S614.

In step S614, the segment is pre-fetched in accordance with a predetermined condition described below.

For example, in a case where the process main entity that performs the pre-fetching process is the CDN intermediate server 52 or the CDN edge server 53, a priority is given to the corresponding segment of the rate of the segment popularity timeline of the representation other than the representation in which the value indicating the attribute of the source added to the representation in the adaptation set selected in step S611 coincides with the value set in the source parameter (@source=$SourceParam$). Alternatively, the segment selected on the basis of some determinations (for example, only the corresponding representation of bitrate (@bandwidth) requested in the past or the like) is pre-fetched.

Further, in a case where the process main entity that performs the pre-fetching process is the client 13, a segment of an appropriate representation is pre-fetched in accordance with a current network status.

After the process of step S613 or S614, the process proceeds to step S615, and the process main entity determines whether or not the segment has been acquired until the end of the interval represented by the period (Period).

In a case where it is determined in step S615 that the process main entity determines that the segment has not been acquired, the process returns to step S611, and the process of similarly pre-fetching a subsequent segment to be acquired is repetitively performed.

On the other hand, in a case where the process main entity determines in step S615 that the segment has been acquired, the pre-fetching process ends.

Figure 98:
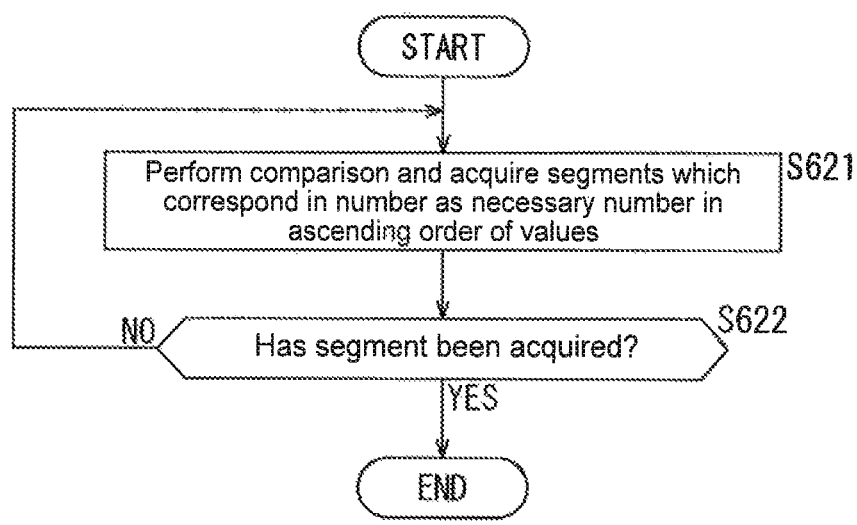
FIG. 98 is a flowchart for describing a pre-fetching process (representation).

The pre-fetching process performed in step S605 of FIG. 96 will be described with reference to a flowchart illustrated in FIG. 98. Note that the pre-fetching process is performed in a case where there is no an element of the corresponding segment popularity timeline in the adaptation set, and there is an element of the corresponding segment popularity timeline in the representation.

In step S621, the process main entity compares the values of the rates (SP@rate) of the segment popularity timelines of the representations in which the value indicating the attribute of the source coincides with the value set in the source parameter (@source=$SourceParam$) for the segment which traverses a plurality of adaptation sets and is desired to be acquired next, that is, the segment of the time subsequent to the acquired segment on the timeline of the segment, selects a representation in which the value is small, and acquires the segment. At this time, the process main entity acquires one or more segments of the same time interval on the timeline.

In step S622, the process main entity determines whether or not the segment has been acquired until the end of the interval represented by the period (Period).

In a case where it is determined in step S622 that the process main entity determines that the segment has not been acquired, the process returns to step S621, and the process of similarly pre-fetching a subsequent segment to be acquired is repetitively performed.

On the other hand, in a case where it is determined in step S622 that the process main entity determines that the segment has been acquired, the pre-fetching process ends.

<Second Process Example of Pre-Fetching Process of Pre-Fetching Segment>

By the way, in the processing described with reference to the flowcharts of FIGS. 96 to 98, it is assumed that the segment popularity timeline of the adaptation set is treated with a priority over the segment popularity timeline of the representation. On the other hand, for example, similarly to other elements in the MPD of MPEG DASH, it can be interpreted that a property designated in a lower element is given a priority over a value designated in an upper element.

Figure 99:
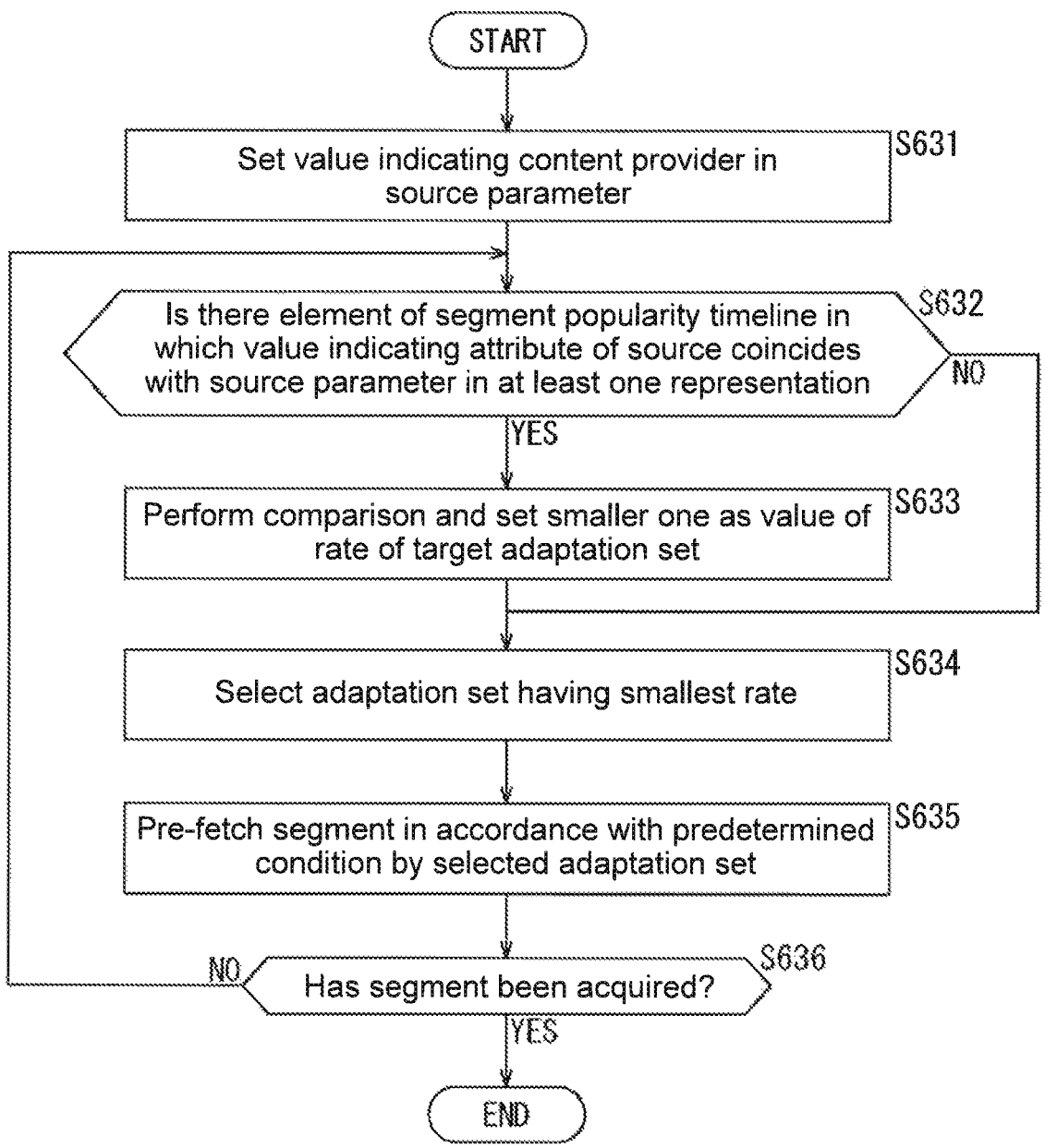
FIG. 99 is a flowchart of describing a second process example of a pre-fetching process of pre-fetching a segment.

In this regard, a second process example of the pre-fetching process of pre-fetching the segment will be described with reference to a flowchart illustrated in FIG. 99. Note that, in the flowchart illustrated in FIG. 99, an example in which, under the assumption that one in which the value indicating the attribute of the source coincides with the value set in the source parameter (@source="content") is necessarily designated in at least one of the adaptation set and the representation, selection based on only it is performed will be described. For example, in a case where information in which one other than one in which the value indicating the attribute of the source coincides with the value set in the source parameter is designated is used, a similar process is repeated through the processing corresponding to S606 and S608 in the flowchart of FIG. 96.

For example, the process is started if the MPD is acquired, and in step S631, the process main entity sets the value indicating the content provider in the source parameter for setting the source serving as the determination criterion ($SourceParam$="content"). Accordingly, subsequently, the determination based on the information provided by the content provider is performed.

In step S632, the process main entity determines whether or not there is an element of the segment popularity timeline in which a value indicating an attribute of the source coincides with the value set in the source parameter (@source=$SourceParam$) in at least representation.

In a case where the process main entity determines in step S632 that there is an element of the segment popularity timeline in which the value indicating the attribute of the source coincides with the value set in the source parameter in at least one representation, the process proceeds to step S633.

In step S633, the process main entity compares the minimum value of the rate of the segment popularity time of the representation in which the value indicating the attribute of the source coincides with the value set in the source parameter with the value of the rate of the segment popularity timeline of the adaptation set including the representation for the segment of the selection target (the time interval in the period) for each adaptation set, and sets the smaller value as the value of the rate of the (corresponding) adaptation set of the selection target.

After the process of step S633, the process proceeds to step S634. Further, in a case where the process main entity determines in step S632 that there is no element of the segment popularity timeline in which the value indicating the attribute of the source coincides with the value set in the source parameter in at least one representation, the process proceeds to step S634.

In step S634, the process main entity selects an adaptation set having the minimum rate in the segment popularity timeline among the adaptation sets having the element of the segment popularity timeline in which the value indicating the attribute of the source coincides with the value set in the source parameter (@source=$SourceParam$). Here, the adaptation set does not have the segment popularity timeline, but one for which the value of the rate is obtained by the process of step S633 is also included in the adaptation set serving as the selection target.

In step S635, the segment in the adaptation set in which the value of the rate (SP@rate) of the segment popularity timeline in which the value indicating the attribute of the source coinciding with the value set in the source parameter (@source=$SourceParam$) is smallest is pre-fetched for the segment to be acquired next, that is, the segment of the time subsequent to the acquired segment on the timeline of the segment in accordance with a predetermined condition to be described below on the basis of the adaptation set selected in step S634.

For example, in a case where the process main entity that performs the pre-fetching process is the CDN intermediate server 52 or the CDN edge server 53, the segment selected on the basis of some determinations (for example, only the corresponding representation of bitrate (@bandwidth) requested in the past or the like) is pre-fetched.

Further, in a case where the process main entity that performs the pre-fetching process is the client 13, a segment of an appropriate representation is pre-fetched in accordance with a current network status.

After the process of step S635, the process proceeds to step S636, and the process main entity determines whether or not the segment has been acquired until the end of the interval represented by the period (Period).

In a case where it is determined in step S636 that the process main entity determines that the segment has not been acquired, the process returns to step S632, and the process of similarly pre-fetching a subsequent segment to be acquired is repetitively performed.

On the other hand, in a case where the process main entity determines in step S636 that the segment has been acquired, the pre-fetching process ends.

Here, a method of designating the policy applied to the CDN intermediate server 52 or the CDN edge server 53 by the client 13 will be described. Here, the application policy is a source which is information source (type) to be given a priority when the segment is pre-fetched in accordance with the segment popularity timeline described in the MPD as described above.

For example, the client 13 can use the SAND message (see FIG. 54) of the MPEG DASH to designate the policy applied to the CDN intermediate server 52 or the CDN edge server 53. Note that the SAND message of MPEG DASH is described in detail in Non-Patent Literature "ISO/IEC 23009-5: 2017 Server and Network Assisted DASH (SAND)."

For example, in SAND, the message from the client 13 to the CDN server or the like (a DASH aware network element (DANE)) is called a SAND Status message and can be transferred by adding the following extension a header of a media segment acquisition request (a HTTP GET request).

Here, in the content presentation system 11 of the present embodiment, it is possible to transfer information of a value of a source which is preferentially applied by adding the header "SAND-PopularityRateSource:network" when the media segment (Media Segment) is requested in transferring pre-fetching using the rate of the segment popularity timeline to the CDN intermediate server 52 or the CDN edge server 53. Alternatively, a header "SAND-PopularityRate-Source:content,network" in which a plurality of sources is listed in a priority order may be added.

Further, this message is also forwarded without change from the CDN edge server 53 to the CDN intermediate server 52 at the upstream side when the CDN edge server 53 acquires or pre-fetches the segment.

Similarly, the SAND message of MPEG DASH can be used when the content provider 21 designates the policy applied to the CDN intermediate server 52 or the CDN edge server 53. Here, the application policy is the value of the source of the segment popularity timeline to be applied when the segment to be pre-fetched is selected as described above.

For example, the message exchanged between the content provider 21 and the CDN intermediate server 52 or the CDN edge server 53 is called a parameter enhancing delivery (PED) message, and the PED message is used for transferring the value of the source of the segment popularity timeline to be applied when the segment to be pre-fetched is selected.

Note that, at present, in the MPEG standard, the PED message is only mentioned on an architecture, and no specific message is defined. Further, the delivery server 51 that transmits and receives the PED messages, the CDN intermediate server 52, or the CDN edge server 53 is referred to as a DASH Aware Network Element (DANE) in the SAND standard.

Further, for the exchange of the SAND messages between DANEs, two methods to be described below are defined in the SAND standard.

In other words, in a first method, an extended HTTP header in which a URL for acquiring the SAND Message is described is added to a response to the HTTP GET request for acquiring the Media Segment, for example, from a downstream DANE to an upstream DANE. Then, there is a method in which the downstream DANE that has received it transmits the HTTP GET request to the URL and acquires the SAND message.

Further, in a second method, a WebSocket channel for exchanging the SAND message in advance between DANEs is established, and there is a method of transmitting the message using that channel.

Here, although the purpose is achieved using any of the first method and the second method, in the first method, it is limited to the case where a transfer destination of the message transmits the Media Segment acquisition request, and thus it is desirable to use the second method. Of course, effects can be obtained within a certain range even when the first method is used. Note that, regardless of which method is used, the SAND message itself is assumed to be described in an XML document and is specifically expressed as illustrated in FIG. 100.

Alternatively, a plurality of elements of PopularityRateSource can be listed and expressed as illustrated in FIG. 101. In the example illustrated in FIG. 101, it is indicated that the segment popularity timeline in which the source is the content provider (source="content") is given a higher priority than the segment popularity timeline in which the source is the network (source="network").

Note that, in FIGS. 100 and 101, here, enderID,generationTime can be added to <CommonEnvelope> as an attribute. Further, a value of messageId indicates a type of SAND message, but in the example illustrated in FIGS. 100 and 101, a value of "reserved for future ISO use" is set for a new message which is not defined in the standard.

As described above, information such as the "popularity" of the segment provided by a plurality of sources or the "probability" consumed by the client 13 can be expressed concisely in the MPD of MPEG DASH as metadata. Therefore, it is possible to easily perform optimization of the delivery resource distribution corresponding thereto and pre-fetching (prediction) of the segment by the CDN intermediate server 52, the CDN edge server 53, or the client 13.

Figure 102:
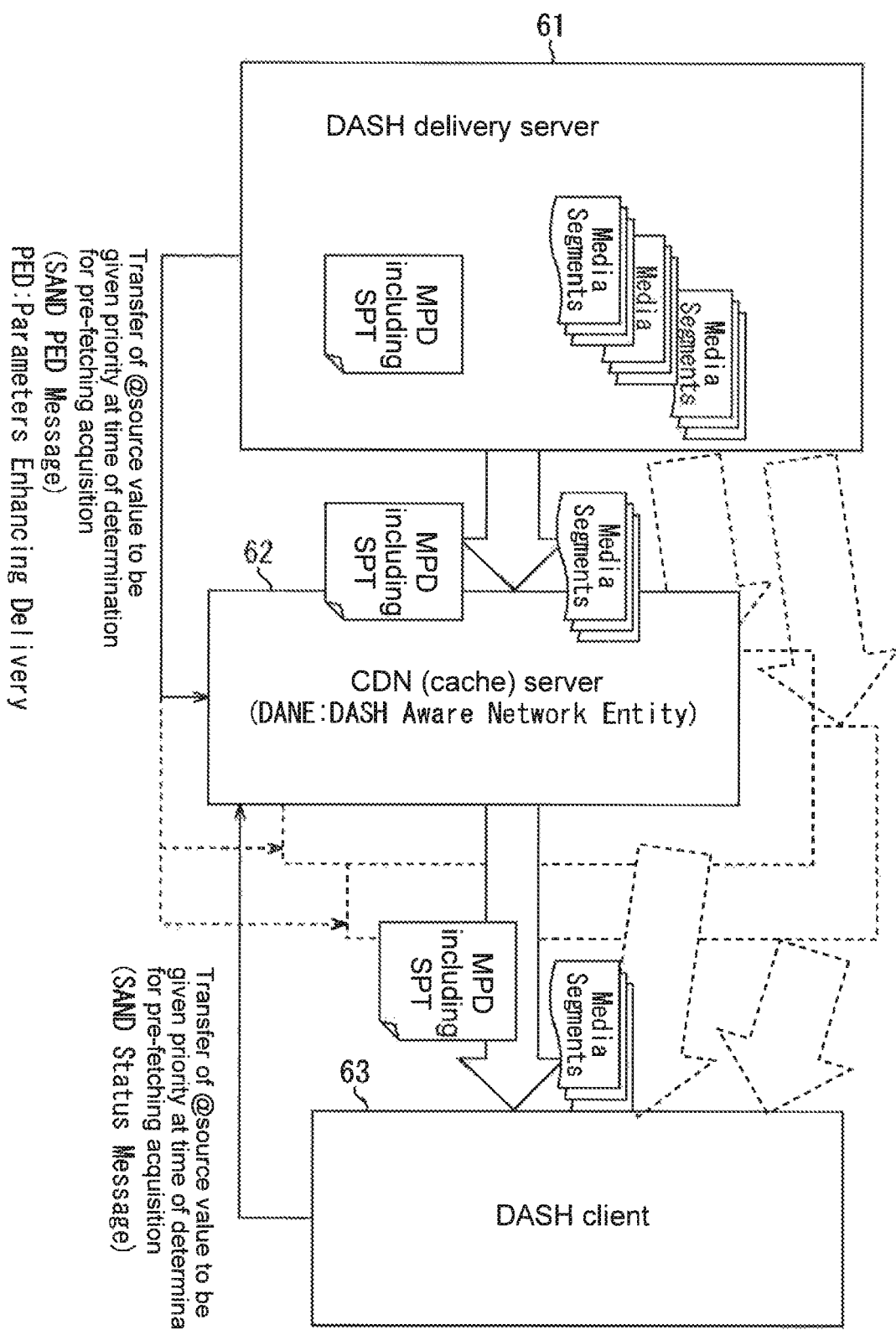
FIG. 102 is a diagram for describing a concept of a process of notifying a source value to be given a priority when a segment popularity timeline for a CDN server is used.

FIG. 102 illustrates a concept of a process of notifying the value of the source (@source) to be given a priority when the segment popularity timeline is used in the CDN server (DANE).

As illustrated in FIG. 102, a DASH delivery server 61 transfers the value of the source to be given a priority at the time of determination for pre-fetching the segment to each of a plurality of CDN servers 62 using the SAND PED message. Further, the MPD including the segment popularity timeline (SPT) and the media segment are transmitted from the DASH delivery server 61 to the CDN server 62.

Further, an MPD client 63 transfers the value of the source to be given a priority at the time of determination for pre-fetching the segment to each of a plurality of CDN servers 62 using the SAND Status message. Then, the MPD including the segment popularity timeline (SPT) and the media segment are transmitted from the CDN server 62 to the MPD client 63.

<Configuration Example of Computer>

Note that the processes described with reference to the above-described flowchart need not necessarily be performed chronologically in accordance with the order described as the flowchart, and processes which are performed in parallel or individually (for example, parallel processes or object-based processes) are also included. Further, a program may be processed by one CPU or may be shared and processed by a plurality of CPUs.

Further, a series of processes described above (the content delivery method) may be executed by hardware or software. In a case where a series of processes are executed by software, a program constituting the software is installed in a computer incorporated into dedicated hardware, for example, a general-purpose personal computer capable of executing various types of functions in accordance with various types of programs installed therein, or the like from a program recording medium having a program recorded therein.

Figure 103:
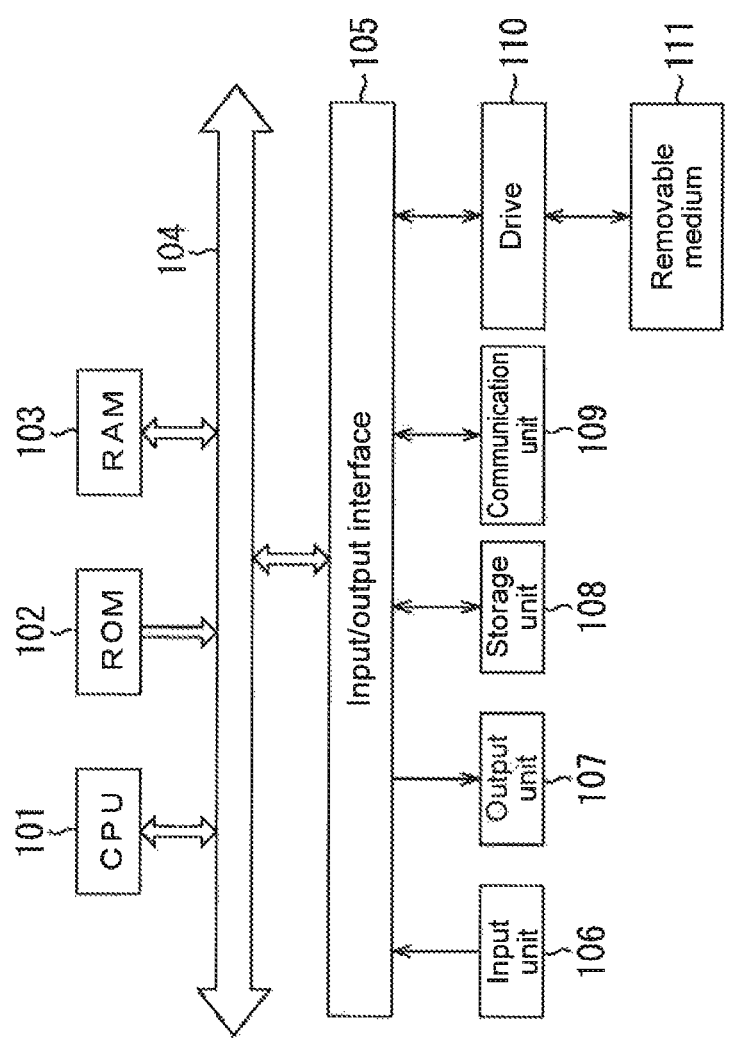
FIG. 103 is a block diagram illustrating a configuration example of an embodiment of a computer to which the present technology is applied.

FIG. 103 is a block diagram illustrating a configuration example of hardware of a computer that executes a series of processes described above in accordance with a program.

In the computer, a central processing unit (CPU) 101, a read only memory (ROM) 102, and a random-access memory (RAM) 103 are connected to one another via a bus 104.

Further, an input/output interface 105 is connected to the bus 104. An input unit 106 including a keyboard, a mouse, a microphone, or the like, an output unit 107 including a display, a speaker, or the like, a storage unit 108 including a hard disk, a non-volatile memory, or the like, a communication unit 109 including a network interface or the like, and a drive 110 that drives a removable medium 111 such as a magnetic disk, an optical disk, a magneto-optical disk, or a semiconductor memory are connected to the input/output interface 105.

In the computer configured as described above, for example, the CPU 101 loads the program stored in the storage unit 108 onto the RAM 103 via the input/output interface 105 and the bus 104 and executes the program, so that a series of processes is performed.

For example, the program executed by the computer (CPU 101) is recorded in the removable medium 111 which is a package medium including a magnetic disk (including a flexible disk), an optical disk (a compact disc-read only memory (CD-ROM)), a digital versatile disc (DVD), or the like), a magneto-optical disk, a semiconductor memory, or the like or provided via a wired or wireless transmission medium such as a local area network, an Inter network, and digital satellite broadcasting.

Further, the program can be installed in the storage unit 108 via the input/output interface 105 when the removable medium 111 is loaded onto the drive 110. Further, the program can be received by the communication unit 109 via a wired or wireless transmission medium and installed in the storage unit 108. In addition, the program can be installed in the ROM 102 or the storage unit 108 in advance.

<Example of Combination of Configurations>

Note that the present technology can also have the following configurations.

(1) A content presentation system, including:
a content delivery apparatus that delivers content to a client that reproduces the content using a plurality of networks with different transport characteristics; and
a content providing apparatus that provides the content delivery apparatus with a policy serving as a determination criterion when delivery of each of streams is distributed by the plurality of networks when the content constituted by a plurality of streams with different characteristics.

(2) The content presentation system according to (1), in which
in the policy, a stream to be delivered by a predetermined network and a stream to be delivered by another network among the plurality of streams having the different characteristics are classified for each level indicating a size of a load on the network.

(3) The content presentation system according to (2), in which
the content providing apparatus describes the policy and the level in a media presentation description (MPD) used to describe meta information in MPEG DASH, and transfers the MPD to the content delivery apparatus.

(4) The content presentation system according to (3), in which the content delivery apparatus rewrites the MPD transferred from the content providing apparatus in accordance with the level with reference to the policy and the level described in the MPD.

(5) The content presentation system according to (3) or (4), in which
the content delivery apparatus has a plurality of segment managers, and the MPD is rewritten for each of the segment managers.

(6) The content presentation system according to (2), in which
the content providing apparatus provides the policy and the level to the client that reproduces the content using a function of notifying of an event in MPEG DASH.

(7) The content presentation system according to (2), in which
the content providing apparatus provides the policy and the level to the content delivery apparatus or the client that reproduces the content using a message interface exchanged between the content providing apparatus and the content delivery apparatus or the client that reproduces the content.

(8) A content presentation method, including:
delivering content to a client that reproduces the content using a plurality of networks with different transport characteristics; and
providing a policy serving as a determination criterion when delivery of each of streams is distributed by the plurality of networks when the content constituted by a plurality of streams with different characteristics.

(9) A program causing a computer to execute a process including:
delivering content to a client that reproduces the content using a plurality of networks with different transport characteristics; and
providing a policy serving as a determination criterion when delivery of each of streams is distributed by the plurality of networks when the content constituted by a plurality of streams with different characteristics.

(10) A content presentation system, including:
a server that constitutes a content delivery network; and
a client apparatus that is provided with content delivered via the content delivery network, in which
the server or the client apparatus pre-fetches, with reference to metadata in which priorities provided from a plurality of provision sources are described to change with time, a segment constituting the content in a descending order of the priorities.

(11) The content presentation system according to (10), in which
the priority is provided by a content provider that provides the content and described by a value according to an intention of a creator that creates the content.

(12) The content presentation system according to (10) or (11), in which
the priority is provided by the content delivery network and described by a value based on statistics measured when the content is delivered in the past via the content delivery network.

(13) The content presentation system according to any one of (10) to (12), in which
an element designating a segment to which the priority is applied is described in the metadata.

(14) The content presentation system according to (13), in which
the segment to which the priority is applied is designated using a number identifying a first segment of a series of segments to which the priority is applied and a segment number of the series of segments.

(15) The content presentation system according to any one of (10) to (12), in which
a period in which the priority is applied is designated using a start time at which the application of the priority is started and an end time at which the application of the priority ends.

(16) The content presentation system according to any one of (10) to (15), in which
the metadata referred to when the segment is pre-fetched is defined as a child element to an adaptation set described in an MPD of MPEG DASH.

(17) The content presentation system according to any one of (10) to (15), in which
the metadata referred to when the segment is pre-fetched is defined as a child element to a representation described in an MPD of MPEG DASH.

(18) The content presentation system according to any one of (10) to (15), in which
the metadata referred to when the segment is pre-fetched is designated using level in an element of a distribution policy used in description of policy/level serving as a determination criterion when distribution is performed by a plurality of networks in an MPD of MPEG DASH.

(19) A content presentation method performed in a content presentation system including a server that constitutes a content delivery network and a client apparatus that is provided with content delivered via the content delivery network, the content presentation method including:
pre-fetching, by the server or the client apparatus, with reference to metadata in which priorities provided from a plurality of provision sources are described to change with time, a segment constituting the content in a descending order of the priorities.

(20) A program causing a computer of a content presentation system including a server that constitutes a content delivery network and a client apparatus that is provided with content delivered via the content delivery network to execute:
pre-fetching, by the server or the client apparatus, with reference to metadata in which priorities provided from a plurality of provision sources are described to change with time, a segment constituting the content in a descending order of the priorities.

Note that the present embodiment is not limited to the above-described embodiment, and various modifications can be made without departing from the scope of the present disclosure.

REFERENCE SIGNS LIST

11 content presentation system
12 omnidirectional camera
13 client
14 broadcasting network
15 bidirectional network
21 content provider
22 CDN service provider
23 broadcast service provider
31 CDN segment manager

The invention claimed is:
1. A content presentation system, comprising:
a server that constitutes a content delivery network; and
a client apparatus that is provided with content delivered via the content delivery network, wherein the server or the client apparatus pre-fetches, with reference to metadata in which priorities provided from a plurality of provision sources are described to change with time, a series of segments constituting the content in a descending order of the priorities, wherein each of the priorities is provided by a content provider that provides the content, and described by a value according to an intention of a creator that creates the content, wherein the metadata describes the priorities associated with elements designating the series of segments using a number identifying a first segment of the series of the segments to which the priorities are applied and a segment number of the series of the segments, and wherein the metadata referred to when the segments are pre-fetched is defined as a child element to an adaptation set described in an MPD of MPEG DASH.

2. The content presentation system according to claim 1, wherein
each of the priorities is provided by the content delivery network and described by a value based on statistics measured when the content is delivered in the past via the content delivery network.

3. The content presentation system according to claim 1, wherein
a period in which each of the priorities is applied is designated using a start time at which the application of the priority is started and an end time at which the application of the priority ends.

4. The content presentation system according to claim 1, wherein
the metadata referred to when the segment is pre-fetched is defined as a child element to a representation described in an MPD of MPEG DASH.

5. The content presentation system according to claim 1, wherein
the metadata referred to when the segment is pre-fetched is designated using level in an element of a distribution policy used in description of policy/level serving as a determination criterion when distribution is performed by a plurality of networks in an MPD of MPEG DASH.

6. A content presentation method performed in a content presentation system including a server that constitutes a content delivery network and a client apparatus that is provided with content delivered via the content delivery network, the content presentation method comprising:
pre-fetching, by the server or the client apparatus, with reference to metadata in which priorities provided from a plurality of provision sources are described to change with time, a series of segments constituting the content in a descending order of the priorities, wherein each of the priorities is provided by a content provider that provides the content, and described by a value according to an intention of a creator that creates the content, wherein the metadata describes the priorities associated with elements designating the series of segments using a number identifying a first segment of the series of the segments to which the priorities are applied and a segment number of the series of the segments, and wherein the metadata referred to when the segments are pre-fetched is defined as a child element to an adaptation set described in an MPD of MPEG DASH.

7. A non-transitory computer-readable medium having embodied thereon a program, which when executed by a computer of a content presentation system including a server that constitutes a content delivery network and a client apparatus that is provided with content delivered via the content delivery network causes the computer to execute a method, the method comprising:
pre-fetching, by the server or the client apparatus, with reference to metadata in which priorities provided from a plurality of provision sources are described to change with time, a series of segments constituting the content in a descending order of the priorities, wherein each of the priorities is provided by a content provider that provides the content, and described by a value according to an intention of a creator that creates the content, wherein the metadata describes the priorities associated with elements designating the series of segments using a number identifying a first segment of the series of the segments to which the priorities are applied and a segment number of the series of the segments, and wherein the metadata referred to when the segments are pre-fetched is defined as a child element to an adaptation set described in an MPD of MPEG DASH.

* * * * *